United States Patent [19]

Uram

[11] 4,032,793

[45] June 28, 1977

[54] MANUAL/AUTOMATIC SYSTEM FOR SYNCHRONIZING MULTIPLE TURBINES IN A COMBINED CYCLE ELECTRIC POWER PLANT

[75] Inventor: Robert Uram, East Pittsburgh, Pa.

[73] Assignee: Westinghouse Electric Corporation, Pittsburgh, Pa.

[22] Filed: Aug. 8, 1974

[21] Appl. No.: 495,713

[52] U.S. Cl. .................. 290/40 C; 60/39.18 B; 290/2; 307/87
[51] Int. Cl.² .................. F02C 9/04; F01K 23/00
[58] Field of Search .......... 290/2, 40; 307/87; 60/39.18 B

[56] References Cited
UNITED STATES PATENTS

| | | | |
|---|---|---|---|
| 3,446,014 | 5/1969 | Foster-Pegg | 60/39.18 B |
| 3,675,426 | 7/1972 | Vidal et al. | 60/39.18 B |
| 3,762,162 | 10/1973 | Miura et al. | 60/39.18 B |
| 3,879,616 | 4/1975 | Baker et al. | 290/2 |
| 3,892,975 | 7/1975 | Yannone | 290/40 |

Primary Examiner—Robert S. Macon
Attorney, Agent, or Firm—E. F. Possessky

[57] ABSTRACT

A combined cycle electric power plant includes gas and steam turbines and steam generators and a digital-/analog control system. In the control system, an automatic digital computer control generates position setpoints for the gas turbine fuel valves and the steam turbine inlet valves to control turbine speed and load. A synchronizer system includes an automatic synchronizer subsystem and a manual synchronizer subsystem. The automatic synchronizer subsystem includes a sequencer which is largely embodied in the digital computer and it further includes a synchronizer which is external to the automatic control. The automatic sequencer connects the synchronizer to synchronize the three generators in a sequence which depends on the startup and loading operation of the turbines, the synchronization operation of the synchronizer and the operation of the breakers. The manual synchronizer subsystem responds to operator inputs to generate a speed reference for the synchronization of each turbine. The synchronization system further includes logic structure needed to permit synchronization to occur and to define the synchronization mode. Turbine speed changes are initiated by the speed/load control under synchronizer system control.

14 Claims, 53 Drawing Figures

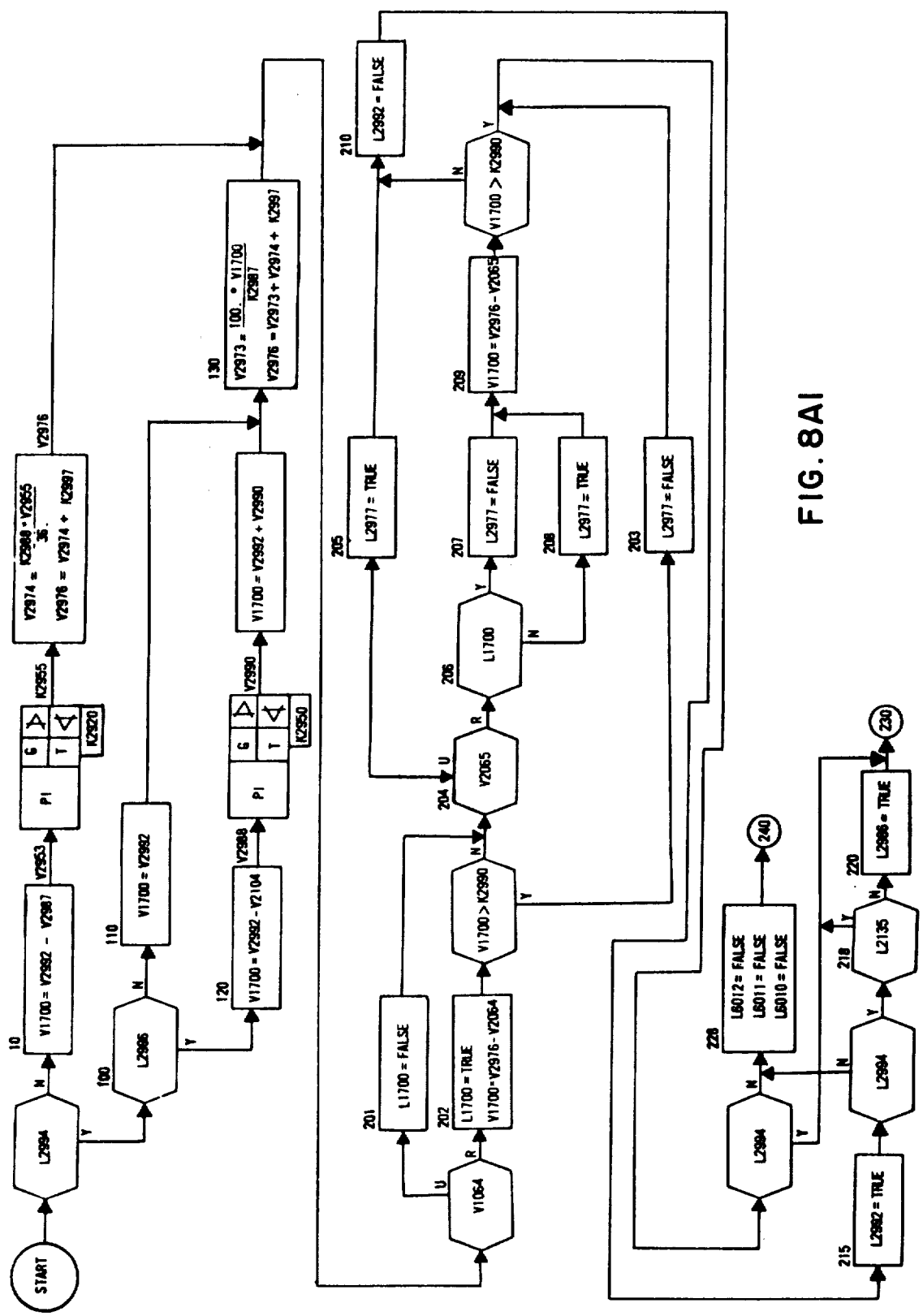
FIG. 8A1

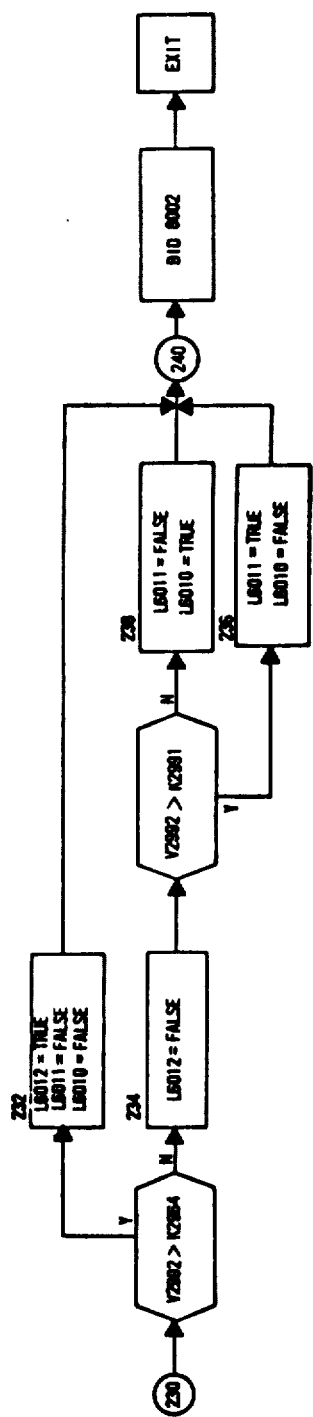
FIG.8A2

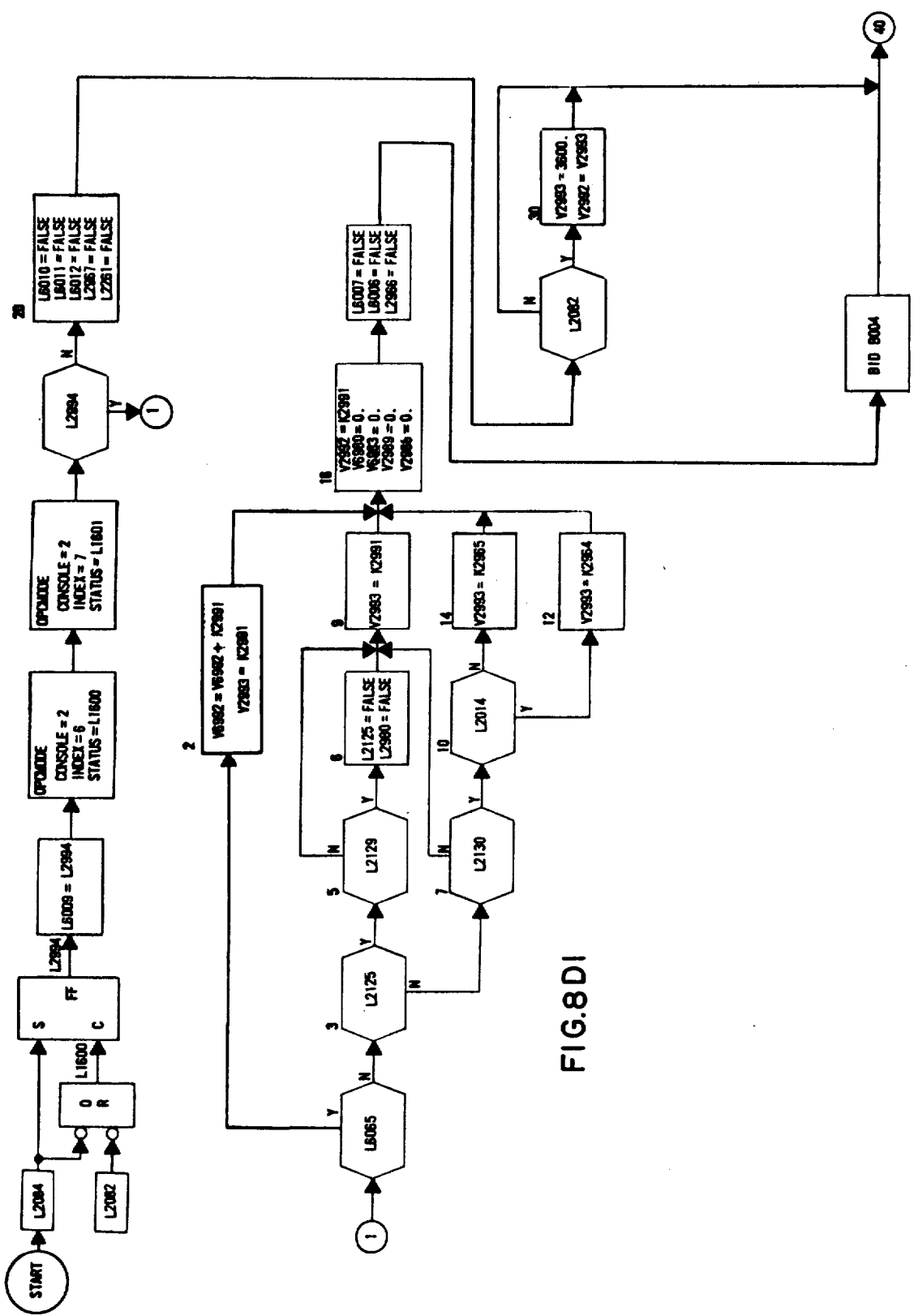
FIG. 8D1

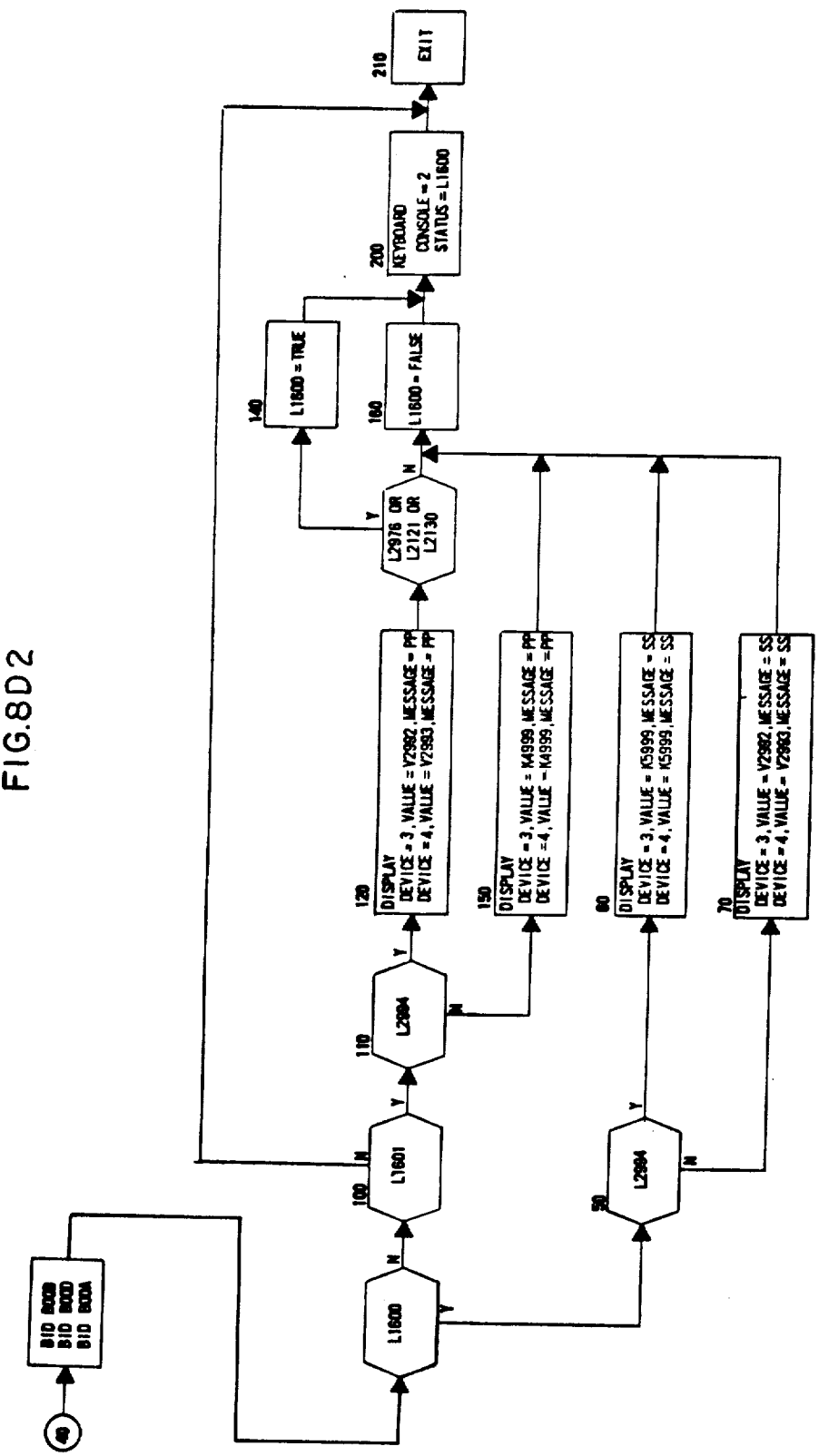
FIG. 8D2

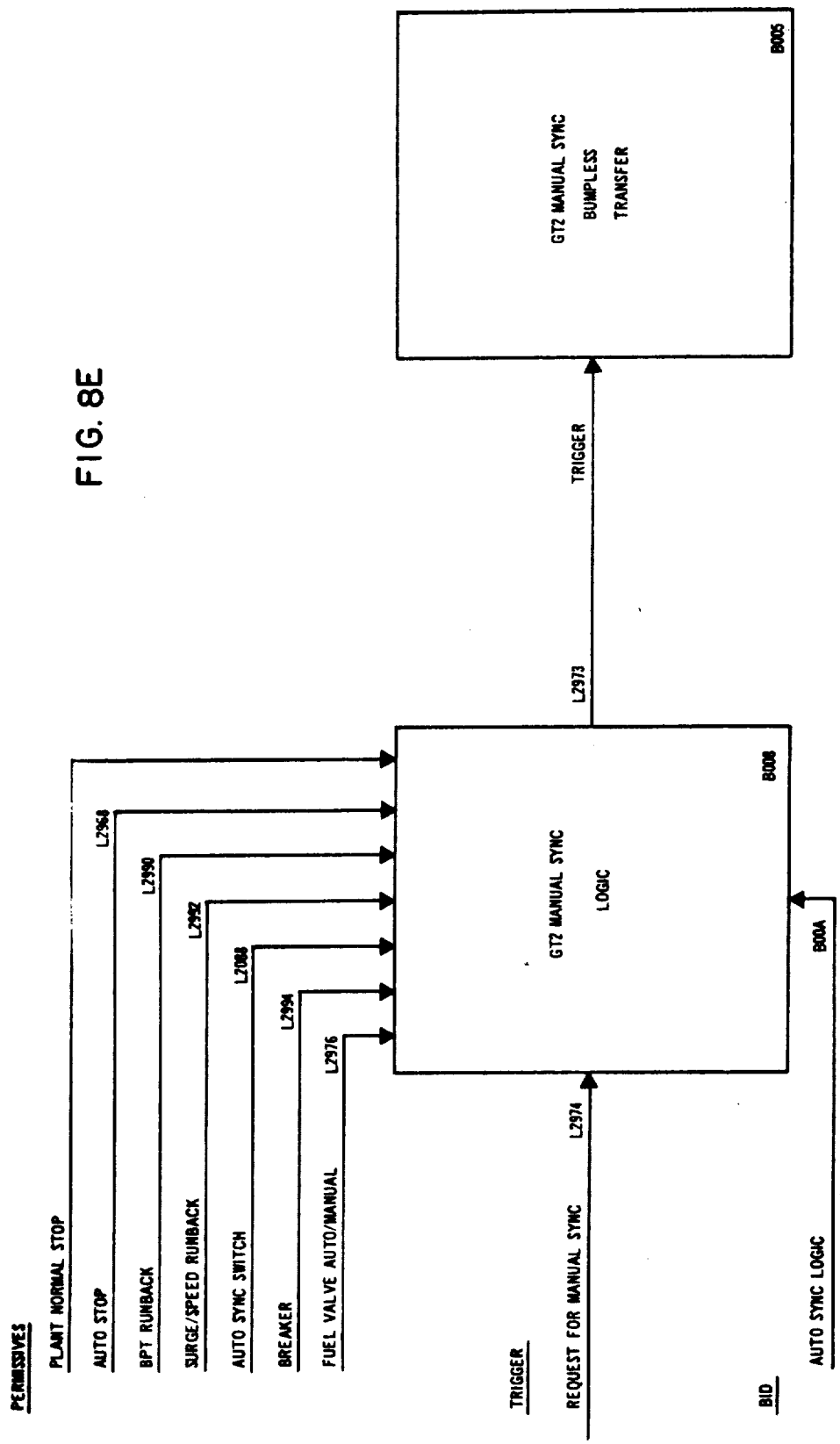

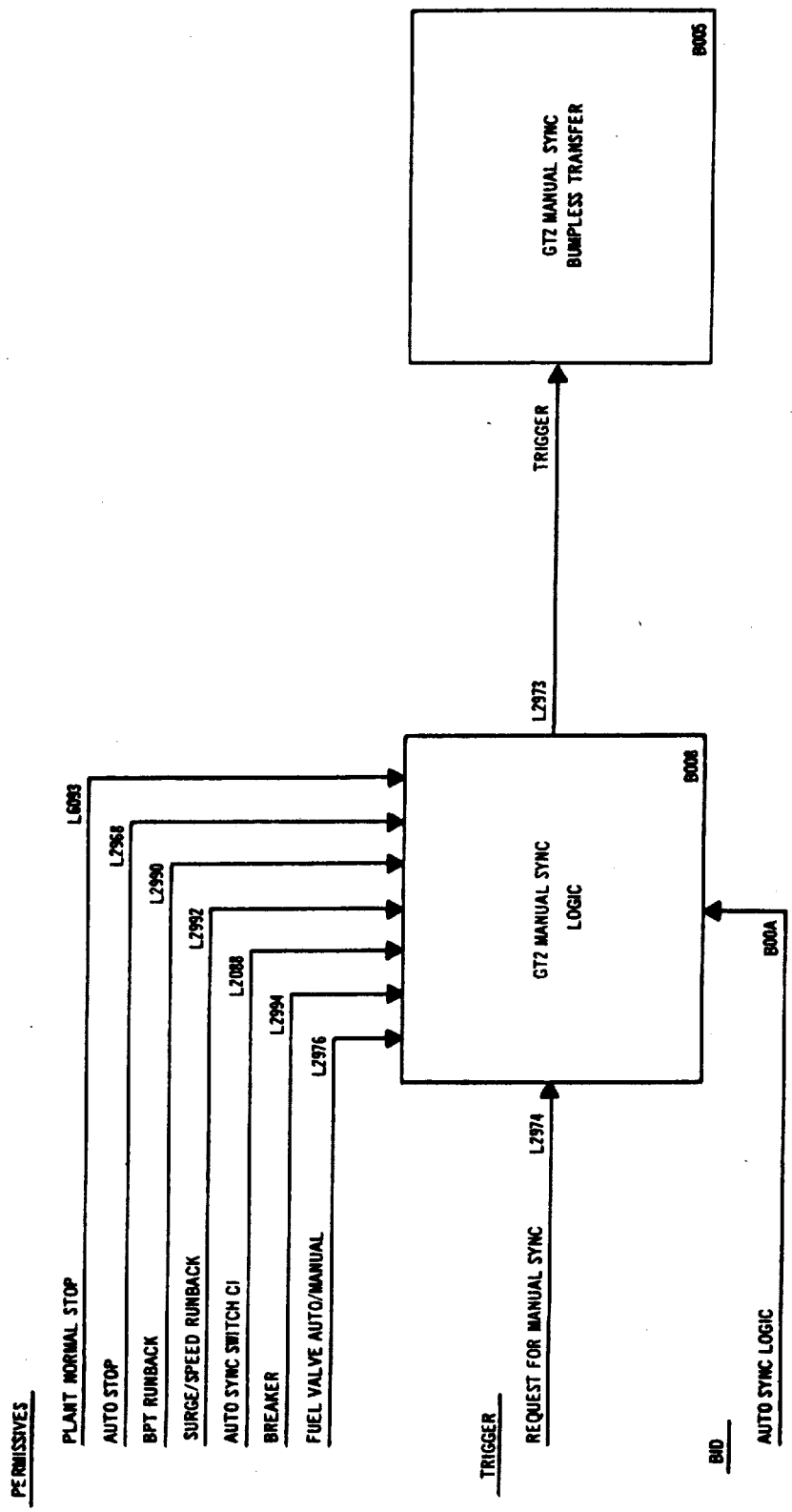
FIG. 8G1

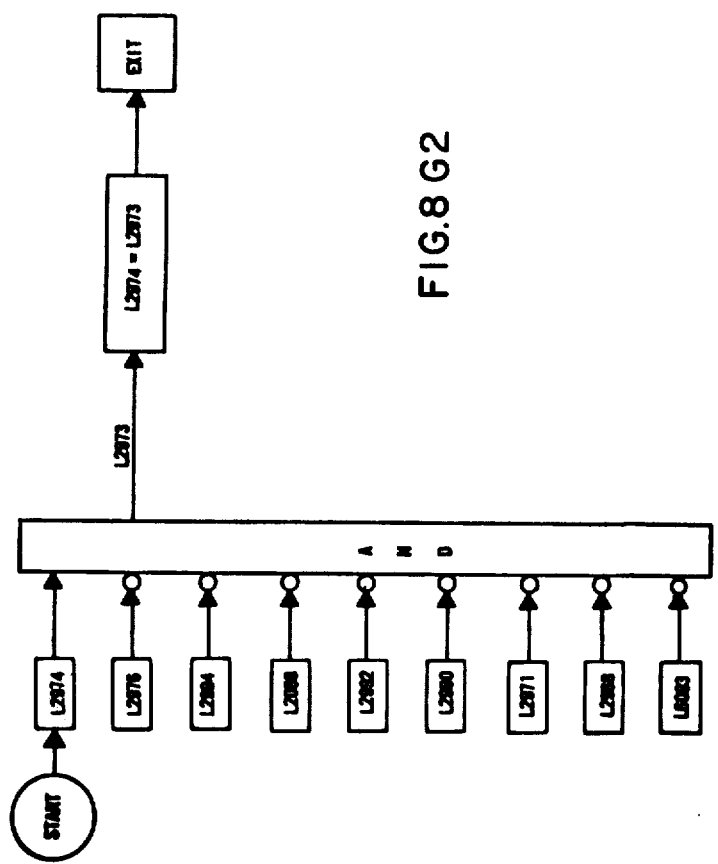
FIG.8 G2

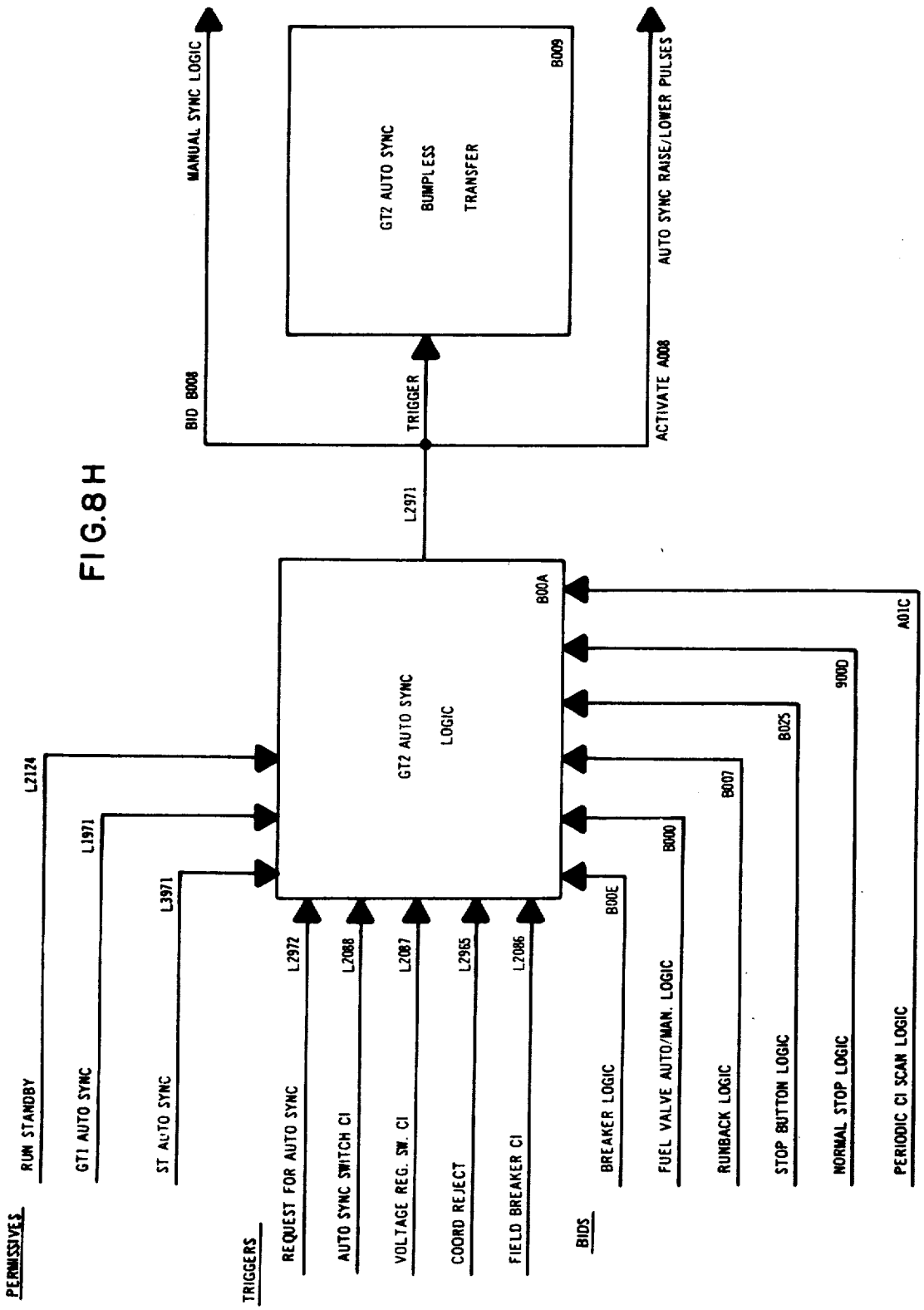

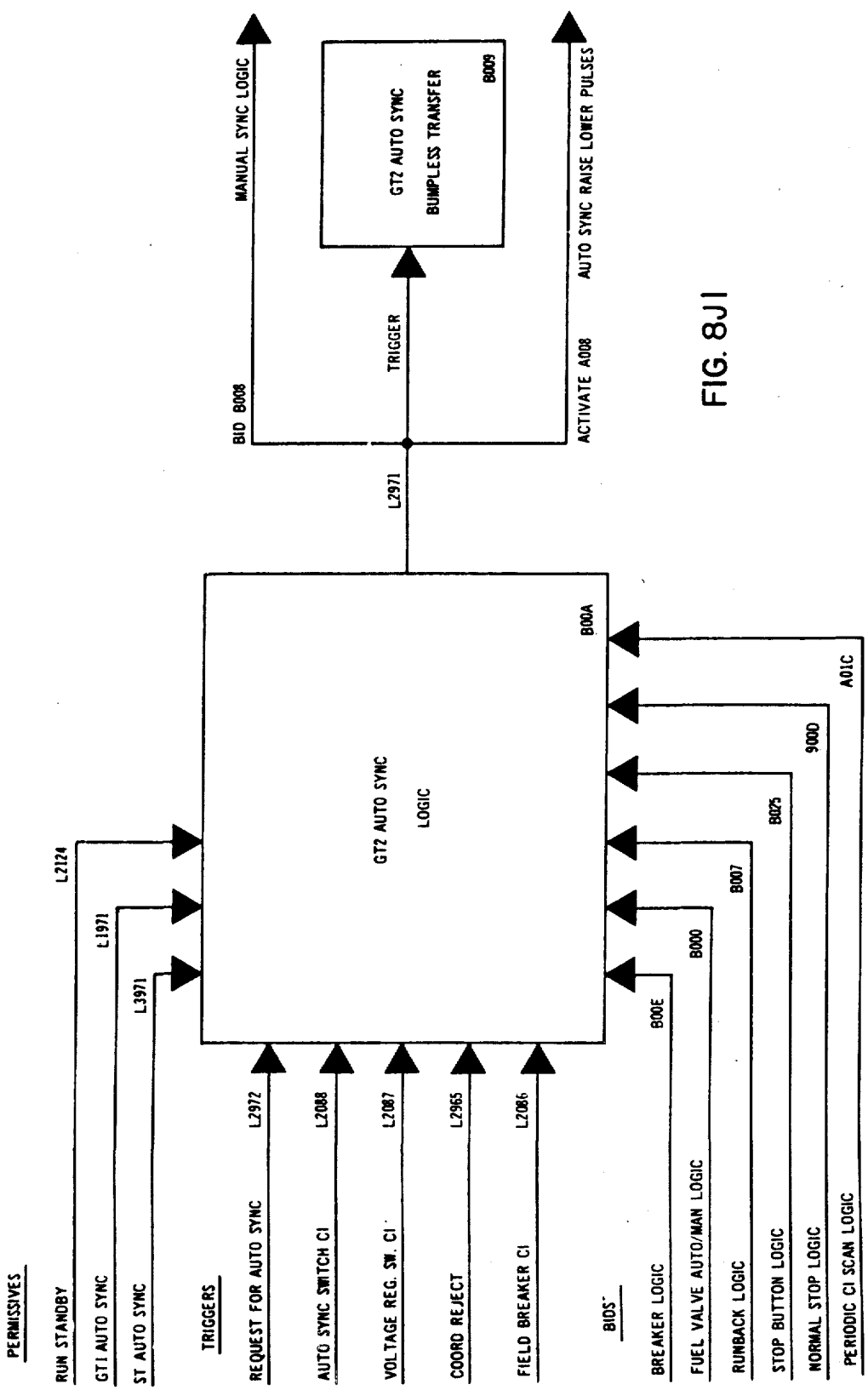
FIG. 8J1

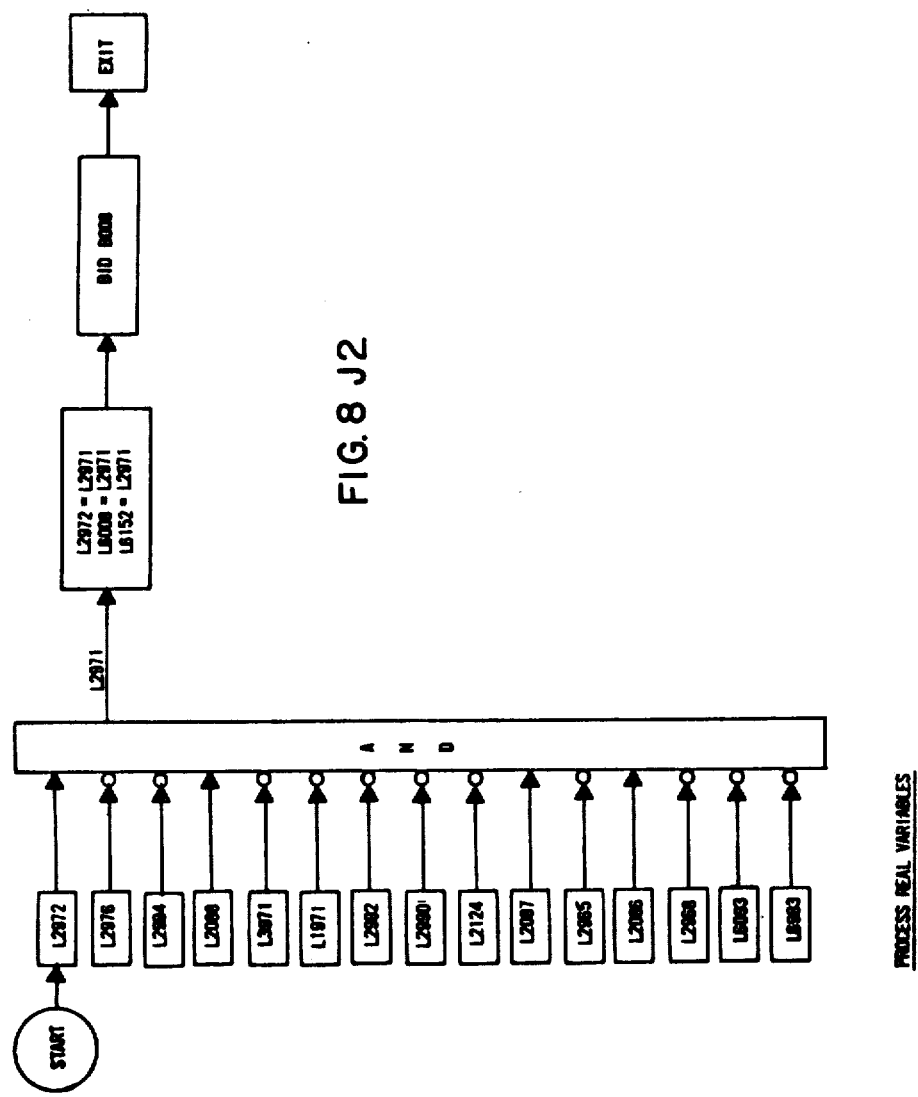

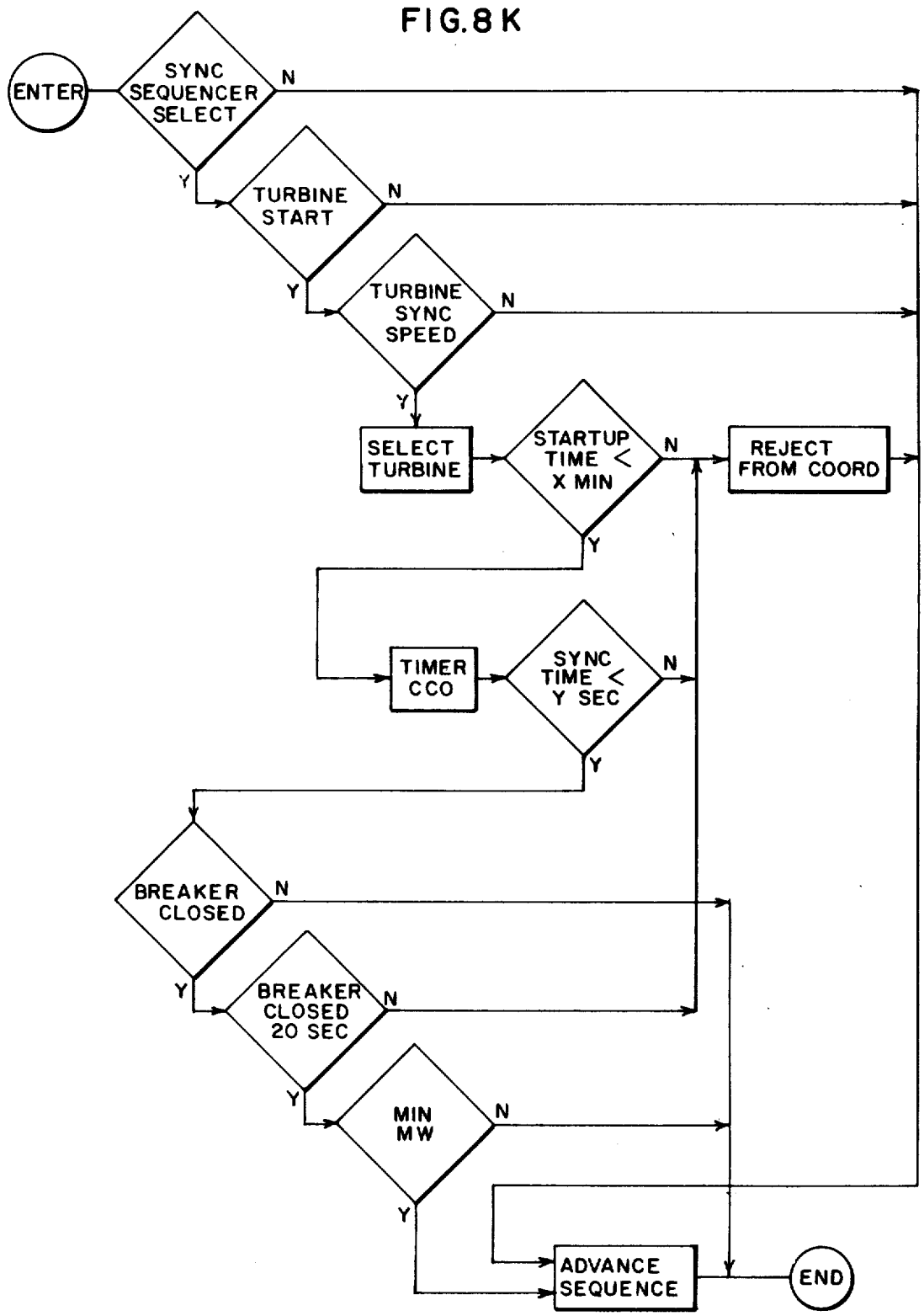

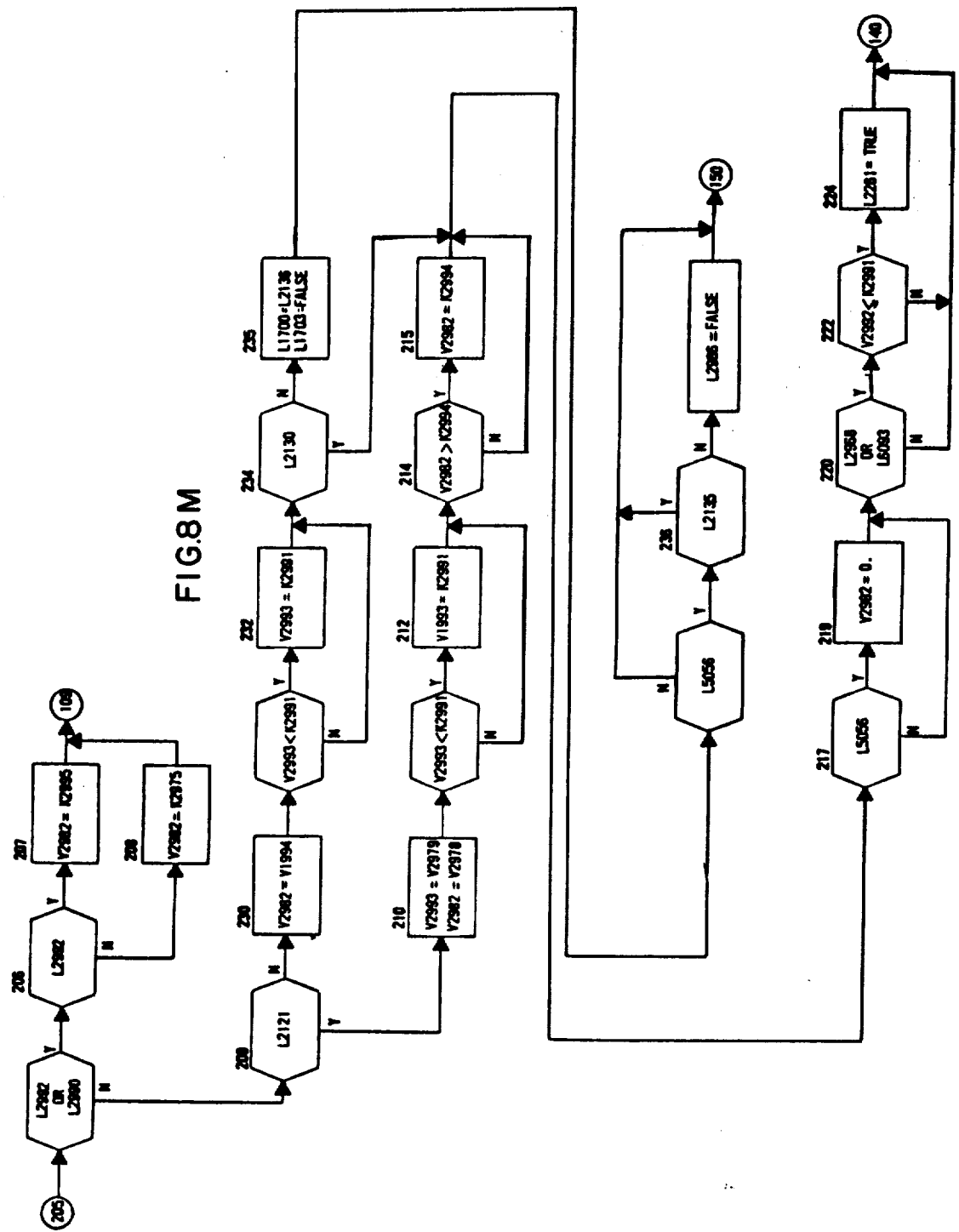

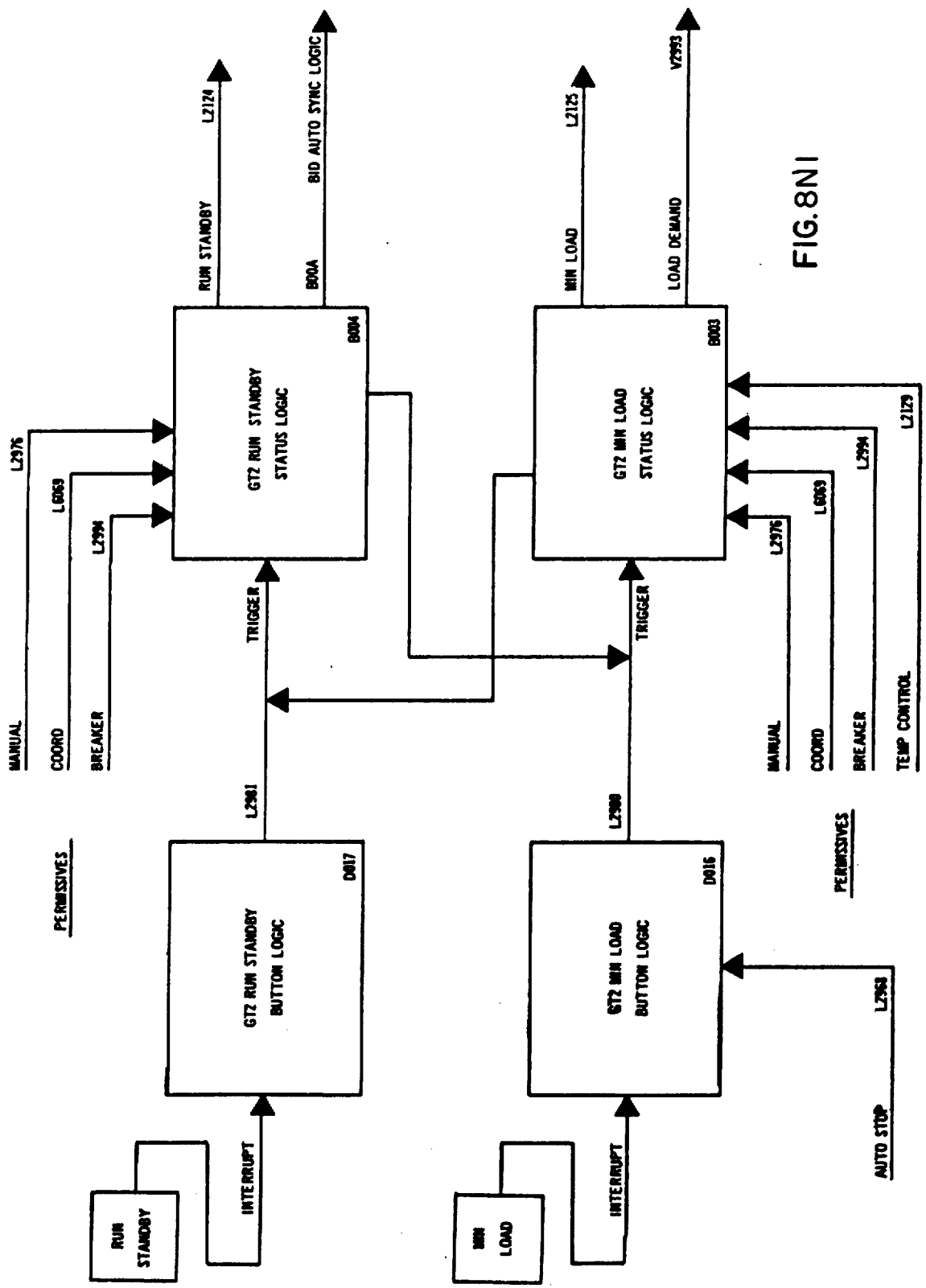

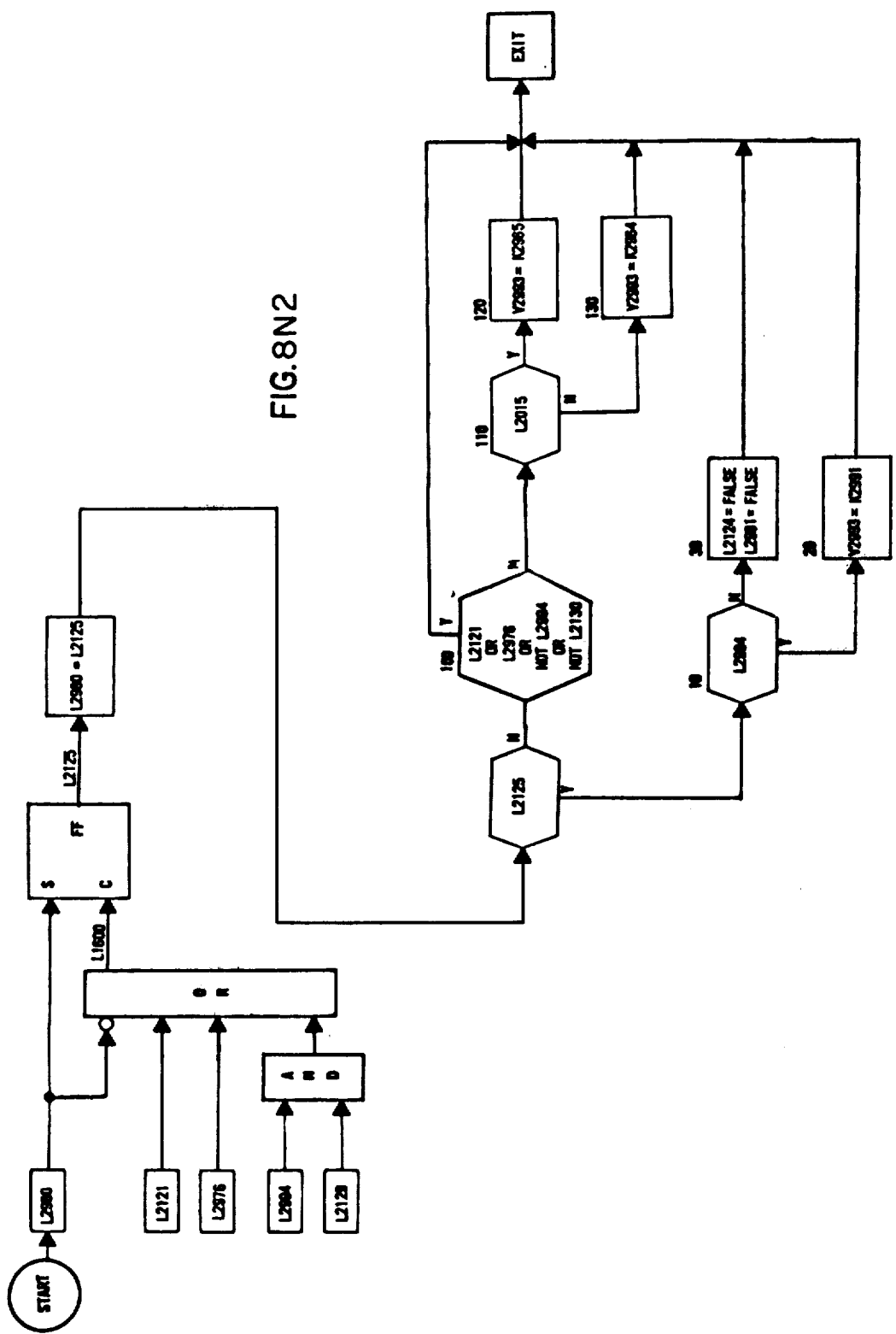
FIG.8N2

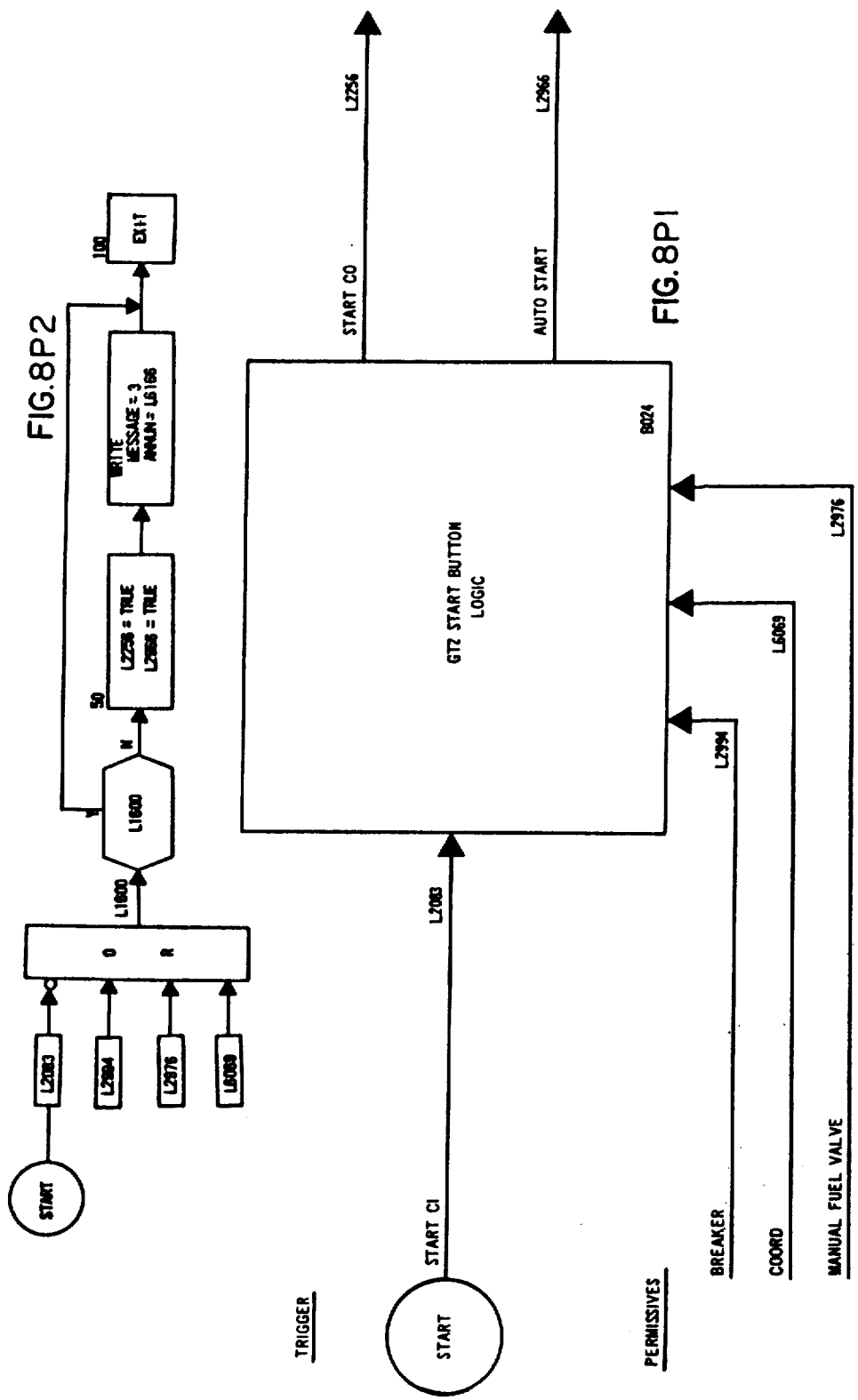

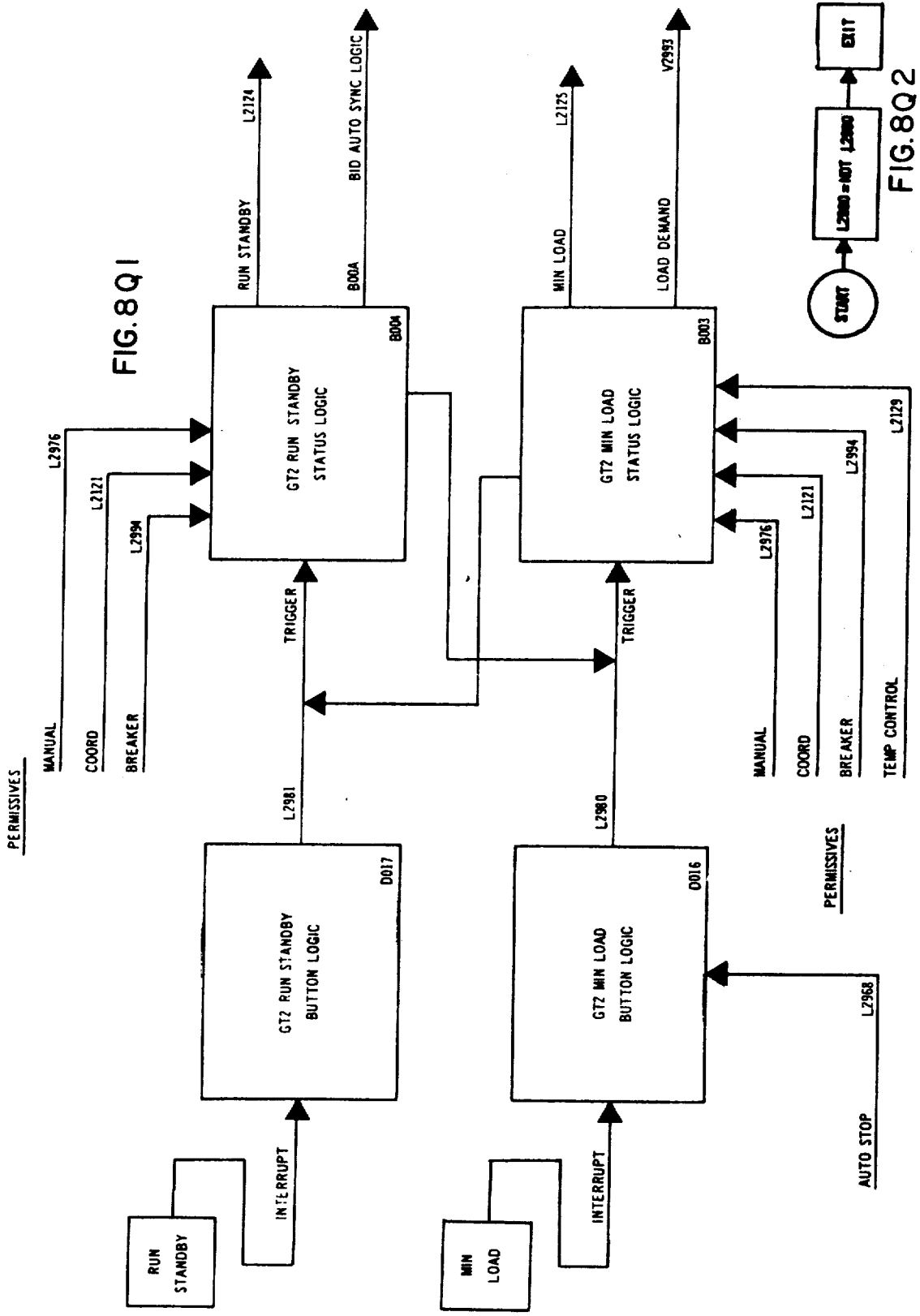

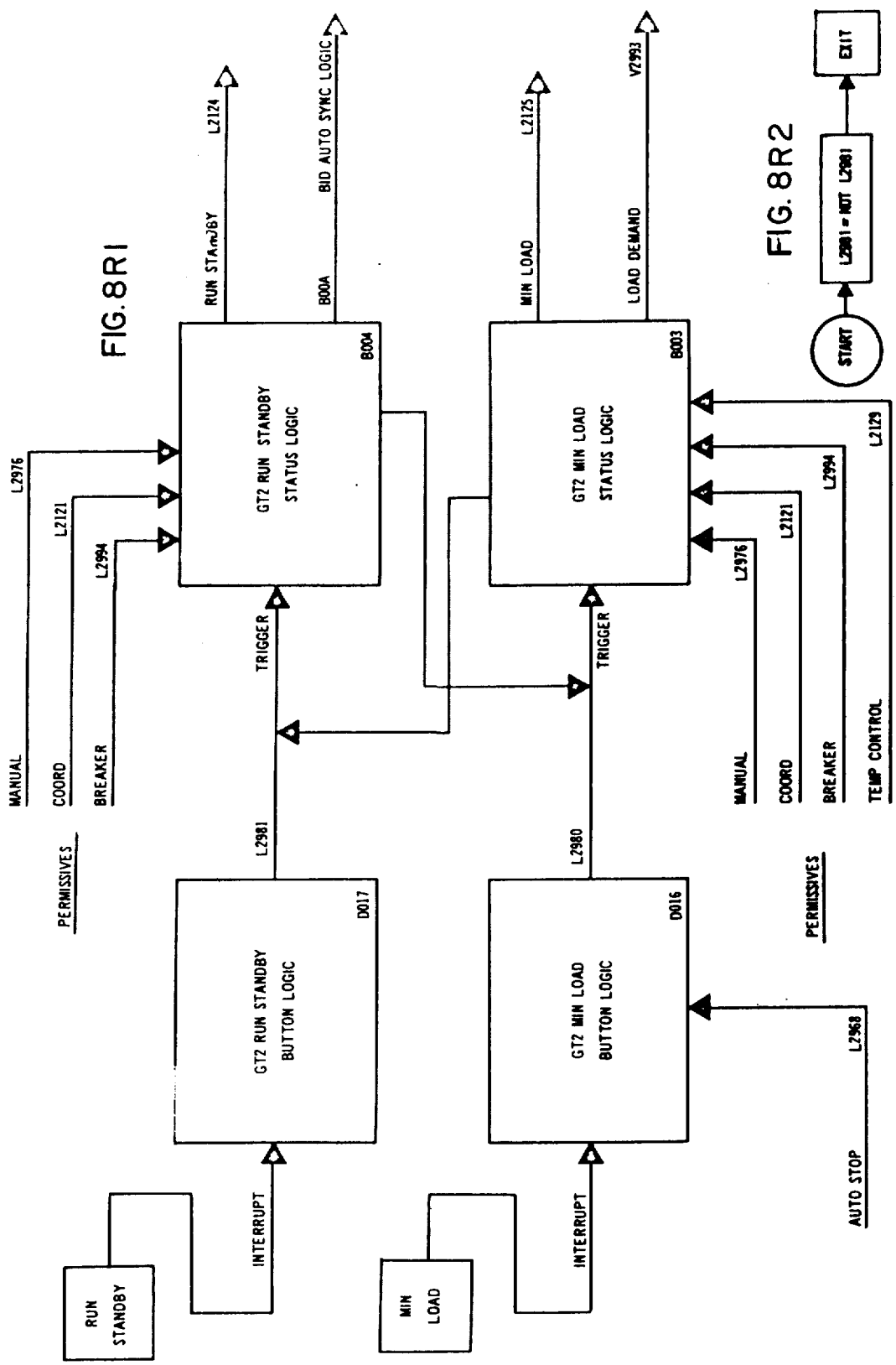

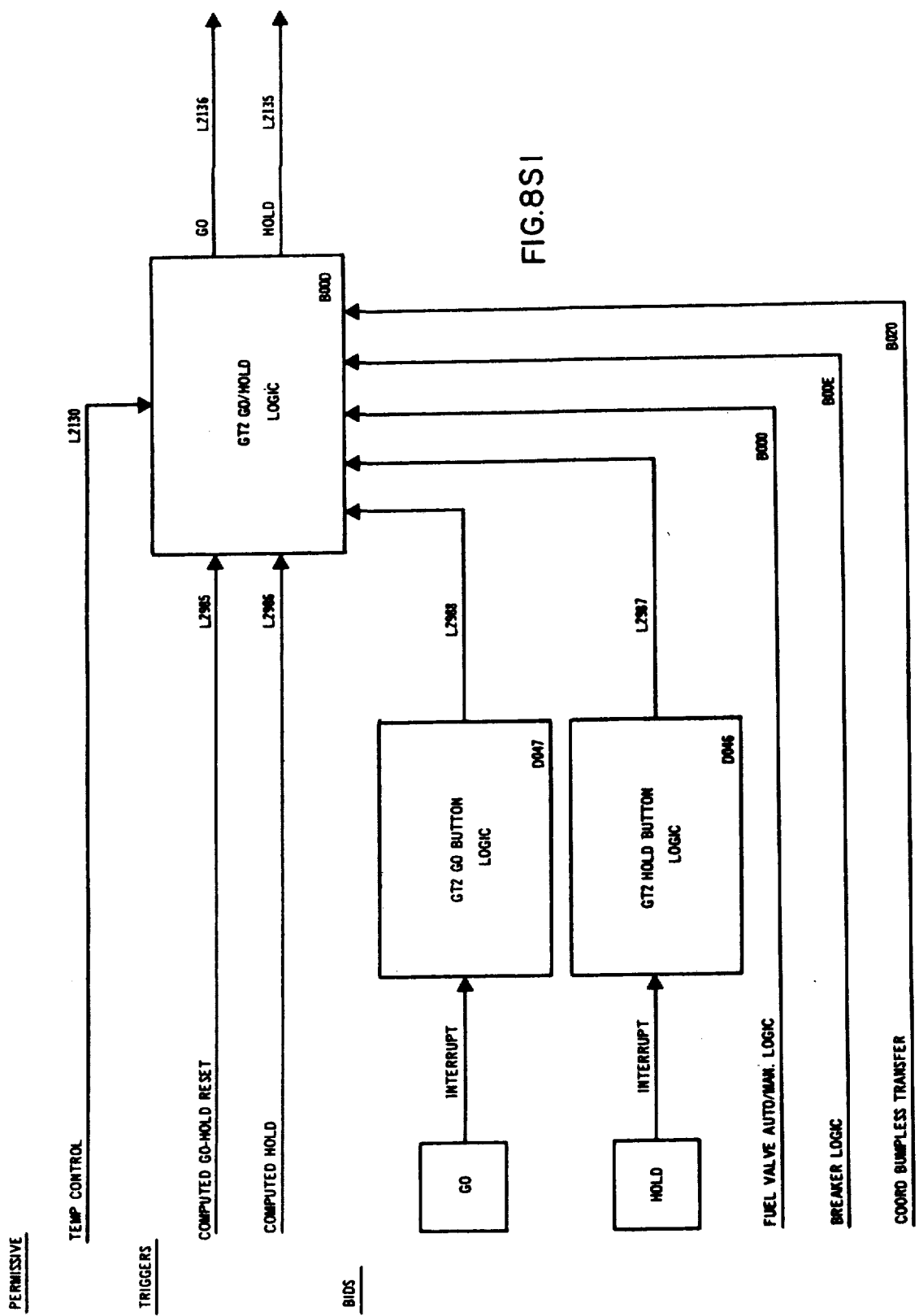

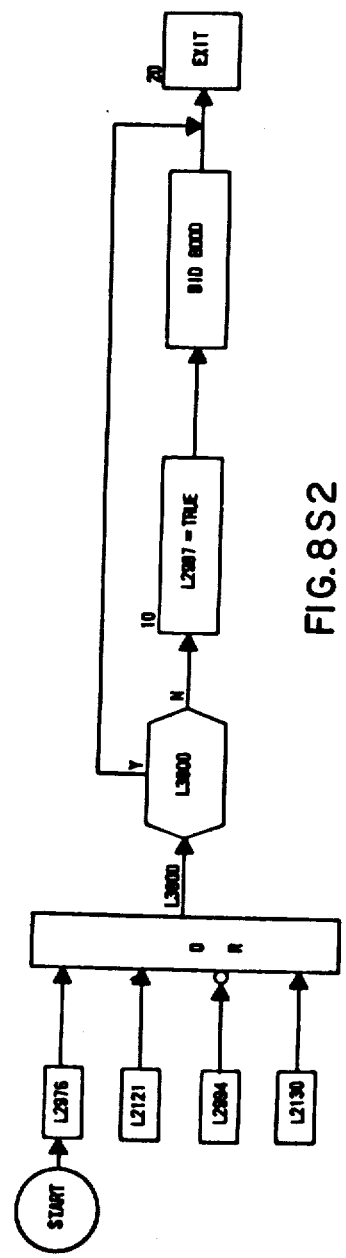
FIG.8S2

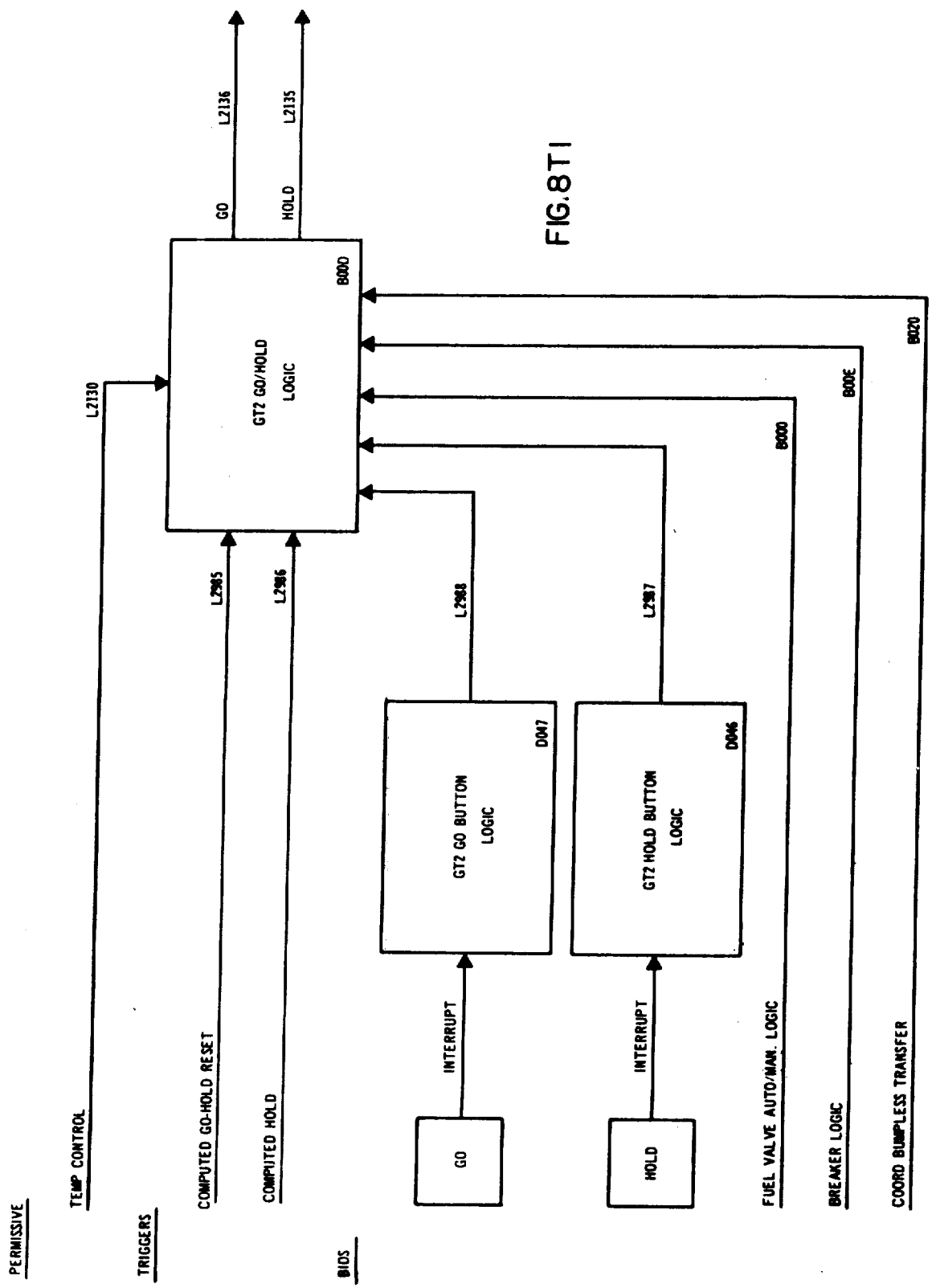
FIG.8T1

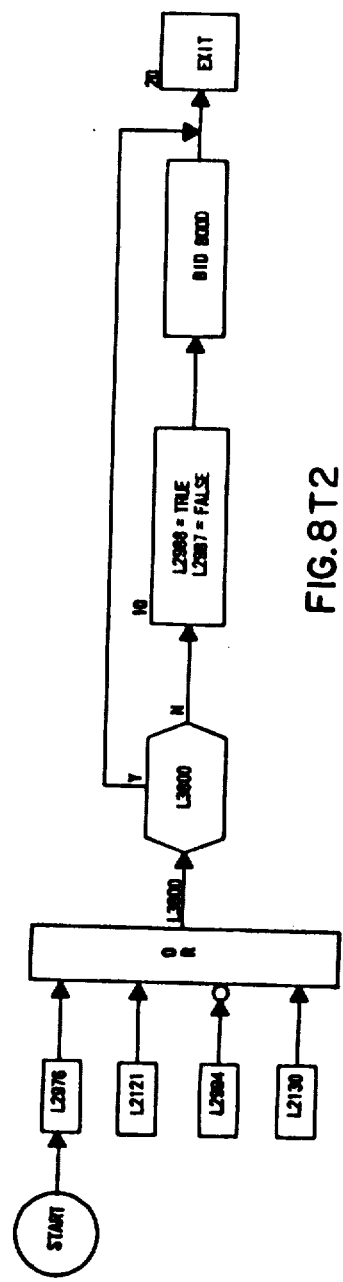
FIG. 8T2

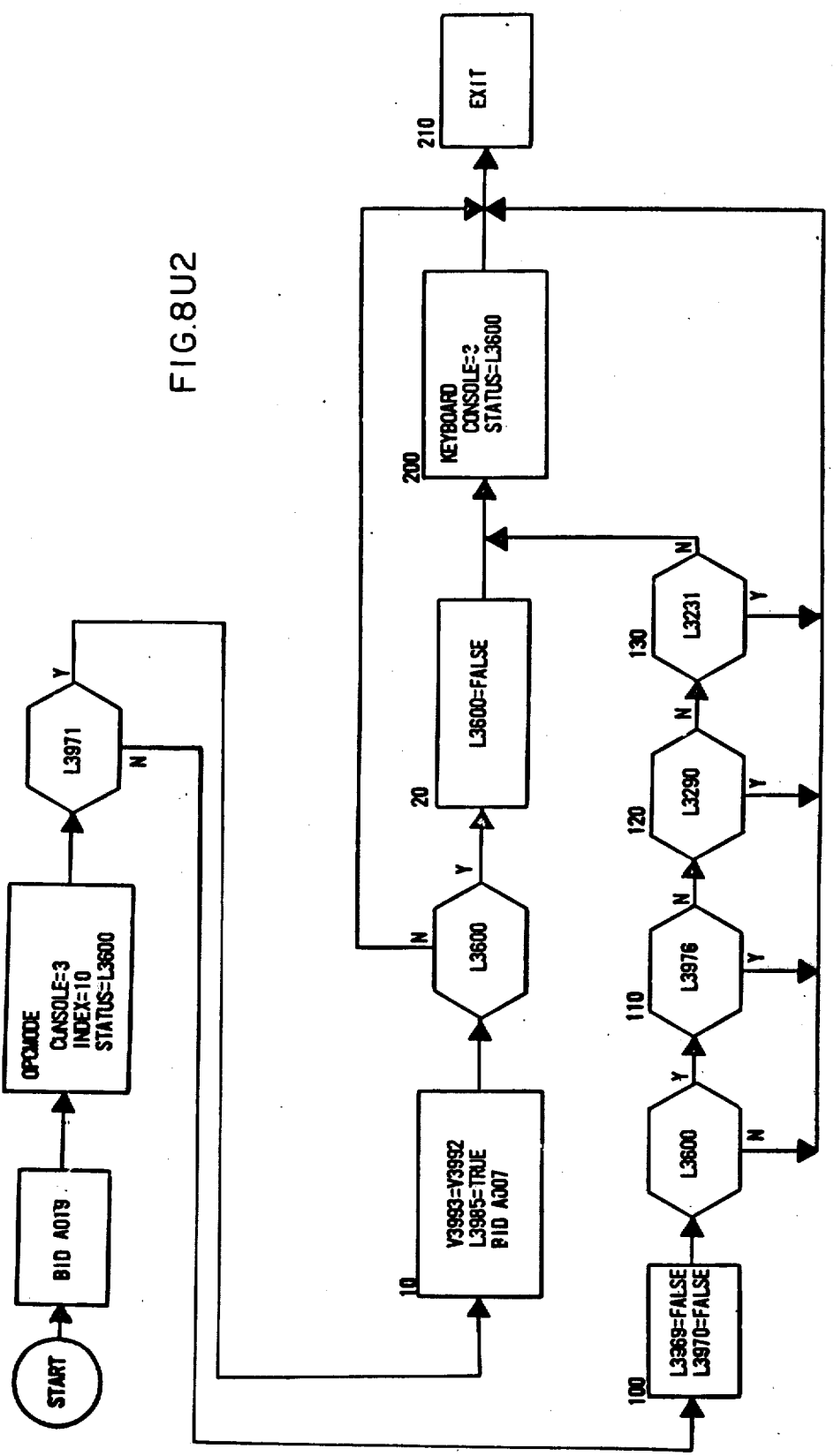
FIG.8U2

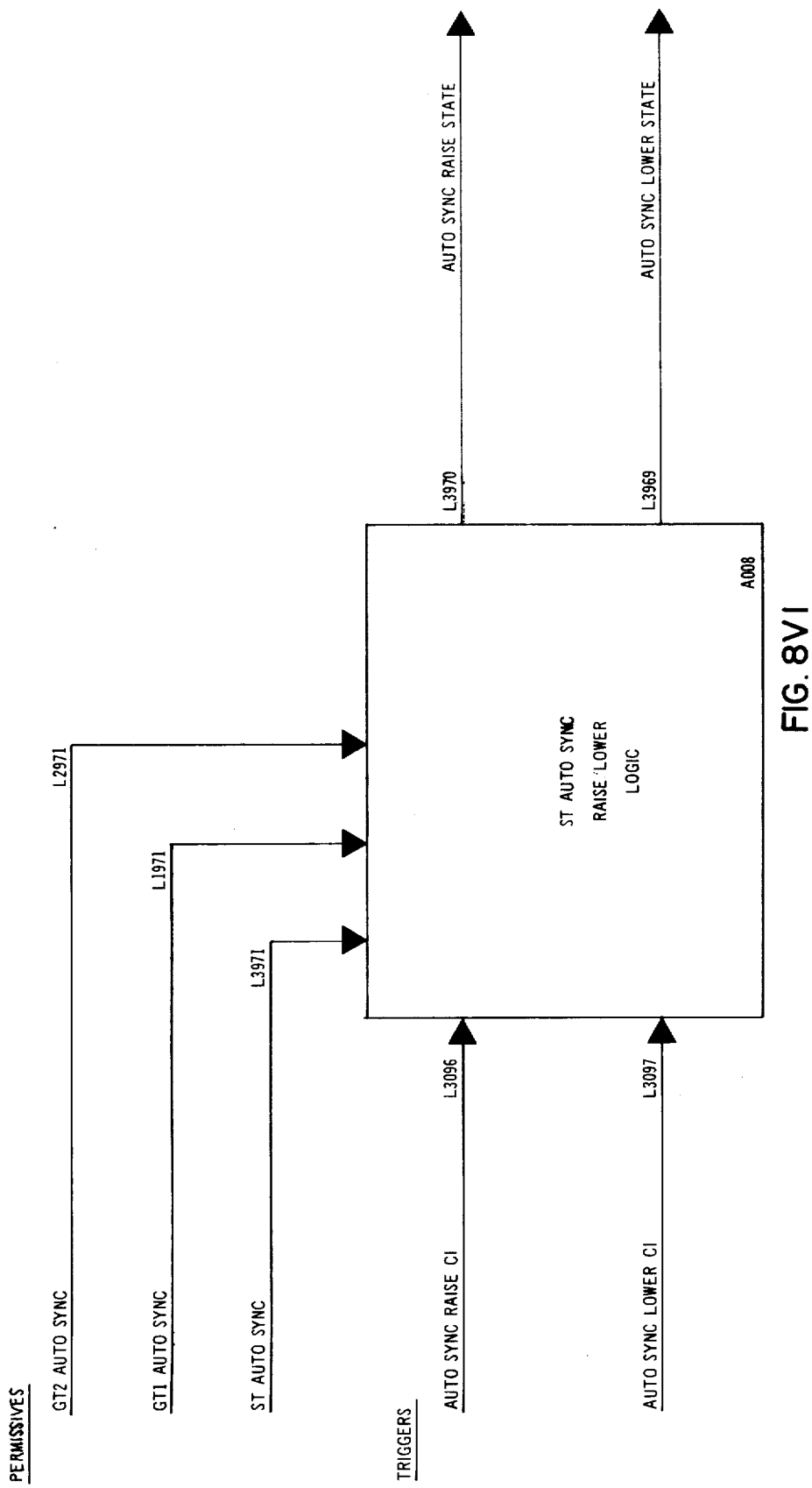

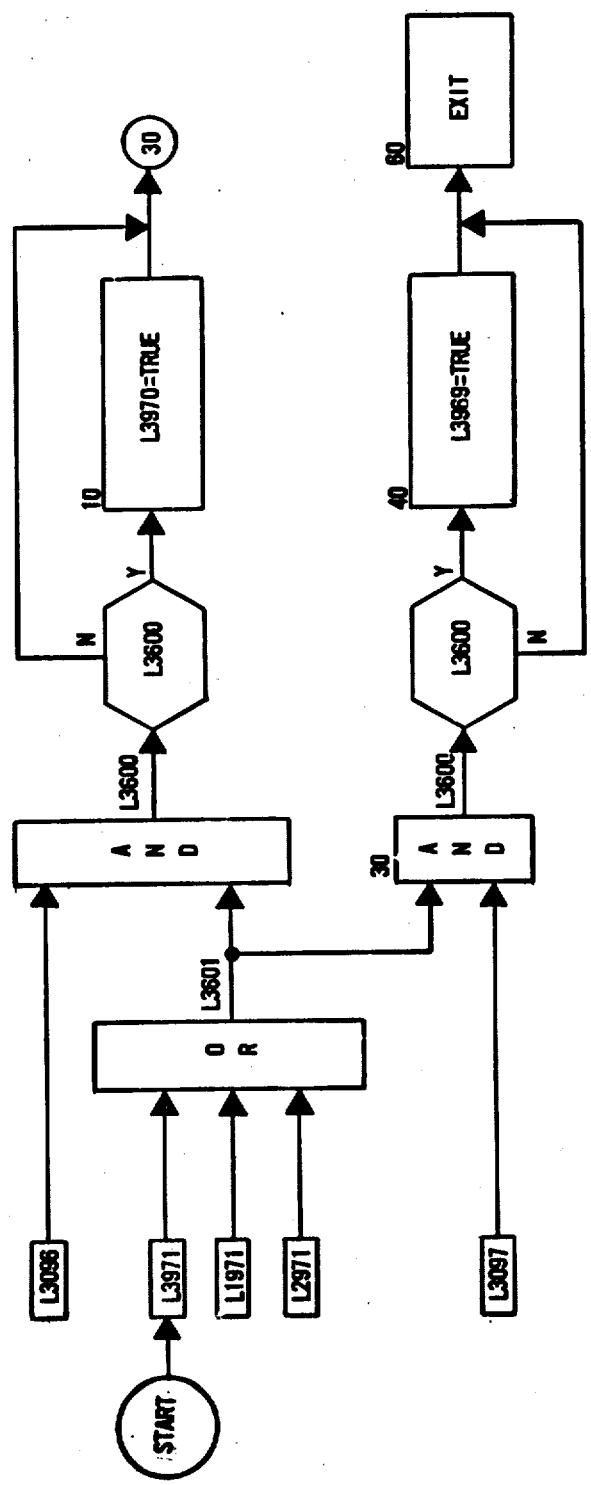
FIG. 8V2

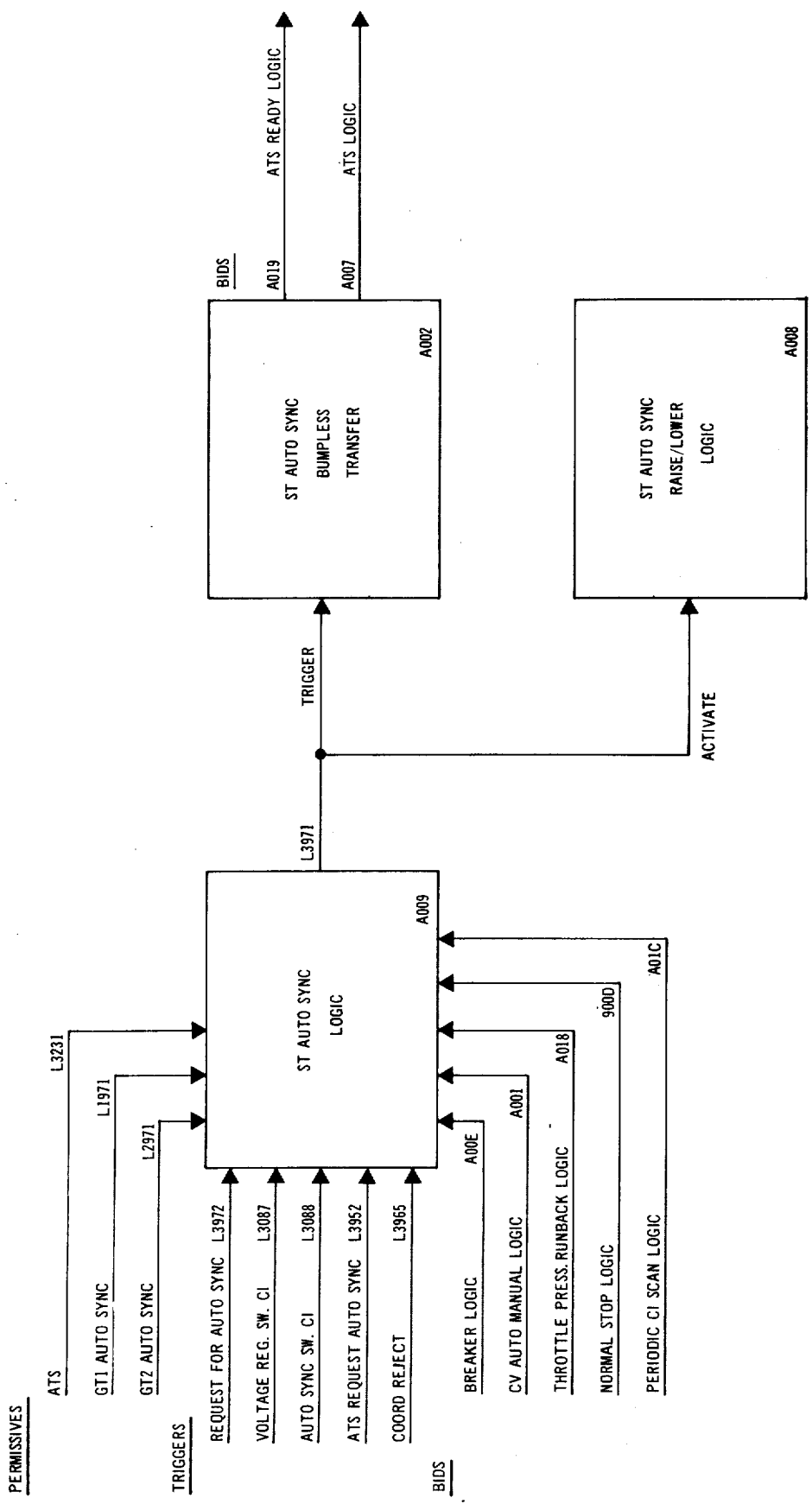

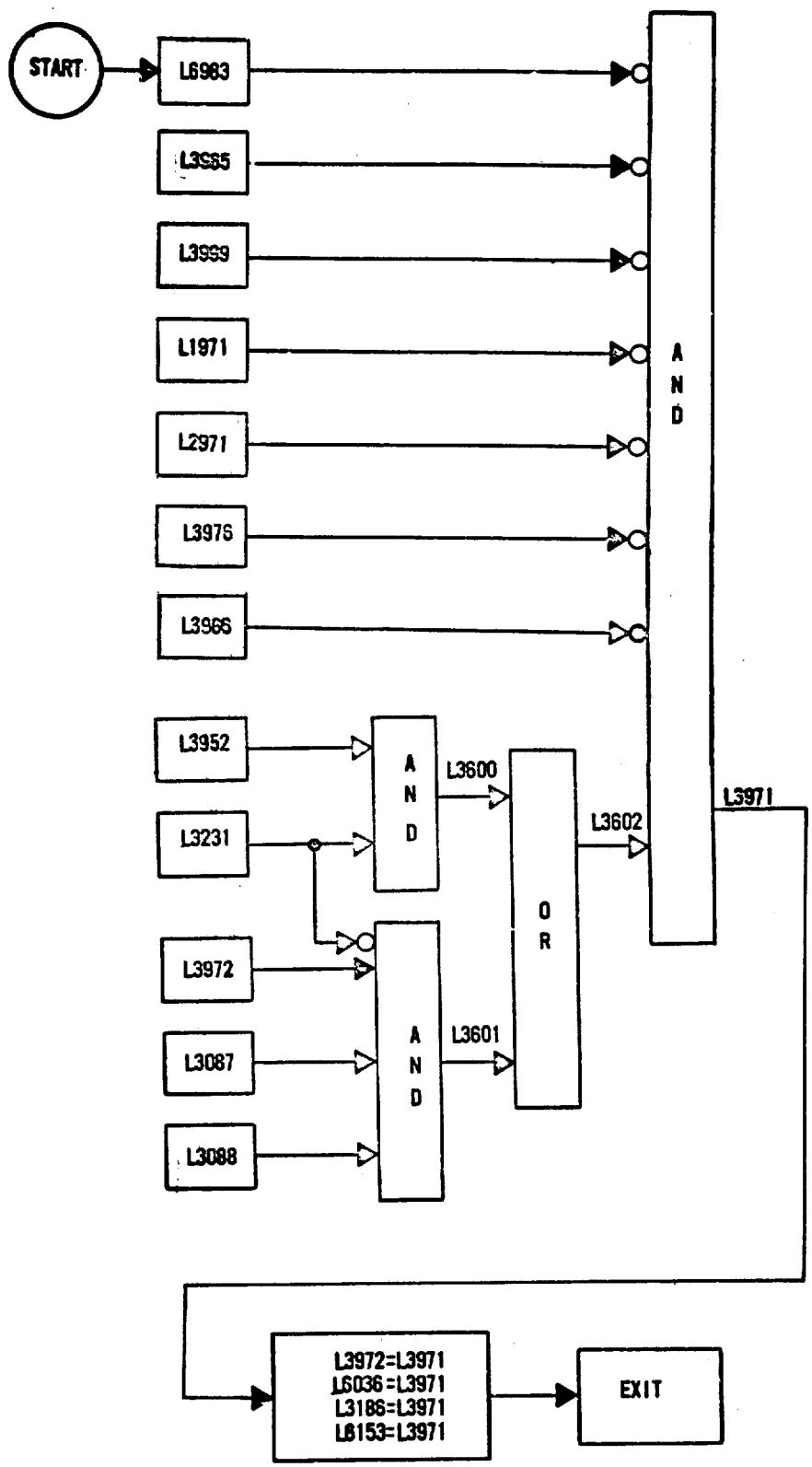
FIG. 8 W2

MANUAL/AUTOMATIC SYSTEM FOR SYNCHRONIZING MULTIPLE TURBINES IN A COMBINED CYCLE ELECTRIC POWER PLANT

CROSS-REFERENCE TO RELATED APPLICATIONS

Reference is made to the following patent applications:

1. Ser. No. 399,790, filed on Sept. 21, 1973 by L. F. Martz, R. W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control System Therefor", assigned to the present assignee and hereby incorporated by reference. 2. Ser. No. 319,114, filed by T. Giras and J. Reuther on Dec. 29, 1972 as a continuation of an earlier filed application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein.

3. Ser. No. 371,625, filed on June 20, 1973 by R. Yannone and R. A. Shields, entitled "Gas Turbine Power Plant Control Apparatus Having A Multiple Backup Control System", and assigned to the present assignee, and related cases referred to therein.

4. Ser. No. 495,765 filed concurrently herewith by Lyle F. Martz and Richard J. Plotnick, entitled "Combined Cycle Electric Power Plant Having A Control System Which Enables Dry Steam Generator Operation During Gas Turbine Operation", assigned to the present assignee and hereby incorporated by reference.

5. Ser. No. 99,491 entitled "System And Method Employing A Digital Computer For Automatically Synchronizing A Gas Turbine Or Other Electric Power Plant Generator With A Power System", filed by J. Reuther on Dec. 18, 1970 now abandoned and continued as Ser. No. 276,508 which was filed on July 31, 1972, and assigned to the present assignee.

6. Ser. No. 250,826 entitled "A Digital Computer Monitored And/Or Operated System Or Process Which Is Structured For Operation With An Improved Automatic Programming Process And System", filed by J. Gomola et al, on May 5, 1972, and assigned to the present assignee.

7. Ser. No. 495,728 filed concurrently herewith by J. F. Barrett and R. W. Kiscaden, entitled "Synchronization System For A Combined Cycle Electric Power Plant", and assigned to the present assignee.

BACKGROUND OF THE INVENTION

The present invention relates to turbine generator synchronizer systems and more particularly to synchronizer systems especially adapted for combined cycle electric power plants.

To synchronize a generator to a power system, the generator field is adjusted to obtain a voltage match and the prime mover is controlled to obtain a frequency and phase match before the breaker is closed. An automatic electronic synchronizer can be employed in conjunction with a turbine control system and a generator voltage regulator to generate the turbine speed, field setting and breaker closure signals, or an operator can perform manual synchronization by manually generating like control signals. Automatic digital computer synchronization can also be performed without a separate automatic synchronizer as set forth in the aforementioned copending application Ser. No. 276,508 or as set forth in another copending and coassigned patent application Ser. No. 408,962, entitled "System And Method For Starting, Synchronizing And Operating A Steam Turbine With Digital Computer Control", filed by T. C. Giras and R. Uram on Oct. 23, 1973 as a continuation of an earlier filed parent application.

In the startup of combined cycle electric power plants where multiple generators are interrelated through the energy conversion process and typically reach synchronization readiness at different times and often must be separately synchronized to different power lines, it is desirable to place a positive control on the synchronization process to achieve full plant automation. Multiple generators in a single power plant have been synchronized to common or different power lines sequentially from an operator panel through switching operations made at the panel, but generally those systems have involved generators driven by energy derived from a single cycle heat source. In the above reference patent application Ser. No. 495,728 there is disclosed an automatic synchronizer system which is employed in a combined cycle electric power plant like the plant disclosed in Ser. No. 399,790 and Ser. No. 495,765. The present patent application is directed toward a synchronizer system which provides an interface between a manual synchronizer system and an automatic synchronizer system like the referenced one and further to logic structure employed in the system to provide reliable and efficient turbinegenerator synchronization for the combined cycle electric power plant.

The description of prior art herein is made on good faith and no representation is made that any prior art considered is the best pertaining prior art nor that the interpretation placed on it is unrebuttable.

SUMMARY OF THE INVENTION

A combined cycle electric power plant includes a plurality of gas and steam turbines and associated generators and a control system for operating the turbines in the startup and load modes of operation. The control system further includes a synchronizer system in which means are provided for switchably connecting a synchronizer to close the breakers associated with the respective generators in a sequence determined in accordance with predetermined conditions. The synchronizer system also includes means for synchronizing the turbine-generators under operator control. Means are provided for interfacing the two synchronizer means, and a logic system is provided for interfacing the synchronizer system with the plant control and an operator panel.

DESCRIPTION OF THE PREFERRED EMBODIMENT

A. General Plant Description

Figure 1:
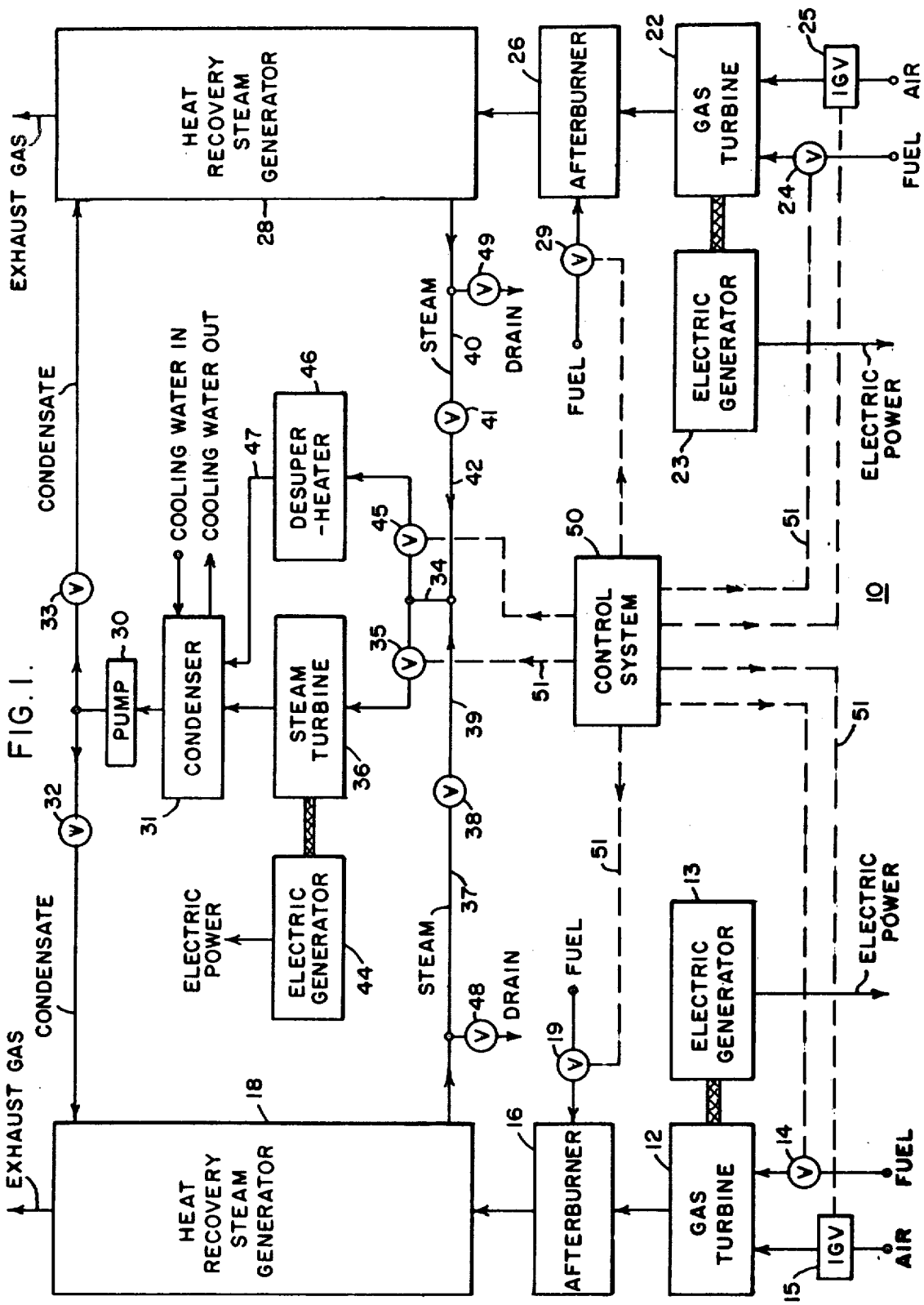
FIG. 1 shows a schematic view of a combined cycle electric power plant in which there is employed a gas turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 include a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through afterburner 16 and a heat recovery steam generator 18 and is thereafter exhausted into the atmosphere.

Heat recovery steam generator 18 and (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel controlvalve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. as a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. Gas Turbine Mechanical Structure

Figure 2A:
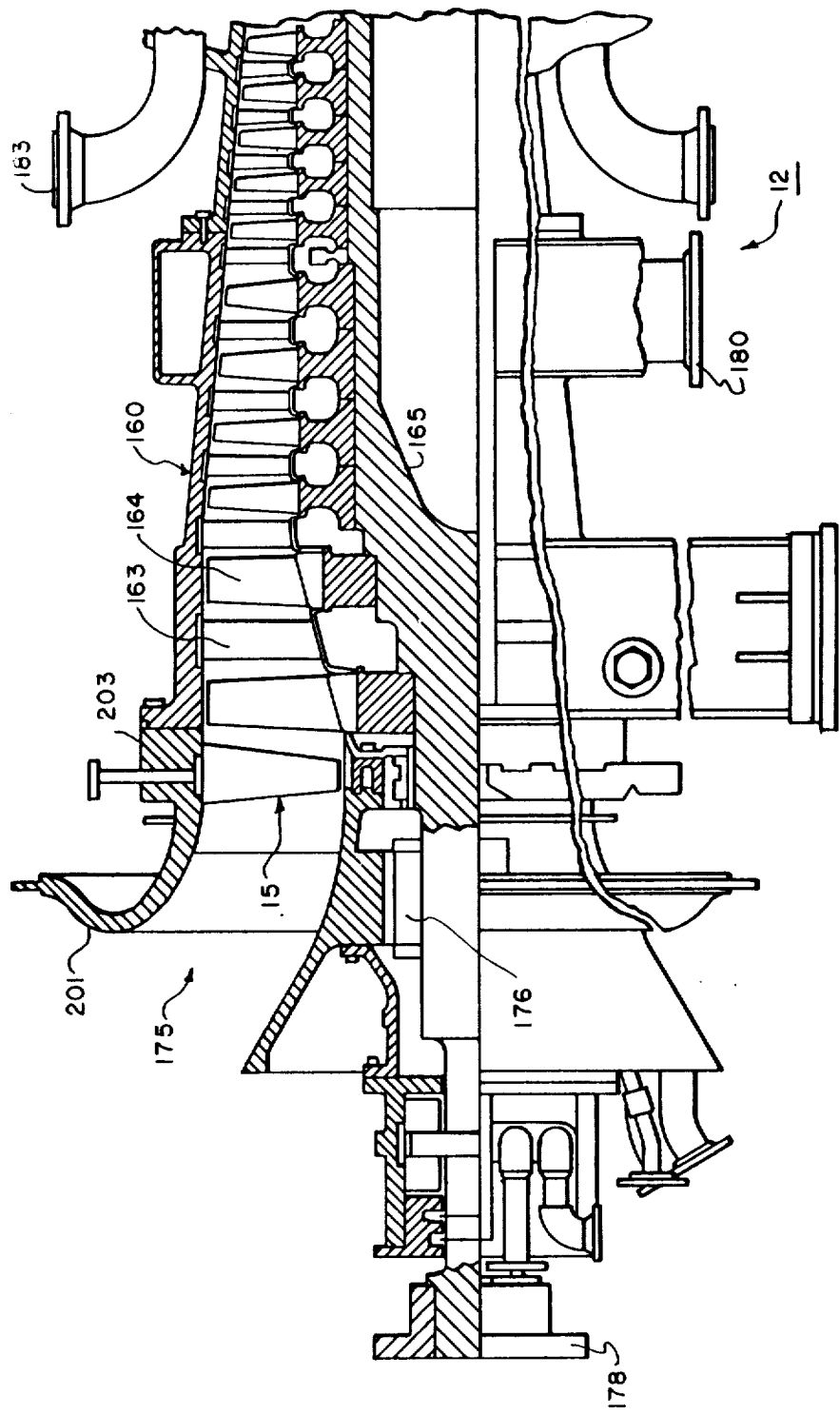
FIGS. 2A and 2B show a longitudinal section of a gas turbine structure which can be employed in the plant of FIG. 1.
Figure 2B:
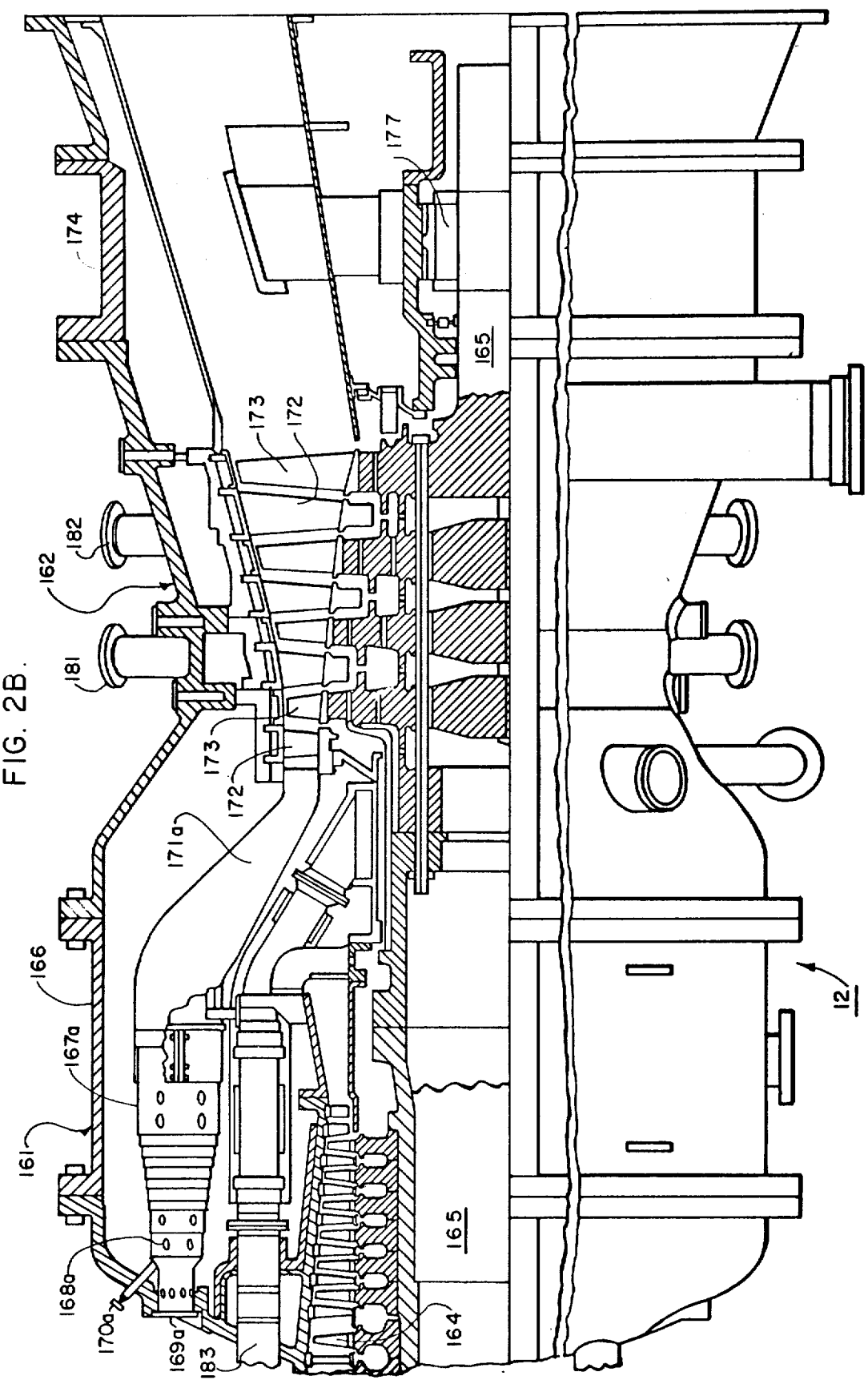

Referring now to FIGs. 2A and 2B, there is shown a longitudinal, partially cross-sectional, elevational view of the No. 1 gas turbine 12. FIG. 2A shows the left-hand half of the view and FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pennsylvania. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a –167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting the high temperature, high pressure gas is supplied by way of a combustor outlet duct 171a to the inlet of the turbine section 162.

The turbine section 62 is a four stage turbine having interspersed sets of stationary blades 172 and rotary blades 173, the latter being located on the rotor structure 165. The high temperature high pressure gas from all of the combustors 167a –167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure high temperature zone. The electric generator 13 is coupled to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to Ser. No. 495,765.

C. Steam Turbine Mechanical Structure

Figure 3:
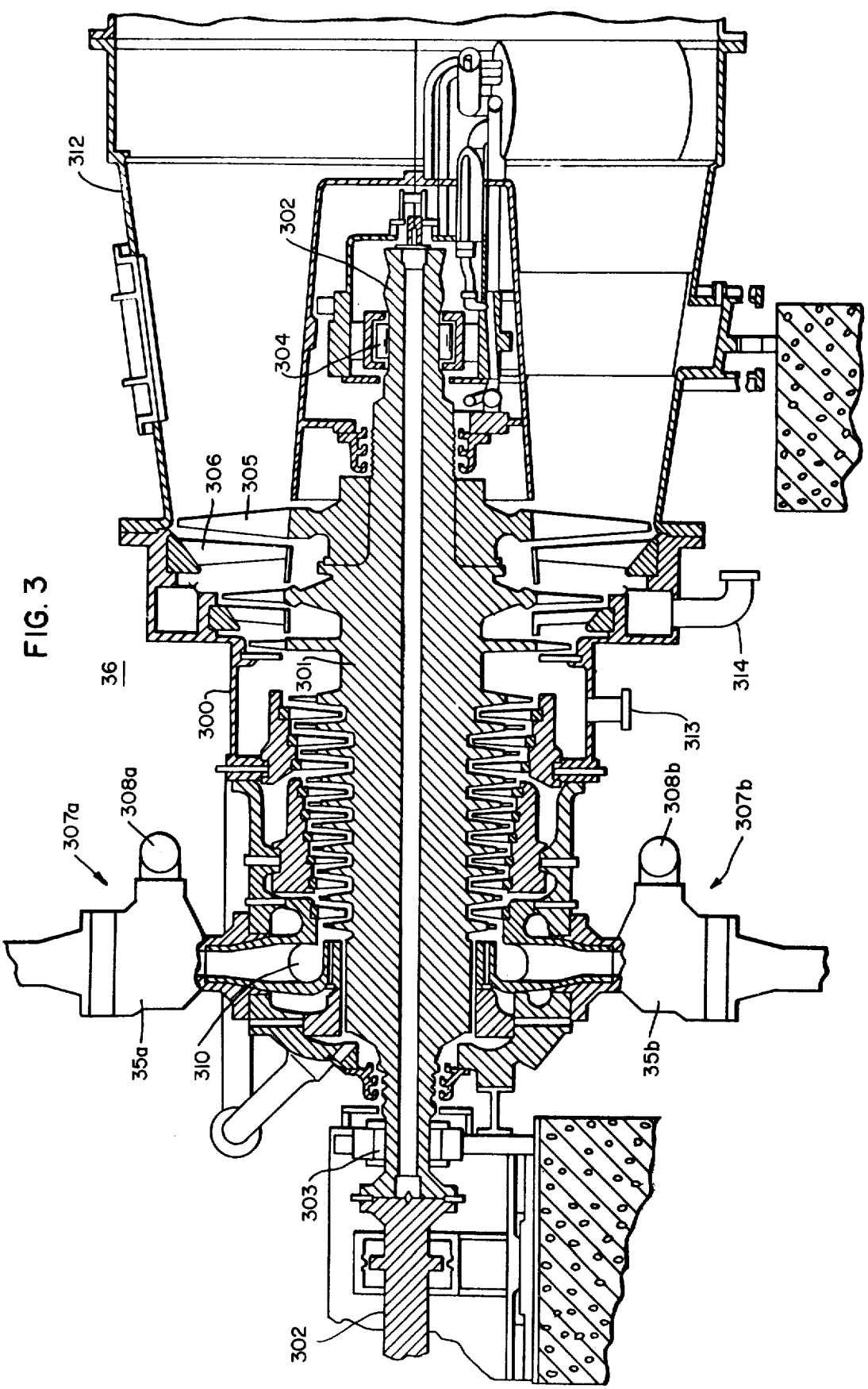
FIG. 3 shows a longitudinal section of a steam turbine structure which can be employed in the plant of FIG. 1.

Referring now to FIG. 3, there is shown a longitudinal, partially cross-sectional, elevational view of the steam turbine 36. Steam turbine 36 is a 13-stage single-cylinder or single-element non-reheat type of steam turbine constructed for operation at a rated speed of 3,600 rpm and is capable of driving an electric generator for producing in excess of 107 megawatts of electrical power. The steam turbine 36 includes an outer casing 300 and an inner rotor structure 301 having a rotor shaft 302 which is supported at the high pressure end of the turbine by a bearing 303 and at the exhaust end of the turbine by a bearing 304. The load being driven, in this case, the electric generator 44, is coupled to the high pressure end of the shaft 302. Thirteen sets of rotor blades 305 are mounted on the rotor structure 301, while thirteen intervening sets of stationary blades 306 are supported by the casing 300.

Mounted on top of the casing 300, at the high-pressure end thereof, is an upper steam inlet valve assembly 307a which includes a steam stop valve 308a followed by a steam control valve 35a. Attached to the bottom of the casing 300 is a second steam inlet valve assembly 307b which includes a steam stop valve 308b followed by a steam control valve 35b. For the sake of cross-reference, control valves 35a correspond to the control valve 35 shown in FIG. 1. Steam enters by way of the stop valves 308a and 308b (which are open during normal turbine operation), passes through control valves 35a and 35b and feeds into a 360° steam inlet or steam admission chamber 310 in the casing 300. In other words, there is a 100% arc of steam admission and both of the control valves 35a and 35b communicate with this arc. During normal operation, both of the valve assemblies 307a and 307b are operated in unison to function like a single valve assembly. When desired, either of the valve assemblies 307a and 307b may be tested while the steam turbine 36 is in operation.

The greater bulk of the steam passes through the various sets of rotary and stationary blades 305 and 306 and leaves the steam turbine 36 by way of an exhaust structure 312, the outer end of which is coupled to the duct leading to the condenser. Some of the steam is extracted from the turbine 36 between the tenth and eleventh stages thereof by way of an extraction steam outlet 313. As will be seen, this extraction steam is supplied to the deaerators associated with the steam generators 18 and 28 for providing some of the feedwater heating performed in such deserators 68 and 90. This extraction steam feedwater heating is typically employed for plant loads of 80% or more. A portion of the steam is also removed between the 12 and 13 stages by way of outlet 314 and passed directly to the condenser. This so-called "internal water removal" provides a turbine end loading which is less than the maximum allowable.

The steam turbine 36 is constructed to utilize incoming steam having a pressure of approximately 1200 pounds per square inch and a temperature of approximately 950° Fahrenheit. The height of the rotor blades 305 in the last row or set at the exhaust end of the turbine 36 is 28.5 inches, this being a measure of the flow capacity of the steam turbine 36. The steam turbine 36 is capable of driving an electric generator to produce in excess of 107 megawatts of electrical power. The steam turbine 36 is designed for grade level installation with a turbine centerline elevation of approximately 10 feet.

D. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 4:
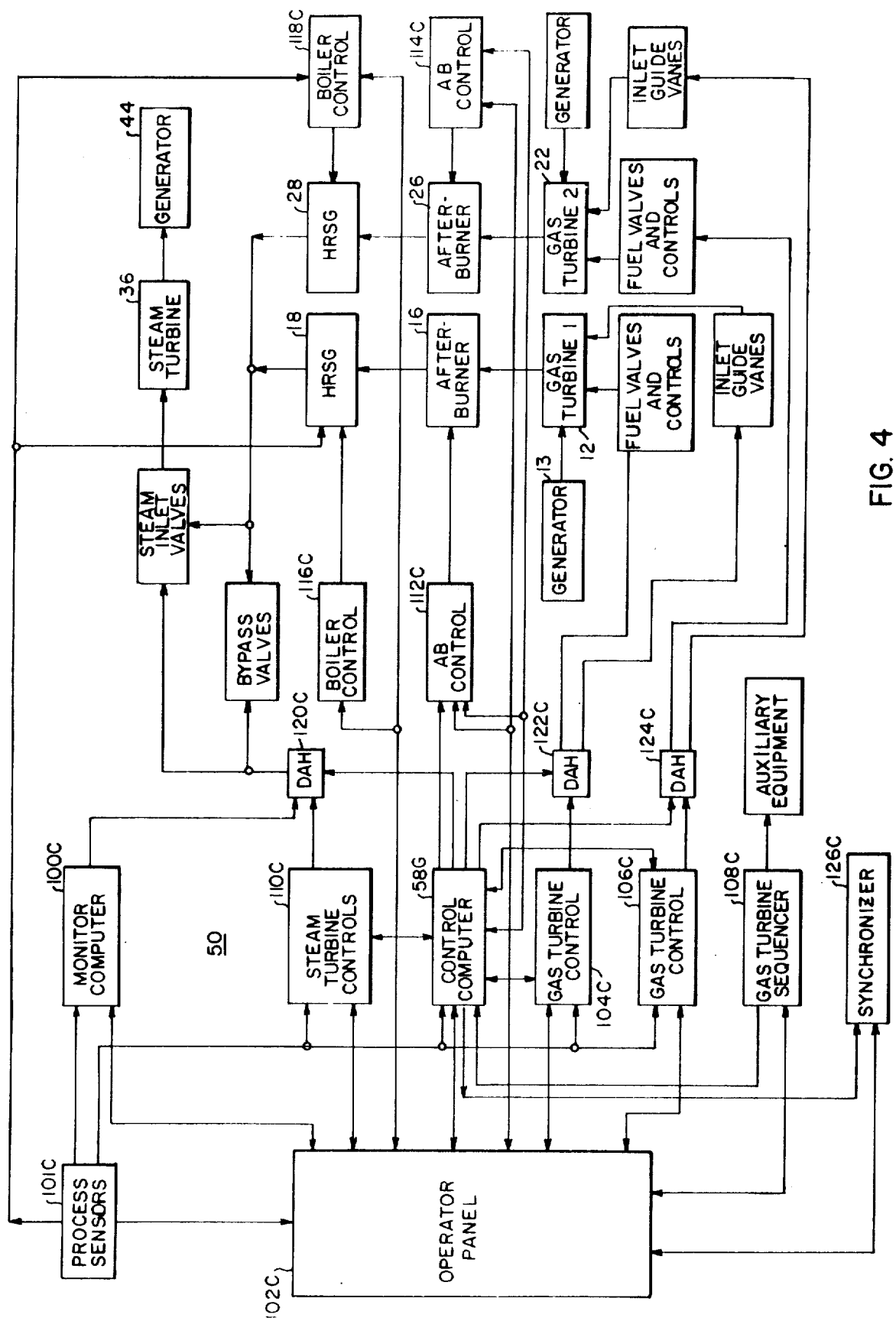
FIG. 4 shows a schematic view of a control system arranged to operate the plant of FIG. 1 in accordance with the principles of the invention.

As shown in FIG. 4, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started with minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

E. Plant Synchronizer System

Figure 5A:
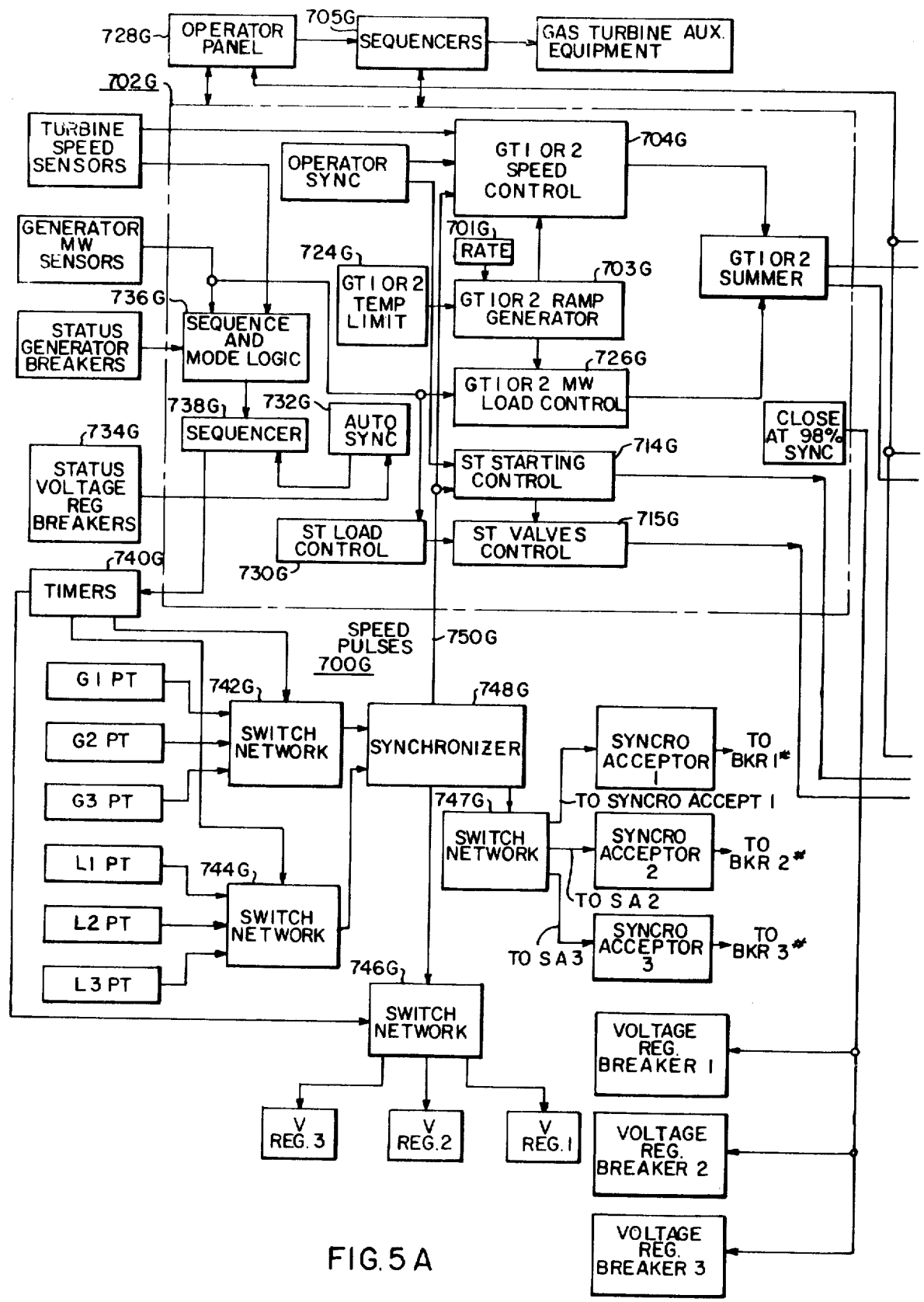
FIG. 5 shows a schematic diagram of the plant control system with elements of a synchronizer system illustrated to indicate more particularly the preferred manner of embodying the invention.
Figure 5B:
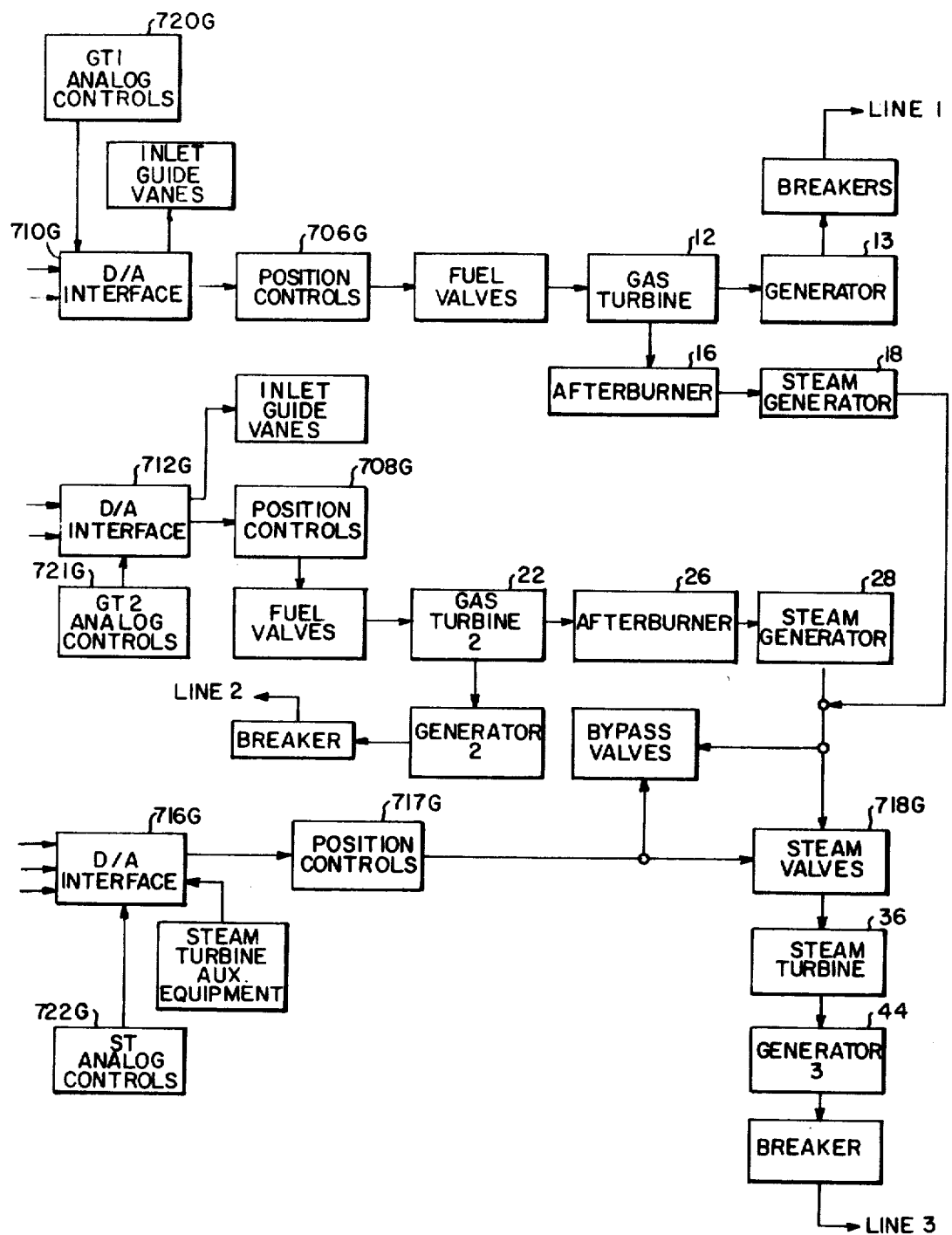
Figure 6:
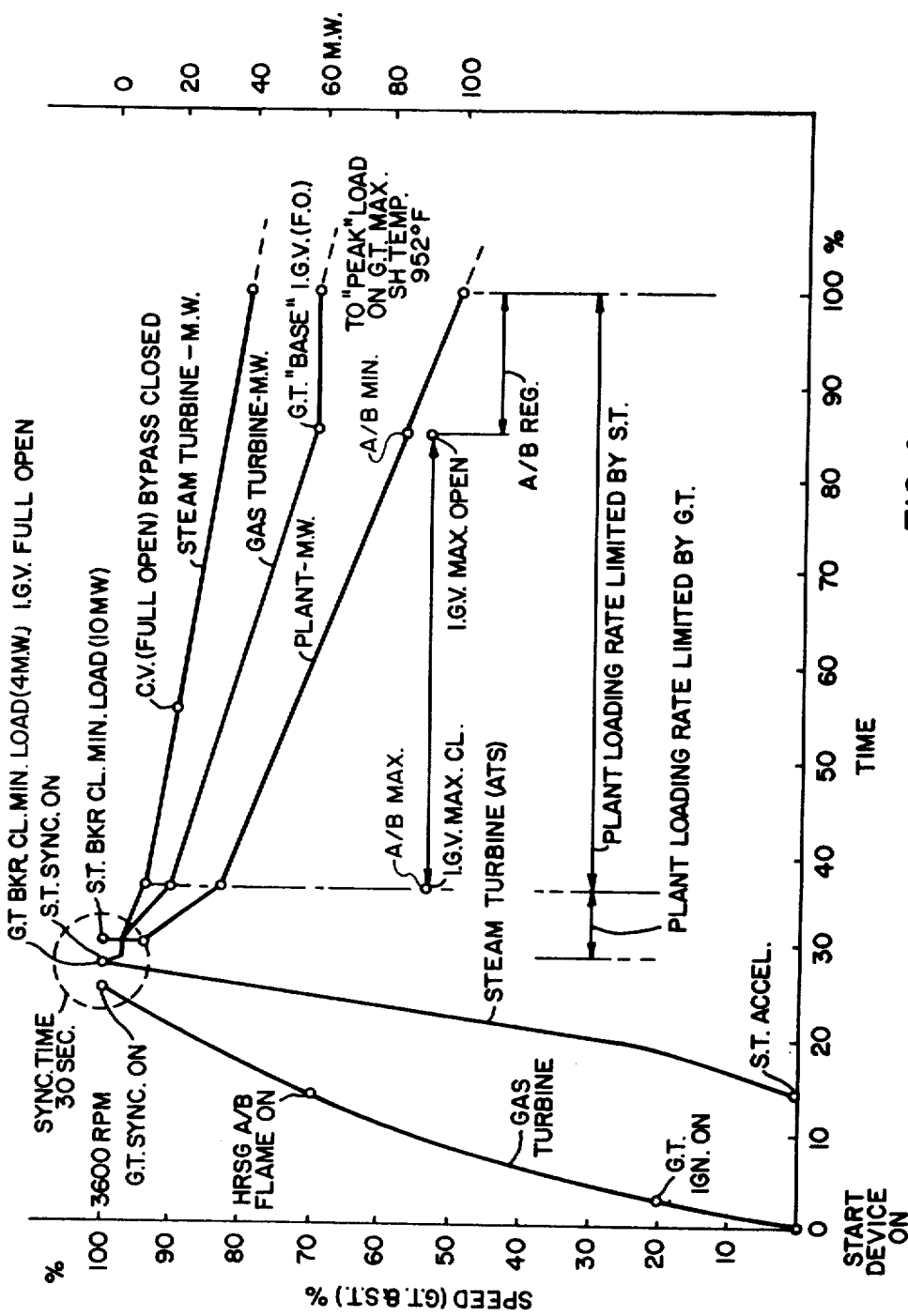
FIG. 6 shows a schematic sequence chart for plant operations.
Figure 7A:
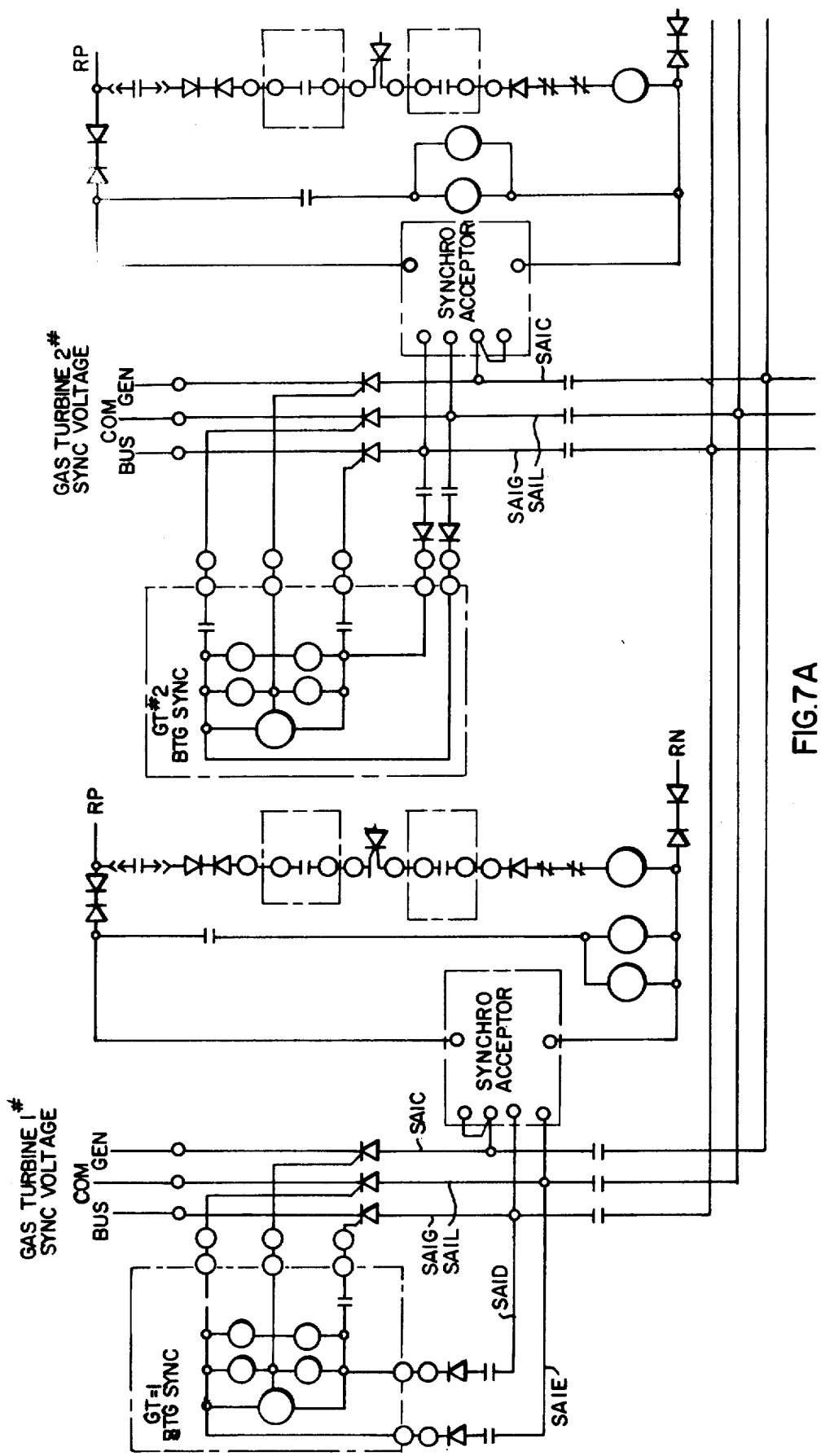
FIGS. 7A-7D show a schematic diagram of synchronizer circuitry employed in the control system.
Figure 7B:
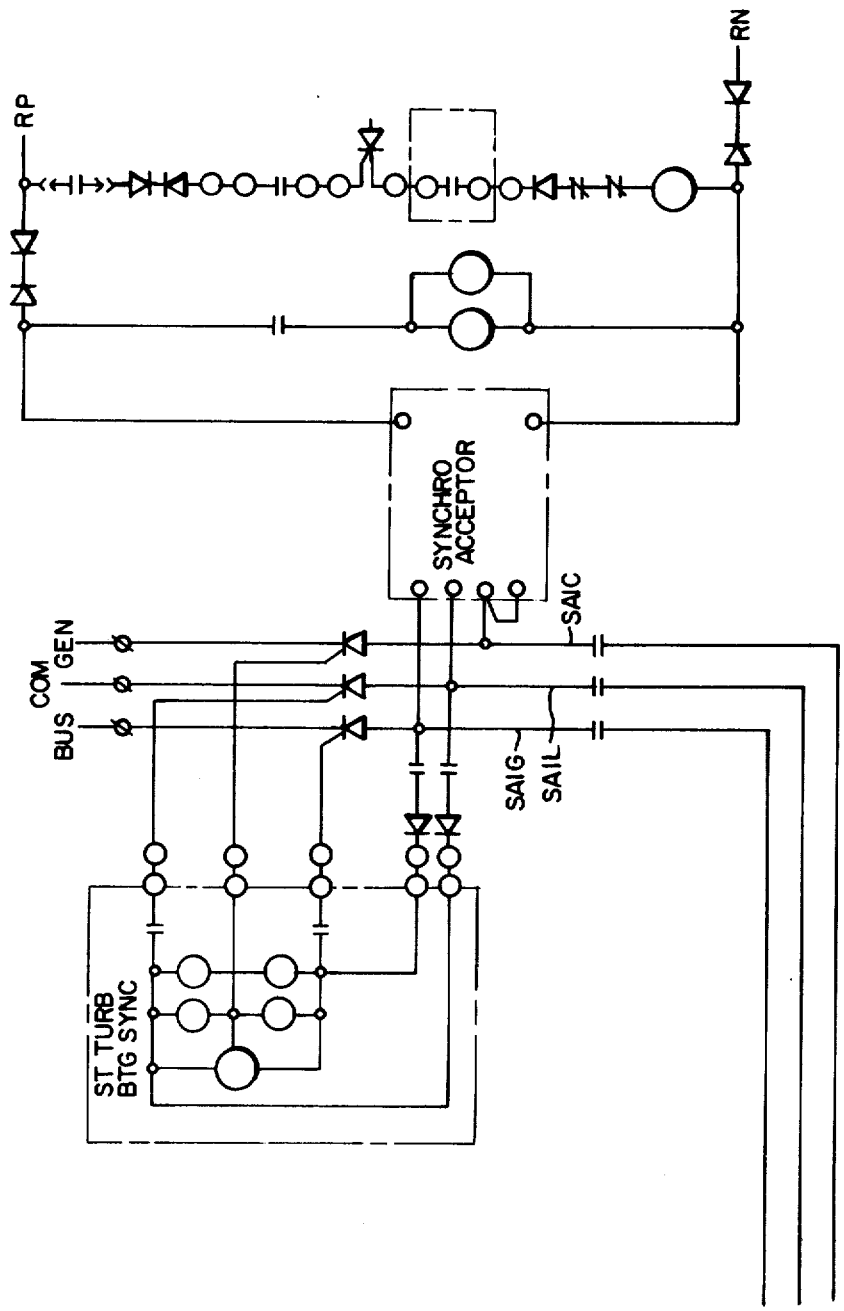
Figure 7C:
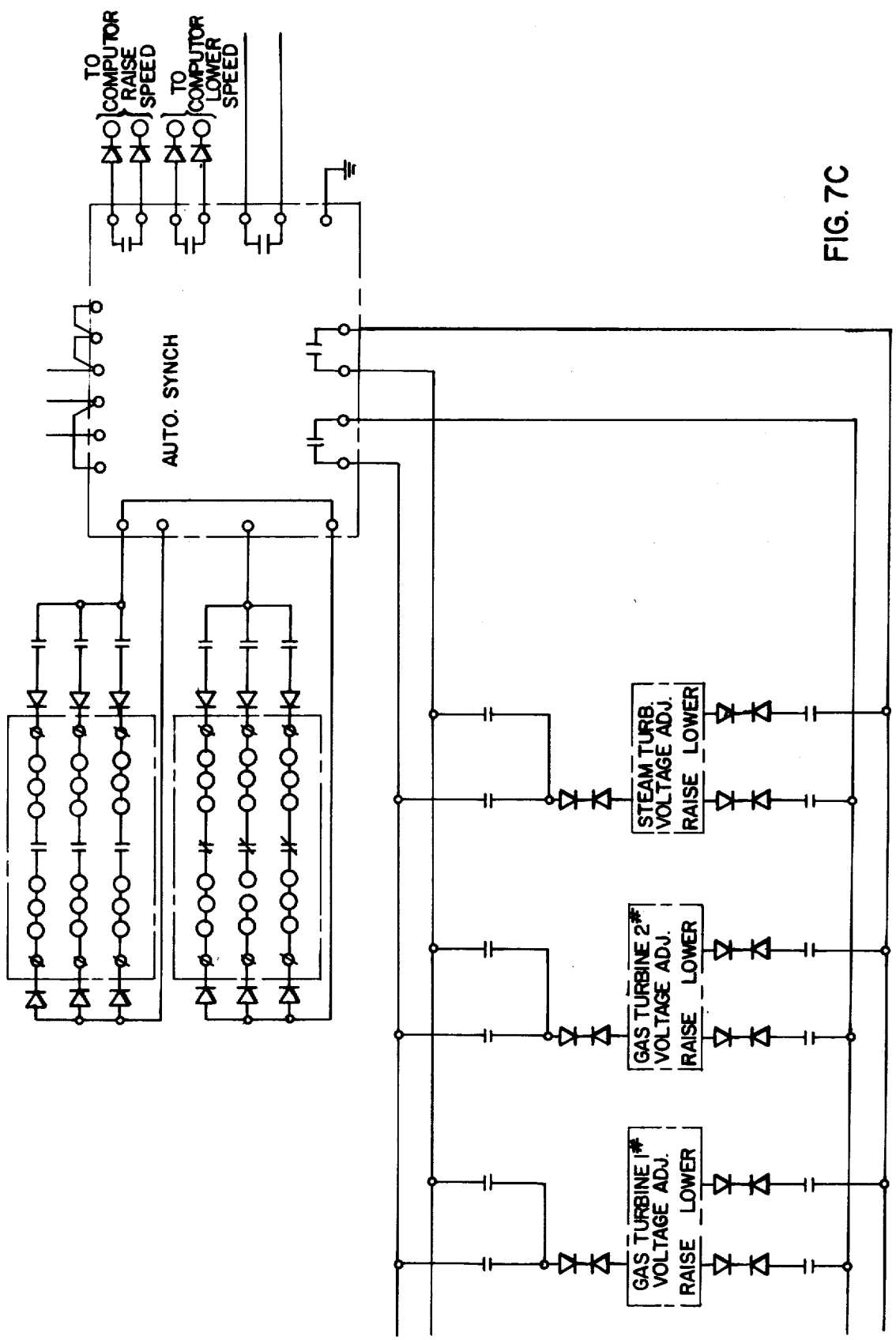
Figure 7D:
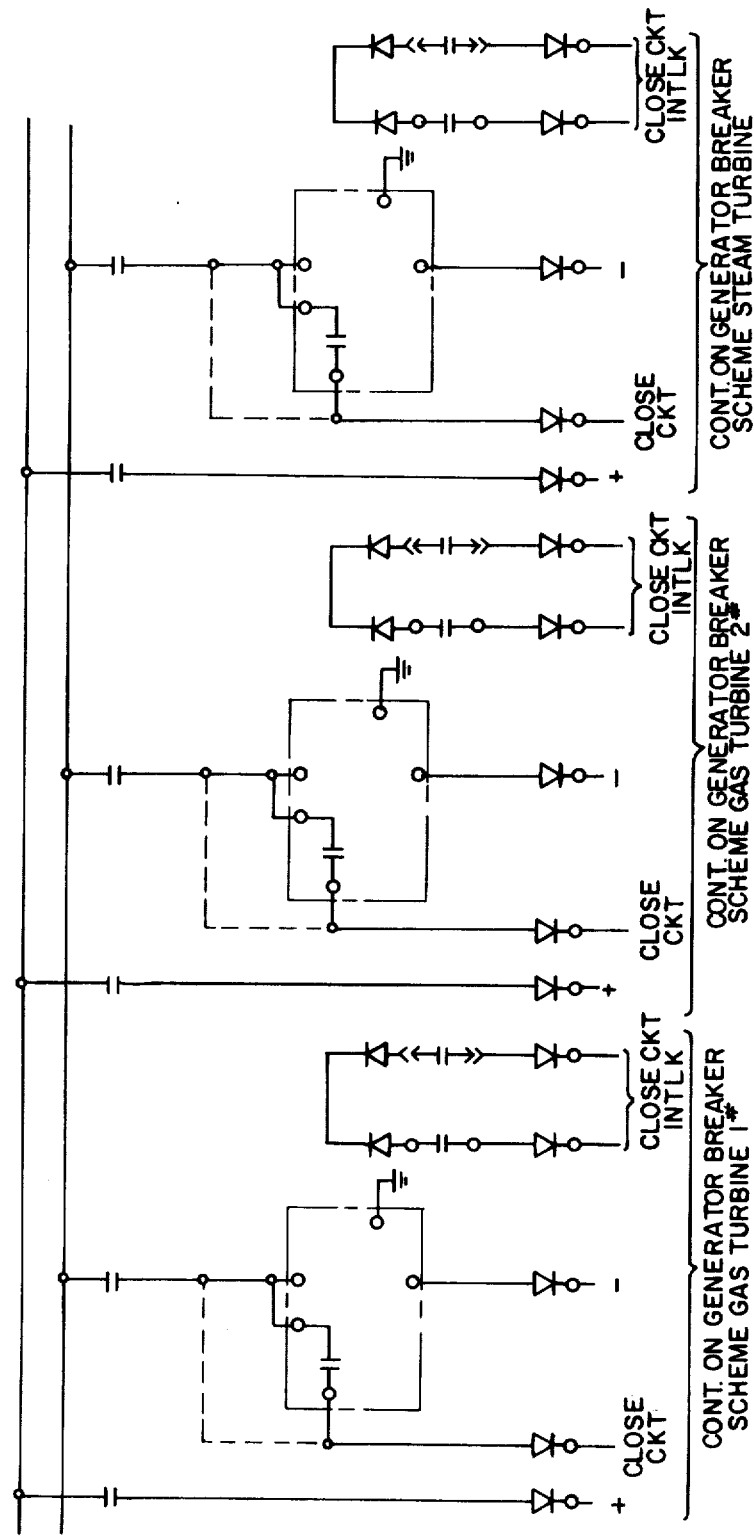

As shown in FIGS. 5A and 5B, the control system 50 includes a synchronizer system 700G which is preferably partly embodied in a digital computer system 702G and partly in external circuitry. In the combined cycle electric power plant sequence, as illustrated in FIG. 6, the plant is operated to a hot standby condition and the two gas turbines are then started. Shortly thereafter, the steam turbine is started as the gas turbines continue to be accelerated toward synchronous speed. Within a time frame of several minutes, all of the generators normally reach a speed near the synchronous value and the synchronizer system 700G sequentially synchronizes the generators, closes the generator breakers and minimally loads the turbines through the speed/load controls, and then the turbine speed/load controls proceed to load the gas and steam turbines to produce the selected plant load up to a maximum value. The entire plant sequence normally takes about one hour, i.e. the plant can move from hot standby to rated output of about 260 megawatts in one hour. If the plant configuration is other than normal, for example if one of the turbines is down, the automatic plant sequence is made as required by the plant configuration change. If the operator selects any mode other than the coordinated control mode, the plant synchronization sequencing is placed under operator direction for all plant configurations.

In this case, the digital computer system 702G comprises two separate computers including the computer 58G in which most of the control programs reside as well as a second like computer (not separately shown in FIG. 5) in which the steam turbine automatic programs reside along with data monitoring and other programs. To start each gas turbine 12 or 22 under acceleration control, a digital startup speed control 704G operates with a digital reference generator 703G and a fuel reference block 701G to generate a computer output fuel demand which is applied to a fuel valve position control 706G or 708G through a digital/analog hybrid interface 710G or 712G. Like sequencers 705G start and stop gas turbine auxiliary equipment during the startup process.

The startup speed control 704G functions in a speed feedback control loop during gas turbine startup, i.e. a speed reference from the reference generator 703G is compared to the actual gas turbine speed and the error is acted upon by a controller. The rate block 701G controls the turbine speed profile during startup by controlling the rate at which the reference generator increases the speed reference from the ignition speed of 900 rpm toward the synchronous value.

At the end of the acceleration ramp, the gas turbine comes to a state called Run Standby. In this state, the gas turbine is at about 3600 rpm and is ready to be synchronized. In the operator automatic mode, the Run Standby state is automatically selected by the software until Run Standby is attained. At that time, the operator may select one of the loading states and initiate the synchronizing procedure. When operating at the plant coordinated level, the plant coordination control selects the loading rate and initiates synchronizing at the proper time. During the time the turbine is in Run Standby, the speed is held at synchronous speed by the speed controller.

In gas turbine load control, a load demand is applied to the reference generator 703G which generates a feedforward load reference which is output as a fuel valve position demand if MW trim correction is disconnected. With MW trim correction, the load reference is modified by the correction and the corrected reference is output as a valve position demand.

An automatic startup control 714G is also provided for the steam turbine 36. It operates with a valve control 715G to generate computer output sequencing signals and valve position signals which are applied through another digital/analog hybrid interface 716G to position controls 717G for turbine inlet and bypass valves 718G and to various auxiliary equipment items.

Gas turbine analog controls 720G and 721G and steam turbine analog controls 722G provide backup startup control in the event the automatic computer control is unavailable for startup or in the event the operator selects a particular turbine for backup control while the remaining turbines are kept in coordinated or operator automatic control. As the turbines are operated during startup, various afterburner and boiler controls (not shown) are operative as more fully disclosed along with more detailed turbine control disclosure in the aforementioned patent application Ser. No. 495,765 and other related cases referenced therein. For more detail on automatic steam turbine startup control like that referred to herein, reference is made to a copending and coassigned patent application Ser. No. 408,962 entitled "System and Method for Starting, Synchronizing and Operating A Steam Turbine With Digital Computer Control38 filed by T. C. Giras, et al on Oct. 23, 1973 as a continuation of earlier filed applications and hereby incorporated by reference.

After synchronization of each gas turbine, digital temperature and fuel flow controls 724G and 726G function in conjunction with pushbutton controls on an operator panel 728G and the digital reference generator 703G to generate power equal to a reference megawatt demand or equal to a megawatt value permitted by temperature control under base or peak load operation. In load operation of the steam turbine, a load control 730G operates through the valve control 715G to operate the steam bypass and steam turbine inlet valves until the turbine is loaded to the point where the bypass valves are closed and the turbine inlet valves are wide open with the turbine operating in a boiler follow mode. The turbine backup controls 720G, 721G and 722G also provide backup control in the load mode, and they further provide some protective control actions even during the automatic mode of operation. For more detail on the control system structure and operation in the load control mode, reference is made to the aforementioned Ser. No. 495,765.

Figure 9A:
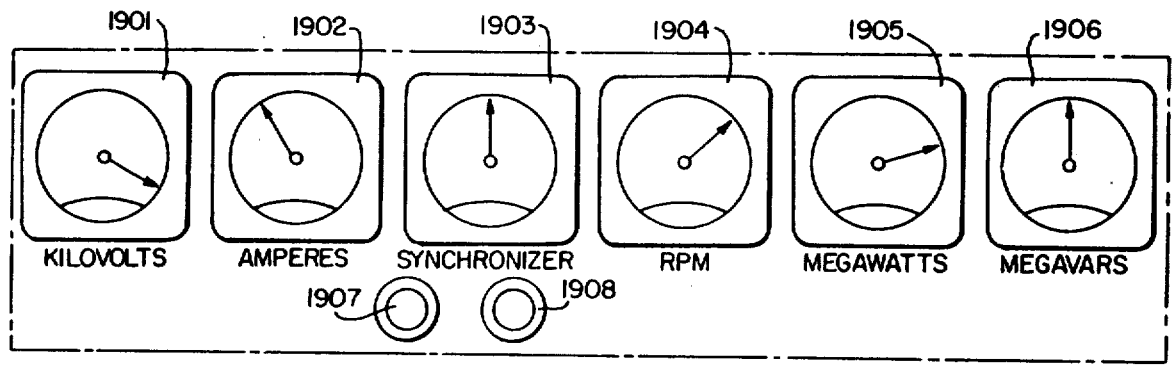
FIG. 9 shows portions of an operator control panel related to the synchronizer system.
Figure 9B:
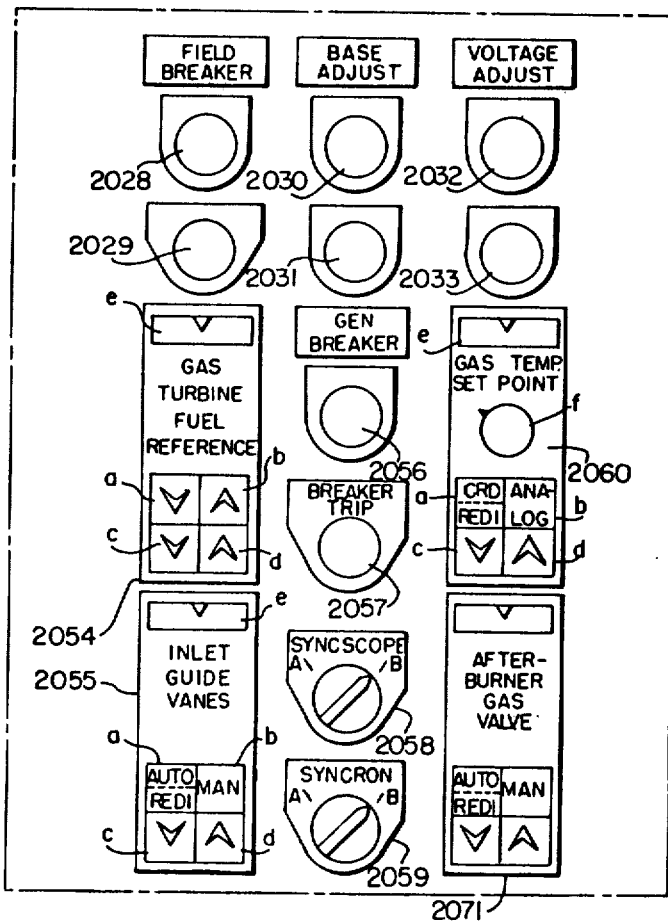

The sequencer system 700G functions during the transition from the startup mode to the load mode. Thus, an automatic synchronizer logic block 732G generates an output which enables the system for the automatic synchronization mode for each turbine when automatic synchronization and automatic field voltage regulator switches on the operator panel (FIGS. 9A and 9B) have been actuated and when the voltage regulator breaker for that turbine is closed as indicated by a contact closure from a block 734G. In this case, each voltage regulator breaker closes when its generator reaches 9% of synchronous speed.

The first gas turbine to reach 98% synchronous speed is the first turbine placed under automatic synchronizer system control by a sequence and mode logic block 736G if it has reached that value within a predetermined acceleration time interval which is a preselected value such as 13 minutes. If both gas turbines attain synchronous speed substantially simultaneously, the gas turbine 12 is synchronized first. If the first gas turbine or any other turbine fails to reach synchronous speed from the turbine start time, i.e. from the gas turbine ignition time or from the steam turbine control valve opening time, within its prescribed time interval as detected by a timer in the block 736G, it is rejected from the automatic synchronizer sequence and the next turbine is automatically processed by the sequencer system 700G. The allowed steam turbine acceleration interval is a value such as nine minutes. An alarm is communicated for any rejected turbine so that the operator can determine whether there is some equipment fault or whether the rejected turbine simply must be manually synchronized.

During manual synchronizing, the operator matches the turbine generator frequency to line frequency by adjusting the speed demand from a block 737G to the speed control 704G through the operator panel 728G. The changing of the speed reference input causes the reference to move slowly toward the demand. As this occurs the generator and the line slip through synchronism and the breaker can be closed.

The control digital computer 58G is not used when the control system equipment is being operated at either of the lower two levels of control. In other words, when any one of the major plant apparatus groups is operated at either the operator analog control level or the manual control level, then the control digital computer 58G does not participate in the operation of such apparatus group.

The following items relate to the voltage regulator associated with the electric generator:

| Item | Legend |
|---|---|
| 2026 | REGULATOR OUTPUT (voltage meter) |
| 2027 | VOLTAGE REGULATOR (automatic/manual selector switch) <br> A = AUTO (automatic) <br> B = MAN (manual) |
| 2028 | FIELD BREAKER CLOSED (pushbutton switch) |
| 2029 | FIELD BREAKER TRIP (pushbutton switch) |
| 2030 | BASE ADJUST RAISE (pushbutton switch) |
| 2031 | BASE ADJUST LOWER (pushbutton switch) |
| 2032 | VOLTAGE ADJUST RAISE (pushbutton switch) |
| 2033 | VOLTAGE ADJUST LOWER (pushbutton switch) |

The voltage regulator energizes the exciter 54 which, in turn, energizes the direct-current field windings on the rotor of the electric generator 13. Thus, the magnitude of the alternating-current voltage generated by the generator 13 can be adjusted by adjusting the output of the voltage regulator. As part of the process of bringing the electric generator 13 into synchronization with the electric utility system preparatory to a closing of the main generator circuit breaker, the voltage regulator output is adjusted until the magnitude of the voltage generated by the electric generator 13 is of the proper magnitude to produce across the secondary windings of the main power transformer 123 a voltage magnitude substantially equal to the magnitude of the utility system voltage. If the voltage regulator automatic/manual selector switch 2027 is set to the automatic position (position A), then this matching of the generator voltage to the utility system voltage is accomplished automatically by the automatic synchronizer system without need for manipulation by the plant operator of the remainder of the voltage regulator associated pushbutton switches 2028-2033. If, on the other hand, the voltage regulator selector switch 2027 is set to the manual position (position B), then manual manipulation of these pushbuttons 2028–2033 is required.

Considering in more detail the case of manual voltage matching (switch 2027 at position B), the plant operator is first required to close the voltage regulator circuit breaker ("field breaker") by momentarily depressing the pushbutton switch 2028. This causes the voltage regulator to energize the exciter which, in turn, energizes the field windings on the generator 13. This voltage regulator circuit breaker is normally closed after the gas turbine 12 has accelerated to a speed in excess of 3300 rpm. In the automatic mode, these breakers are automatically closed at the 3300 rpm level. With the voltage regulator circuit breakers closed, the horizontal meter 2026 gives an indication of the degree of mismatch between the generator 13 voltage and the utility system voltage. The plant operator then manipulates the "BASE ADJUST" and "VOLTAGE ADJUST" pushbuttons 2030–2033 so as to reduce this mismatch substantially to zero. The "BASE ADJUST" pushbuttons 2030 and 2031 provide a coarse adjustment of the generator voltage. The "VOLTAGE ADJUST" pushbuttons 2032 and 2033, on the other hand, provide a fine adjustment of the generator voltage. Depressing a raise pushbutton (2030 or 2032) increases the magnitude of the voltage generated by generator 13, while depressing a lower pushbutton (2031 or 2033) decreases the magnitude of the voltage generated by the generator 13.

The setting of the VOLTAGE REGULATOR selector switch 2027 to the automatic position (position A) is a necessary prerequisite or permissive to the operation of the gas turbine control circuits at the plant coordinated control level. With plant coordination, the synchronizer system 700G automatically becomes functional when synchronizations are to be performed in the plant startup.

Once a particular turbine-generator is identified for synchronization, a sequencer 738G generates a contact closure output to energize an external timer circuit 740G so that a timer associated with that turbine-generator initiates the synchronizing sequence. After a short delay period, the timer operates contacts to energize a control relay which in turn operates contacts in switch networks 742G, 744G, 746G and 747G. In operating the contacts in the switch networks, the control relay connects respective potential transformers for the identified generator and associated line to a conventional synchronizer 748G. For example, if the first gas turbine has been identified for synchronization, the first generator potential transformer G1PT and the first line potential transformer L1PT are connected to the synchronizer 748G. Operation of the control relay contacts also causes the voltage raise/lower signals from the synchronizer 748G to be connected to the voltage regulator associated with the turbine-generator selected for synchronization. In the cited example, the control relay contacts couple the synchronizer 748G to the first voltage regulator. Control relay contact operation also connects the synchronizer 748G to the appropriate breaker for synchro acceptor enabling of transmittal of the breaker closure signal at synchronization.

In this instance, a separate synchro acceptor is provided for each generator breaker. The purpose of the synchro acceptor is to provide a coarse check on phase by providing a contact closure which enables breaker closure when the phase relationship of the two waveforms is acceptable. Ordinarily, the synchronizer 748G generates its breaker closure signal within about 5 cycles difference between the two waveforms and ordinarily the synchro acceptor contact would be closed at that point to permit transmittal of the synchronization signal to the generator breaker.

The generator and line potential waveforms are applied to the synchronizer 748G through the switching circuits 742G and 744G in order to provide for voltage matching and frequency matching between the two waveforms. The synchronizer 748G performs the matching function by generating signals which are applied through the switch network 746G to the voltage regulator for the generator to be synchronized, and the voltage regulator provides the voltage adjustment through variation in the generator field energization as previously indicated. Frequency matching is performed by the synchronizer 748G by the generation of speed pulses as indicated by the reference character 750G which are applied to the computer 58G and more particularly to the speed control 704G for gas turbine speed changes or to the steam turbine startup control 714G for steam turbine speed changes. Each pulse generated by the synchronizer 748G represents a command for an increase in the turbine speed of 1 rpm.

The final result is an increase or decrease in the fuel reference to the gas turbine or the valve position reference to the steam turbine valves, which will result in a corresponding increase or decrease in turbine speed. When the synchronizer 748G detects the proper slip frequency between the generator voltage and the line voltage, no further speed raised pulses are generated.

Once the generator and line frequencies are substantially in phase and a voltage match substantially exists, the synchronizer 748G generates a signal to close the generator breaker and a breaker closed signal is then applied to the synchronizer sequencer 730G in the computer 702G. If the generator breaker does not remain closed for a finite time such as 15 seconds an anti-pump circuit prevents the breaker from attempting to automatically close a second time. A time delay of approximately 20 seconds duration is provided to check the generator breaker closure status to assure that the anti-pumping check has been accomplished before the sequencer 738G permits the synchronization process to be sequenced to the next generator identified for synchronization. If the breaker does not remain closed for 20 seconds, the synchronizer sequencer 738G provides a contact closure output to alarm the fault and the generator and its associated turbine are rejected out of the automatic synchronization sequence.

If the first gas turbine generator has been successfully synchronized, the gas turbine is loaded to minimum load through operation of the synchronizer sequencer 738G. When the minimum load status is confirmed, the sequencer 738G generates a contact closure output to the timer circuit 740G associated with the next turbine generator indentified for synchronization. By providing some delay in the generation of switching actions which decouple the synchronizer 748G from circuitry associated with one turbine generator and couple the synchronizer 740G to circuitry associated with another turbine generator, assurance is provided that the synchronizer 748G will have returned to a non-energized state before the synchronization procedure is undertaken.

Generally, the sequencer 738G provides an adjustable time delay between 1 and 2 minutes for the purpose of measuring the time taken in attempting a synchronization for each turbine generator. If synchronization of a generator has not been completed within the predetermined time period, an alarm is communicated and the generator is rejected from the automatic sequencing procedure as the next identified generator is ready for synchronization.

After either or both gas turbine generators have reached minimum load, the synchronizer sequencer 738G initiates the synchronizing sequence for the steam turbine generator. Once the steam turbine generator is synchronized, the load reference is ramped to the desired value after the steam generator has reached its minimum load operating level.

Preferably, the synchronizer system 700G employs a single synchronizer and switching operations are performed to link it with the different turbine generators as they are cleared for synchronization. Further, it is preferred that the synchronizer system 700G by hybridized from a digital/analog standpoint such that a digital computer is employed for directing system operations while the synchronization functions are performed by a switchable external synchronizer. In this manner, efficient operation is achieved with conservation in manufacturing cost.

The sequential synchronization of the generators permits the sequencer system 700G to be employed standardly in various plant and power system applications while permitting relatively fast plant startups. The sequencer system 700G generally functions under forced sequencing principles, i.e. the overall synchronizer sequence is stepped along if any one event is taking too long. In this manner, better overall plant availability is achieved since the time to reach at least a minimum power generation configuration is reduced.

SYSTEM CIRCUITRY AND PROGRAMS

As shown in greater detail in FIGS. 7A–7D, the synchronizer system 700G includes various circuits external to the computer 58G. Respective timer relays 800G, 802G and 804G are provided for the respective turbine generators to initiate the generator synchronizations with a deadband between synchronizations. Each time relay is energized upon a computer contact closure output only if certain logic conditions exist, i.e. if a logic contact 90XC indicates the voltage regulator is functioning, a logic contact AUTO indicates an operator panel selection of automatic synchronization and normally closed SNX contacts of the other two timer relays are closed as an interlock against simultaneous timer relay operation.

Timer relay operation results in delayed closing of TDX contacts which cause energization of SNX contact relays in circuit path 806G, 808G or 810G. If the computer has selected Gas Turbine 1 for synchronization, the timer relay 800G causes delayed energization of control relays SNX1A and SNX1B. In turn, the following switching functions are performed:

| Contacts | Function |
|---|---|
| 812G, 814G | Connect syncroscope 816G and lights to generator and line. |
| 818G, 820G, 822G | Connect line and generator potential transformers for Gas Turbine 1 to synchronizer 748G. |
| 824G, 826G, 828G, 830G | Connect the raise and down voltage signals to the voltage regulator for Gas Turbine 1 when the synchronizer voltage raise contact 832G or voltage lower contact 834G is closed. |
| 832G, 834G | Connect the synchronizer breaker closure circuit through an equalizer 836G associated with the breaker for the turbine-generator to be synchronized. |

The equalizers 836G, 838G and 840G enable the single synchronizer 748G to be interfaced with three different breakers which would normally have three different contact closure times. Thus, electronic timing circuitry in the equalizers takes up differences in the breaker closure times so that a single closure time can be anticipated in the synchronizer operation.

Once the synchronizer has been connected as described, it adjusts the generator field as already indicated and further it operates a speed adjusted output contact 842G to apply turbine speed increase pulses to the computer 58G. When frequency and voltage matches are achieved, a breaker closure contact 844G is operated and the breaker is closed if, as is normally the case, interlock contacts 848G have been operated by the associated syncro acceptor 846G and the generator field interlock contacts 850G have been operated. Once the breaker closes, the computer progresses the synchronization sequence as previously described. Circuit operations like those already described also result from actuation of the timer relays 802G and 804G.

Within the computer 58G, sequencer system functions are performed in connection with employment of the following logic chains:

B003 — GT2 MIN LOAD STATUS LOGIC

Functional Description

The min load status logic responds to changes of state in the min load button logical variable L2980. When such a change occurs, usually because the operator has pushed the min load button, the trigger action of L2980 results in execution of the min load status logic, so that this control chain runs only on demand. This status logic then determines whether the min load state requested can be achieved under the existing gas turbine conditions. Should the min load state be active and the operator pushes the min load button to deactivate min load, this request is satisfied in all cases except when the turbine is being stopped in automatic control. (In this situation the min load condition is maintained until the turbine actually stops.) Should the min load state be inactive and the operator pushes the min load button to activate min load, the request may or may not be satisfied depending on existing conditions in the gas turbine control system.

The functional diagram of the min load status logic shows the interaction between the min load and the run standby buttons and their associated status logic. The min load button variable L2980 triggers the status logic, which then attempts to carry out the request. To activate min load certain permissive conditions involving manual operation of the fuel valve, coordinated control of the turbine, the state of the main generator breaker, and the temperature control mode must be satisfied. If this is the case then the min load state L2125 is achieved, the run standby button logical variable L2981 is reset to turn off the run standby state should it have been on, and the gas turbine load demand V2993 is set to the appropriate value depending on whether the min load has been enabled or disabled and whether the turbine is set at the base or the peak limit.

Flow Chart Description

The flow chart for the min load status logic indicates that a logical flip-flop is evaluated to determine the new status of min load. The set signal for the flip-flop is the min button L2980 while the reset signal for the flip-flop is the logical OR of the following turbine variables:

L2980 — The min load button not set
L6069 — The turbine is in the coordinated control mode
L2976 — The turbine is on manual control
L2994 — The main generator breaker is closed at the same time that
L2129 — The turbine is in the MW control operating mode This last requirement means that the min load state is inoperative during MW control, since in this mode the operator directs the turbine from the numerical keyboard. Thus, if any of these reset conditions exist the computer will not accept the min load state.

The evaluation of the flip-flop yields the logical variable L2125, which is a contact output lighting the lamp behind the min load button. If the flip-flop is set the min load lamp and state are active, while a reset flip-flop yields an inactive or off min load state and lamp.

B004 — GT2 RUN STANDBY STATUS LOGIC

Functional Description

The run standby status logic responds to changes of state in the run standby button logical variable L2981. When such a change occurs, normally because the operator has pushed the run standby button, the trigger action of L2981 results in execution of the run standby status logic, so that this control chain runs only on demand. This status logic then determines whether the run standby state requested by the operator can be achieved under the existing turbine conditions. Should the run standby state be active, and the operator pushes the run standby button to deactivate run standby, this request will always be satisfied. Should the run standby state be inactive, and the operator pushed the run standby button to activate run standby, the request may or may not be satisfied depending on conditions in the gas turbine control system.

The functional diagram of the run standby status logic shows the interaction between the run standby and the min load buttons and their associated status logic. The run standby button variable triggers the status logic, which then attempts to carry out the request. To activate run standby certain permissive conditions involving manual operation of the fuel valve, coordinated control, and the state of the main generator breaker must be satisfied. If this is the case then the run standby state L2124 is achieved, the min load button logical variable L2930 is reset to turn off the min load state should it have been on, and the automatic synchronizer logic chain B00A is bid to disable auto sync during run standby. To deactive run standby, the status logic simply resets a logical flip-flop regardless of permissive conditions, thus always responding properly to an operator request to turn off run standby.

Flow Chart Description

The flow chart for the run standby status logic indicates that a logical flip-flop is evaluated to determine the new status of run standby. The set signal for the flip-flop is the run standby button L2981 while the reset signal for the flip-flop is the logical OR of the following four turbine variables:

L2981 — Run standby button not set
L2994 — Main generator breaker closed
L6069 — The gas turbine is in the coordinated control mode
L2976 — The gas turbine is on manual control If any of these conditions exist the computer does not accept the run standby state. The evaluation of the flip-flop yields the logical variable L2124, which is a contact output lighting the lamp behind the run standby button. If the flip-flop is set the run standby lamp and state are active, while a reset flip-flop yields an inactive or off run standby state and lamp.

The control chain then equates the run standby button L2981, to the flip-flop L2124; this is to align the button with the flip-flop, and is a form of latching. Next the auto sync control chain B00A is bid so that is may compute its new conditions as a result of this run standby button operation.

The last thing that is necessary to accomplish is to check whether this operation on run standby is to affect the min load button and state. This is done by interrogating the run standby flip-flip L2124; if it is false, meaning the system has just rejected run standby, the control chain simply exits. But is L2124 is true, this means that run standby has been enabled. Then it is necessary to reset both the min load button L2980 and the min load state L2125; this is done at block 10 prior to exit.

B005 — GT2 MANUAL SYNC BUMPLESS TRANSFER

Functional Description

The manual sync bumpless transfer system responds to conditions in the turbine which are related to synchronization on automatic control, but without use of the automatic synchronizing hardware. Thus when the turbine is accelerating automatically to synchronous speed, the operator can choose to control the synchronization from the numerical keyboard. This may be done due to faulty synchronizing hardware or because the speed is to be raised or lowered beyond 3600 rpm for test purposes. Whatever the reason may be, this operating mode is called manual sync while in automatic control.

During normal operation, while the turbine is accelerating automatically, the operator cannot use the keyboard to control the unit speed with the speed demand button selected. Should he push any numerical keys in this situation, the cancel lamp flashes and all succeeding keyboard activity is ignored until the error is acknowledged and the cancel button is pushed. The operating procedure is defined in this way because the turbine is accelerated automatically according to a scheduled speed curve which is stored in computer memory.

However, when the computer has accelerated the unit to synchronous speed and the operator has chosen to synchronize in the manual sync mode, the keyboard must be made available to the operator for direction of the turbine at this point. This enabling of the keyboard is the prime function of the manual sync bumpless transfer system. The control chain is triggered by a change of state in the manual sync mode L2973, as indicated on the functional diagram. The chain thus runs only on demand. The manual sync bumpless transfer system determines whether the speed demand button has been selected on the gas turbine BTG board. If not the chain exits with no activity; however, should the speed demand button be pushed this software sets up the logical states necessary to enable or disable the keyboard, depending on whether the manual sync mode is active or inactive as a result of the execution of this control chain.

Flow Chart Description

The flow chart for the manual sync bumpless transfer indicates that the chain first executes the OPCMODE algorithm, which queries the operating system software to determine whether the speed demand button (Index = 6) on the gas turbine BTG board (Console = 2) has been pushed. The algorithm responds with the status in the temporary logical variable L1600, which is then interrogated by the chain. If L1600 is false this means the speed demand button has not been pushed; consequently the manual sync bumpless transfer system need not be concerned with the keyboard availability and the control chain simply exits.

Should the speed demand button have been pushed, L1600 is true and in this case the keyboard operation must be set in the proper state. The flow chart then shows that the manual sync mode L2973 is interrogated. If L2973 is false, this indicates that the turbine has just been taken out of the manual sync mode. Therefore, the keyboard cannot be used with the speed demand button pushed, so the temporary logical variable L1600 is reset to the false state for execution of the keyboard algorithm.

If the interrogation of the logical variable L2973 indicates it was true, the turbine has just entered the manual sync mode. Since this is the only time during which the keyboard is valid with the speed demand button pushed, the temporary variable L1600 is kept true. Then at block 40 the keyboard algorithm is executed for the gas turbine BTG board (Console = 2), with the status L1600 computed as described above. The keyboard algorithm then sets up the bookkeeping to enable or disable the numerical keyboard, depending on whether L1600 has been computed true or false by the earlier part of this chain.

B008 — GT2 MANUAL SYNC LOGIC

Functional Description

The manual sync logic responds to conditions in the turbine which are related to synchronizing on automatic control, but without use of the automatic synchronizing hardware. Whereas the auto sync mode adjusts the turbine speed reference, and thus the fuel valve, by responding to raise and lower pulses from the hardware, the manual sync mode responds to an operator keyboard entry for speed demand by adjusting the speed reference, and thus the fuel valve. Therefore, both the manual and auto sync logic systems are functionally similar; their differences occur in the mechanics of requesting small speed adjustments necessary for synchronizing. In the auto sync mode, this request is supplied by hardware pulses, while in the manual sync mode the operator provides the request with keyboard entries.

The functional diagram shows that the internal logical variable L2974 triggers execution of the manual sync logic, so that the chain runs only on demand when L2974 changes state. The diagram also indicates that the manual sync logic is bid by the auto sync logic chain BOOA; thus when the auto sync logic executes it will, in turn, bid the manual sync logic, so that both will always run together. A number of permissive conditions must be satisfied before the manual sync system will be activated, and once this occurs an associated manual sync bumpless transfer control chain B005 is triggered.

The manual sync logic places the gas turbine in the manual sync control mode, if all conditions are satisfied. Thus after automatic acceleration of the turbine to a synchronous speed of 3,600 rpm, the operator will choose to synchronize automatically or manually. Normally, the auto sync mode is selected, but the manual sync option is always available. Should the synchronizing hardware not be functioning, for instance, then the unit can still be placed on the line smoothly and easily with the manual sync system, while still in automatic control of the turbine by the computer. Should the operator choose to perform an overspeed test, he must engage the manual sync system so that he can enter from the keyboard the trip speed demand of 3,960 rpm (or whatever other speed may be necessary to perform this test). Once in the manual sync control mode, the turbine can be directed to any safe speed by keyboard entries; the automatic control system then moves the speed reference to this new speed demand at an internally fixed rate, which is usually 1 rpm per minute. This acceleration rate on manual sync exists as a K number, however, and may be tuned to appropriate values by following a well-defined procedure which requires use of a keylock switch.

The logical variable L2974 which triggers the manual sync logic is internally generated as a request for manual sync. This logical state is set by the gas turbine speed monitor system which continually checks turbine speed. When synchronous speed (actually about 3,500 rpm) is reached, L2974 is set true; otherwise it is reset to the false state.

The various permissives which are necessary for manual sync exist as L numbers in the control computer. These requirements include automatic speed control, absence of runback and stop conditions, and placement of the automatic synchronizer switch on the gas turbine BTG board in the manual position.

Flow Chart Description

The manual sync logic chain evaluates the logical and of all the conditions needed to achieve the manual sync state. A tabulation of each of these conditions which exist in the control computer as L numbers follows:

L2976 — The turbine must not be on manual control
L2994 — The main generator breaker must not be closed
L2088 — The automatic synchronizer switch on the BTG board must not be on auto
L2992 — There must not be a surge/speed runback
L2990 — There must not be a blade path temperature runback
L2971 — The turbine must not be in the auto sync mode
L2968 — The turbine must not be in the stop state
L6093 — The plant must not be in the normal stop state
L2967 — The turbine must not be automatically accelerating Should all of these conditions be satisfied, the manual sync state L2973 is activated. If not, L2973 is computed to be false. The remainder of the flow chart then indicates that the request for manual sync L2974 is set equal to the newly computed manual sync state L2973. This is a form of latching so that L2974 will not continually retrigger the manual sync logic once the manual sync state is enabled.

Should this execution of the manual sync logic result in a change of state in the manual sync mode L2973, the manual sync bumpless transfer control chain B005 is triggered by L2973 as indicated on the functional diagram. This bumpless transfer software then executes the appropriate control activity to properly align the BTG board digital displays and various lamps to the new control mode.

B009 — GT2 AUTO SYNC BUMPLESS TRANSFER

Functional Description

The auto sync bumpless transfer system responds to conditions in the turbine which are related to synchronizing with the automatic synchronizer hardware. Thus when the turbine is automatically accelerated to synchronous speed the operator may choose to control synchronization with the computer synchronizer hardware interface. This is the normal method of bringing the turbine generator on the line to begin supplying power to the utility network.

During normal operation while the turbine is accelerating acutomatically, the operator cannot use the keyboard to control the unit speed with the speed demand button pushed. Should the operator press any numerical keys the cancel lamp flashes and all succeeding keyboard activity is ignored until the error is acknowledged and the cancel button is pushed. The operating procedure is defined in this way because the turbine is accelerated automatically according to a scheduled speed curve which is stored in the computer memory.

However, when the computer has accelerated the unit to synchronous speed, the control system logic must decide whether or not the keyboard can validly be used at sync speed. If the control mode is now manual sync, the keyboard may be used; however, if the control mode is now auto sync the keyboard must be disabled since the turbine reference, and thus speed, is controlled by the hardware synchronizer raise and lower pulses. Should the operator switch back and forth between manual and auto sync, the keyboard must be appropriately enabled and disabled. This disabling of the keyboard in the auto sync mode is one of the prime functions of the auto sync bumpless transfer system. The other major job is to set the speed demand equal to the existing speed reference if the turbine has gone into the auto sync mode. This is necessary because the auto sync mode may be selected while reference is moving toward demand in a previous manual sync mode of operation.

The functional diagram indicates that the auto sync bumpless transfer system is triggered by a change of state in the auto sync mode L2971 so that the sofware runs only on demand. When this change of state occurs, the auto sync bumpless transfer system determines whether the speed demand button has been pushed on the gas turbine BTG board. If not, the chain simply exits. If the speed demand button is pushed the software disables the keyboard if the auto sync mode is active, and also sets the speed demand equal to the existing speed reference.

Flow Chart Description

The flow chart for the auto sync bumpless transfer system indicates that the chain first executes the OPC-MODE algorithm, which queries the software operating system to determine whether the speed demand button (Index = 6) on the gas turbine BTG board (Console = 2) has been pushed. This algorithm responds with the status of speed demand in the temporary logical variable L1600. Next, the chain flow chart checks the auto sync mode L2971 which has just changed state and triggered this chain. If L2971 is false, the auto sync mode has just been rejected, in which case the internal automatic synchronizer raise (L3970) and lower (3969) states are both reset to false. These may or may not have been set, but their proper state is false when auto sync is rejected.

If the auto sync mode L2971 is true, at block 20 the turbine speed demand V2993 is set equal to the existing speed reference V2992. Normally at this time demand and reference are equal at the end of the automatic acceleration phase; however, the system could have been switched back and forth between the auto and manual sync modes, in which case demand may or may not equal reference. In any case, these are always to be equal in the auto sync mode.

The chain next checks whether the temporary logical variable L1600 has been set by the OPCMODE algorithm. If not, the speed demand button has not been pushed and the chain exits. But if L1600 is true, speed demand is being displayed; then L1600 is reset to false and the keyboard algorithm is executed for the gas turbine BTG board (Console = 2) and with the status L1600 false. This results in the keyboard being disabled during the auto sync mode.

B00A — GT2 AUTO SYNC LOGIC

Functional Description

The auto sync logic responds to conditions in the turbine which are related to use of the automatic synchronizer hardware and the computer control system. The functional diagram indicates the various contact inputs which trigger execution of this software, so that the chain runs only on demand when these variables change state. The diagram also shows that the auto sync logic is bid by a number of other control computer chains, and that a set of permissive conditions must be satisfied before the automatic synchronizer system is actuated. Finally, this auto sync logic may trigger execution of a bumpless transfer control system chain B009, and it will bid a manual sync logic system at the end of these auto sync computations.

The auto sync logic places the turbine in the automatic synchronizer control mode if all conditions are properly set. Thus after automatic acceleration to a synchronous speed of 3,600 rpm, the computer control system normally switches direction of the turbine to a software system which responds to speed raise and lower pulses generated by electronic hardware. This equipment senses turbine speed and generator terminal voltage, and sends adjustments to appropriate equipment to align these quantities to their proper value for connection to the electric utility power system. The terminal voltage is adjusted by raise and lower pulses sent to the generator field voltage regulator circuitry, while the speed is adjusted by raise and lower pulses (contact inputs) which are sent to the control computer. The PACE digital control system then adjusts the turbine speed reference, and ultimately the fuel valve, to yield the speed necessary to synchronizing hardware requirements. When these needs are satisfied the automatic synchronizer system closes the main generator breaker, thus connecting the gas turbine generator to the electric utility system grid.

A brief description of the logical variables whose change of state triggers execution of the auto sync logic follows:

L2972 — An internally generated logical variable which requests the automatic synchronizer mode. This state is generated by the gas turbine speed monitor, which continually monitors turbine speed; when synchronous speed (actually about 3590 rpm) is reached L2972 is set true. Otherwise it is reset to the false state.

L2088 — A contact input representing the state of the automatic synchronizer manual/auto switch on the gas turbine BTG board.

L2087 — A contact input representing the state of the voltage regulator manual/auto switch on the gas turbine BTG board.

L2965 — An internally generated logical variable which may reject the auto sync control mode, and which is generated by the coordination system. If the turbine is not synchronized in a predetermined time interval (usually 120 sec) L2965 is set true; otherwise it is maintained false.

L2086 — A contact input representing the state of the generator field breaker, which must be closed if the turbine is to be automatically synchronized.

A brief description of the permissive conditions which must be satisfied for the auto sync mode follows:

L2124 — A computed logical variable representing the run standby state. In some cases the plant operator will want to hold the turbine at synchronous speed for some time before he desires to synchronize. Then there is a button on the BTG board to place the turbine in this run standby state, which is to inhibit automatic synchronizing.

L1971 — A computed logical state which indicates that gas turbine 1 is in the auto sync control mode. Since only one set of automatic synchronizing hardware is available in the PACE plant, only one turbine may be in the auto sync mode at a time.

L3971 — A computed logical state which indicates that the steam turbine is in the auto sync mode. Since only one set of automatic synchronizing hardware is available in the PACE plant, only one turbine may be in the auto sync mode at a time.

A brief description of the control computer chains which may bid the auto sync logic follows:

B00E — This breaker logic chain bids the auto sync logic when the main generator breaker closes. When this occurs the auto sync logic must be disabled, whether or not it had been in service. When the breaker opens the auto sync logic may be enabled provided all other conditions are satisfied.

B000 — This fuel valve manual/auto logic bids the auto sync logic when the fuel valve control transfers from auto to manual or from manual to auto. On manual control the auto sync logic must be disabled, while on automatic control the auto sync logic may be enabled provided all other conditions are satisfied.

B007 — The runback logic system bids the auto sync logic when a runback occurs or ceases. During a runback condition the auto sync logic must be disabled since the fuel valve is being runback to overcome a contingency. The discontinuance of a runback may enable the auto sync mode provided all other conditions are satisfied.

B025 — This stop button logic bids the auto sync logic when the stop button is pushed on automatic control. This inhibits automatic synchronizing when the turbine is in the process of stopping on auto.

900D — This plant normal stop logic bids the auto sync logic when the normal stop button is pushed. This inhibits automatic synchronizing when the entire PACE plant is in the process of stopping automatically.

A01C — This periodic contact input scan logic bids the auto sync logic when the contact input hardware (containing the synchronizer raise and lower pulses) has switched to a periodic scan. Normally these contacts are scanned on a demand basis when they change state, and the auto sync logic system is designed on this basis. However, should this hardware be changing state at such a high rate that the control system cannot continually scan and carry out its normal functions, the contact scan system switches to a periodic (once a second) scan rate. In this case auto sync logic must be disabled since it cannot properly function under periodic scan conditions.

Flow Chart Description

The auto sync logic control chain evaluates the logical AND of all the conditions necessary to achieve the auto sync state L2971. A tabulation of each of these conditions which exists in the control computer as an L number follows:

L2976 — The gas turbine must not be on manual control

L2994 — The main generator breaker must not be closed

L2088 — The automatic synchronizer switch on the BTG board must be in the auto position L3971 — The steam turbine must not be in the auto sync mode L2992 — There must not be a surge/speed runback L2990 — There must not be a blade path temperature runback L2124 — The turbine must not be in the run standby state L2087 — The voltage regulator switch on the BTG board must be in the auto position L2965 — There must not be a coordinated control system reject from the auto sync mode L2086 — The generator field breaker must be closed L2968 — The turbine must not be in the stop state L6093 — The plant must not be in the normal stop state L6983 — The periodic contact input scan for the auto sync raise and lower pulses must not be enabled L2967 — The turbine must not be automatically accelerating.

If all of these conditions are satisfied, the auto sync state L2971 is activated; if not, L2971 is computed as false. The remainder of the auto sync flow chart indicates that the request for auto sync L2972 is set equal to the auto sync mode L2971 just computed; this is a form of latching so that L2972 will not continually retrigger the auto sync logic once the auto sync state is enabled. In addition a status lamp L6008 on the vertical coordinated BTG board and a contact output L6152 to attach the automatic synchronizer hardware to the gas turbine are each set equal to the auto sync state L2971. Finally a bid is placed for the manual sync logic chain B008, after which this control chain exits.

If this execution of the auto sync logic results in a change of state of the auto sync state L2971, the auto sync bumpless transfer control chain B009 is triggered by L2971 as indicated on the functional diagram. This bumpless transfer system then executes the appropriate control activity to properly align the BTG board digital displays and lamps to the new control mode.

B00E — GT2 BREAKER LOGIC

Functional Description

The breaker logic responds directly to changes or state of the main generator breaker contact input L2084 and indirectly to changes of state of the master 4X start relay contact input L2082. The state of the main generator breaker represents the transition point between the two major operating modes of the gas turbine generator. When the breaker is open the turbine is on wide-range speed control, and the entire emphasis of the computer control system is to position the fuel valve to achieve a scheduled acceleration cureve. When the breaker is closed, the turbine is on load control, and the complete purpose of the computer control system is to position the fuel valve and the inlet guide vane to achieve a target MW, entered by the operator or determined automatically by the computer.

Opening and closing of the main generator breaker represents a transient condition during which the computer system must work doubly hard to control overspeed on opening, and initial MW generation on closing. In addition to this rigorous control action, additional bookkeeping functions must be performed to enable or disable the numerical keyboard, depending on operating circumstances, and to update the digital display hardware from a speed demand to a load demand, or from load demand to speed demand configuration, again depending on existing conditions. Finally numerous internal logical variables, contact outputs driving status and monitor lamps, and various timing chain counters must be updated as a consequence of the major change-of-state which occurs when the main generator breaker opens or closes.

The functional diagram indicates the interactions as a result of breaker operations. The main generator breaker contact L2078. Triggers execution of the breaker logic, while the master 4X start relay logic chain B00E bids the breaker logic when the turbine starts or stops. Thus this breaker logic runs only on demand, with the master 4X relay contact input L2082 acting as a permissive for the main generator logic. In addition to its functions of keyboard, display, and bookkeeping described above, the breaker logic also bids other control chains so that they align themselves as a consequence of the change in breaker state; these include the GO HOLD logic, the MW in/out logic, the auto sync logic, and the run standby logic.

Flow Chart Description

The flow chart for the breaker logic shows that a logical flip-flop is evaluated to develop the resultant state of the breaker. The set signal for this flip-flop is the main generator breaker contact input L2084 while the reset signal for the flip-flop is the logical OR of the inverse of the breaker contact (NOT L2084) with the inverse of the master 4X relay contact input (NOT L2082). Thus loss of 4X or breaker resets the flip-flop while closing of the breaker sets the flip-flop. Immediately after the flip-flop evaluation, a contact output L6009 representing the breaker status lamp on the vertical portion of the coordinated control BTG board is set equal to the new state of the breaker flip-flop.

Next the OPCMODE algorithm is executed twice to determine which display button is pushed. Thus for gas turbine BTG board (Console = 2) the status of the speed demand button (Index = 6) is stored in temporary logical variable L1600, while the status of the load demand button (Index = 7) is stored in L1601. Then the new state of the breaker flip-flop L2994 as a result of this execution of the breaker logic is interrogated. Should L2994 be false, indicating the breaker has opened, the chain transfers to block 20, where the following logical variables are reset to the false state appropriate to speed control (open breaker):

L6010 — Min load status lamp
L6011 — Base status lamp
L6012 — Peak status lamp
L2967 — Automatic acceleration
L2261 — Open breaker contact output An interrogation is next made on the state of the master 4X relay contact input L2082. If this is false, meaning the turbine is stopped, the chain transfers to block 40 with no special action. But if 4X is true, indicating that the turbine is still in the start mode, at block 30 both the speed demand V2993 and the speed reference V2992 are set to 3,600 rpm. Thus, the automatic speed control system will adjust the fuel valve to hold the turbine at synchronous speed as a result of the main generator breaker having just opened. The control chain then transfers to block 40 to accommodate digital display hardware and numerical keyboard alignment to the new state of the breaker.

If the interrogation of the state of the breaker flip-flop L2994 yields a true result, meaning the breaker has closed and the turbine generator is on the line, the breaker logic transfers to block 1 to do the proper bookkeeping. At block 1 the plant coordinated control logical variable L6065 is checked. If this is true the chain transfers to block 2, where the coordinated load reference V6992 is incremented by the min load contribution K2991 of this gas turbine going on the line. In addition, the gas turbine load reference V2992 is also set to min load K2991 after which the control chain transfers to block 16 for further bookkeeping.

If no part of the plant is on coordinated control, the check on L6065 yields a false and the chain then interrogates the min load state L2125 at block 3. If this is true, an additional check is made at block 5 on the state of the MW control mode L2120; should it be true, at block 6 the min load lamp L2125 and the min load button L2980 are reset to false. This is necessary because the min load state is not operational on MW control, since the operator sets the MW demand from the keyboard. Thus min load on MW control is functional only during speed control, and its purpose is to direct the computer to pick up min load when the unit goes on the line. If the check on MW control at block 5 indicates a false state, this implies the temperature control mode is operating. In this case, the min load state is valid so the control chain transfers to block 9, where the turbine MW demand V2993 is set to min load K2991. Control then transfers to block 16 for additional bookkeeping.

If the interrogation of the min load state L2125 at block 3 indicates a false value, the control chain transfers to block 7 to check whether temperature control is operating. If the answer is false, this implies MW control is functional and the chain transfers to block 9 to pick up min load K2991 as described above. However, if the temperature control mode is active, the true exit from the test at block 7 results in a transfer to block 10.

At this time, it is now known that the turbine is on the line in the temperature control mode but not with min load as a target. Therefore the target must be either base or peak MW; thus at block 10 the base contact input L2014 is checked. If it is true the turbine MW demand V2993 is set to the base value K2964 at block 12, while a false value for the base contact input results in the turbine MW demand V2993 being set to the peak value K2965 at block 14. In either case, the control chain transfers to block 16 for additional bookkeeping.

When the breaker logic system arrives at block 16, it has set the turbine MW demand to the proper value for existing conditions in the automatic control system. Then some logic is required of various timing chain counters and logical variables which are appropriate during speed control but are no longer valid with the turbine generator on the line. Thus after setting the turbine MW reference V2992 to the min load value at block 16, the chain resets the following variables to 0:

V6980 — The coordinated control system start timer
V6983 — The coordinated control system synchronizing timer
V2989 — The MW controller integral output
V2988 — The MW controller last input The MW controller variables are reset to 0 so that this feedback control system may start off with 0 contribution at the moment the main generator breaker closes. The control chain then resets to the false state the sync speed status lamp L6007 and the automatic startup logical variable L2966. Finally, the run standby logic chain B004 is bid so that it may clean up any conditions necessary as a result of the turbine going on the line. The chain then transfers to block 40.

At block 40 the breaker open and breaker close paths merge for additional control activity, primarily aimed at updating the digital display hardware and the numerical keyboard as a result of the breaker operation. First the MW in/out logic chain B00B, the GO HOLD logic chain B00D and the auto sync logic chain B00A are all bid so that they may perform the proper bookkeeping to align themselves to the new state of the breaker. Then the temporary logical variable L1600, which contains the state of the speed demand button, is interrogated; if it is true, indicating that speed demand is pushed, the chain transfers to block 50 to check the new state of the breaker L2994. If L2994 is true, at block 60 the display algorithm is executed to place, in both the reference (Device = 3) and the demand (Device = 4) displays, the synchronous speed value K5999 (which contains 3,600), and to place the speed mnemonic in the left-most display window (Message = SS). If the breaker is open, the false value of L2994 transfers to block 70, where the reference display (Device = 3) is given the value of speed reference V2992, and the demand display (Device = 4) is given the value of speed demand V2993. Again, both displays are given the speed mnemonic (Messaage = SS) in the left-most window. The chain then transfers to block 160 to set the keyboard invalid on speed control at the moment the breaker opens.

If the test of L1600 indicates false, meaning the speed demand button has not been pushed at block 100, a similar test is made on L1601 to determine if the load demand button is pushed. If the result is false, the control chain exits, but a true answer requires a check to see if the breaker L2994 opened or closed. This is done at block 110, where a false result transfers to block 150 to update the displays for the load demand button with the breaker having opened. Here the display algorithm places in both the reference windows (Device = 3) and the demand windows (Device = 4) a value of 0 contained in K4999, since with the breaker open there is no MW generation.

The algorithm also places the MW mnemonic (Message = PP) in the left-most window of both displays, after which a transfer is made to block 160 to set the keyboard invalid for the MW demand button with the breaker open.

Had the test on the breaker state L2994 at block 110 yielded a true conclusion, meaning the breaker is closed, at block 120 the display algorithm places in the reference display (Device = 3) the value of the turbine MW reference V2992, and places in the demand display (Device = 4) the value of the turbine demand V2993. The MW mnemonic (Message = PP) is also placed in the left-most window of each display. Then the logical OR of the following conditions is calculated to determine keyboard validity.

L2976 — The turbine is on manual control
L2121 — The turbine is in the coordinated control mode
L2130 — The turbine is in the temperature control mode If none of these conditions exists the chain transfers to block 140 to set the temporary logical variable L1600 true, which validates the keyboard for the load demand button on automatic MW control. But is any of the logical conditions are true, the chain sets L1600 false at block 160, so that the keyboard cannot be used with the load demand button on manual, coordinated, or temperature control. Finally the keyboard algorithm is executed at block 200 for the gas turbine BTG board (Console = 2) with the status of the keyboard computed in L1600 as described above.

B024 — GT2 START BUTTON LOGIC

Functional Description

The start button logic responds to the operator pushing the start button on the gas turbine BTG board. This initiates a sequence of events which results in the starting device (a 1,600 HP induction motor) rolling the turbine, provided all analog permissives are satisfied. The start button is wired to both the analog control center and to the digital control computer. If the gas turbine is on manual control, the analog sequencer accepts the start button and inititates the excitation of the starting device if all permissive conditions are set. In this case the control computer simply ignores the start button. On the other hand, if the gas turbineis on automatic control, the analog sequencer ignores the start button while this start button logic chain in the control computer responds by setting up internal computer logical variables which result in a contact output being set in this software. This contact is wired to the sequencer, which accepts it is lieu of the start button and initiates excitation of the starting motor.

The functional diagram indicates that the start button logic is triggered by a contact input L2083 generated by the BTG board hardware circuitry when the start button is pushed. Thus, execution of this chain is on a demand basis only when L2083 changes state. The functional diagram shows that the required permissive conditions for an automatic start include the main generator breaker, the coordinated control state, and manual operation of the gas turbine fuel valve. If these permissives have the proper value the start button logic sets a contact output L2256 to start the turbine, and an internal logical variable L2966 is also set to initiate automatic control of the starting sequence.

Flow Chart Description

The flow chart for the start button logic shows that the logical OR of the following permissive conditions is computed and stored in the temporary logical variable L1600:

L2083 — The start button contact input not set
L2994 — The main generator breaker closed
L2976 — The fuel valve on manual operation
L6069 — The gas turbine in coordinated control
L2966 — The automatic start state already activated If any of these conditions are true, L1600 is computed as true; an interrogation of L1600 yielding true simply exits from this control chain and the pushing of the start button is ignored by the computer.

A brief note follows on why some of the above conditions are as described. The condition on the start button contact input L2083 not being set is necessary because release of the start button by the operator changes the state of L2083 back to false and this control chain is retriggered. In this case, the open contact input state of L2083 must then be ignored. The coordinated control state L6069 being set implies that the gas turbine is to be controlled completely from the coordination BTG board rather than from the gas turbine panel, so the start button is ignored is such a situation, Finally, if the gas turbine is started automatically as indicated by L2966, pushing the start button again is redundant and thus is ignored. The cases of the main generator breaker being closed (the unit on the line) and the turbine in manual control, are clearly violations of the start button automatic control as discussed above in the functional description.

If the interrogation of L1600 indicates that none of the above conditions exists, this constitutes a valid automatic start. Then at block 50 the start contact output L2256 and the auto start state L2966 are both set true. Then the write algorithm is executed with a message argument set to 3 and an annunciator contact output argument set to L6166. The write algorithm initiates the printing of a message corresponding to the third entry in a table of messages, which states "gas turbine 2 automatic start" on the alarm typewriter. The algorithm also resets the contact output L6166; this results in an audible annunciator drop which alerts the operator to the fact that a message from the control computer is being printed on the alarm typewriter.

D016 — GT2 MIN LOAD BUTTON LOGIC

Functional Diagram

The min load button logic responds to the operator pushing the min load button on the gas turbine BTG board. Normally, this button functions primarily in the temperature control mode on automatic control, and it serves as a target or end point to which the gas turbine generator moves. If the turbine is accelerating automatically, the min load button indicates that the computer control system will roll the unit to synchronous speed, allow closing of the main generator breaker either manually or automatically, and then hold the turbine generator at the minimum load level (usually about 4 MW). If the turbine is on the line in the temperature control mode, the min load button indicates that the computer control system reduces load from the current level to the minimum load level, at a rate which the operator sets from the keyboard, and then maintains this min load condition.

The functional diagram shows the interrelationship between the min load button and other portions of the computer control system. When the button is pushed the BTG board hardware circuitry generates an interrupt, which is received and decoded by the computer. The software operating system identifies the interrupt and bids the min load button logic, which then checks validity conditions for proper use of the min load button. If conditions are correct, this chain logically inverts the min load button variable L2980; the resulting change of state triggers the min load status logic system to perform the internal computer switching required to process the min load state.

The functional diagram indicates a cross-coupling action between the min load button and the run standby button. The run standby state maintains the gas turbine at synchronous speed, but inhibits automatic synchronization. Thus run standby and min load are closely related, and are separated only by the main generator breaker. Run standby maintains synchronous speed prior to going on the line, while min load maintains minimum load after going on the line.

Flow Chart Description

The flow chart for the min load button shows that the control chain first interrogates the auto stop logical variable L2968. If this variable is set the software exits immediately, thus ignoring the min load button being pushed. The reason for this is that an auto stop request has been previously made by the operator and accepted by the computer control system, as indicated by L2968 being true. The automatic control system then responds to this auto stop state by internally selecting the min load and the temperature control modes. This results in the system automatically reducing load to minimum prior to opening the main generator breaker and stopping the turbine. Thus at any point in this stop sequence selecting the min load button is redundant and therefore it is simply ignored by the conputer.

However, if the interrogation of the auto stop state L2968 yields a false answer, meaning the auto stop is not active, then at block 10 this chain logically inverts the min load button variable L2980. The resulting change of state then produces a triggering of the min load status logic, as indicated on the functional diagram. The min load status logic will complete processing of the min load button request.

D017 — GT2 RUND STANDBY BUTTON LOGIC

Functional Description

The run standby button logic responds to the operator pushing the run standby button on the gas turbine BTG board. This button is operational only during acceleration of the turbine, and it maintains the unit at synchronous speed (which is the definition of the run standby state for the gas turbine). Thus, pushing of the run standby button on automatic speed control, inhibits automatic synchronizing; during this time the computer speed control system maintains the turbine at synchronous speed of 3,600 rpm. When the operator wishes to synchronize the unit, he need only push the run standby button again to release the run standby state, thus enabling the automatic synchronizing mode. The run standby button does no inhibit the manual synchronizing mode, however, so the operator may manually synchronize the turbine generator from the keyboard as discussed in the manual sync logic system description, providing all permissive conditions are met.

The functional diagram indicates the interrelationship between the run standby button and other portions of the computer control system. When the button is pushed the BTG board hardware circuitry generates an interrupt, which is received and decoded by the computer. The software operating system identifies the interrupt and bids the run standby button logic, which simply inverts logically the state of the run standby button variable L2981. This results in triggering the execution of the run standby status logic system, which performs the internal computer switching required to process the run standby state if all permissive conditions are satisfied.

The functional diagram indicates a cross-coupling action between the run standby and the min load buttons. The min load button allows the turbine to be synchronized and then holds load on the unit at a minimum value (usually 4 MW). Thus min load and run standby are closely related, and are only separated by the main generator breaker. Min load holds load at a minimum after the breaker closes and the turbine is on line, while run standby holds speed at synchronous value prior to the breaker closing and the unit going on the line.

Flow Chart Description

The flow chart for the run standby button is quite simple, as the variable L2981 representing the run standby button is logically inverted. The resulting change of state then produces a bid for the run standby status logic, since L2981 is a trigger for that control chain as indicated on the functional diagram. The run standby status logic then completes the processing of the run standby button request.

D046 — GT2 HOLD BUTTON LOGIC

Functional Description

The HOLD button logic responds to the operator pushing the HOLD button on the gas turbine BTG board. This button is operational only during load control (the main generator breaker closed) with the gas turbine on automatic control in the MW control mode. The HOLD button holds (suspends temporarily) the turbine MW reference from moving toward the MW demand, which has been previously entered by the operator from the keyboard. In conjunction with the HOLD button the GO button allows the operator to restart the MW reference moving to demand during automatic control in the MW control mode. The rate in MW/MIN at which the reference ramps to demand is set by the operator through use of the load rate button and the keyboard. Thus with this HOLD and GO ability the operator may move the turbine generator output automatically in a jogging pattern, in a continuous raise or lower pattern, or in various combinations to suit existing circumstances. On automatic control, the computer system always adjusts the fuel valve and the inlet guide vane to produce the MW required by the reference and to keep the turbine temperature within design limits.

The functional diagram indicates the interrelationship between the HOLD button, the GO button, and the GO HOLD logic system. When the HOLD button is pushed the BTG board hardware circuitry generates an interrupt which is received and decoded by the control computer. The software operating system indentifies the interrupt and bids the HOLD button logic. Thus, this chain executes only on demand when the HOLD button is pushed. The HOLD logic then examines turbine operating conditions to determine if the HOLD button is operational. If so, appropriate additional control chains are activated to continue the processing of the HOLD button. If the turbine conditions imply that HOLD is not operational, the chain simply exits.

Flow Chart Description

The flow chart for the HOLD button logic evaluates the logical OR of the following permissive conditions to determine the validity of HOLD, as follows:

L2976 — The gas turbine is on manual control
L2121 — The gas turbine is in coordinated control
L2994 — The main generator breaker is not closed
L2130 — The gas turbine is in the temperature control mode THe OR of these conditions is stored in the temporary logical variable L3800, which is then interrogated. If L3800 is true the HOLD button cannot be operational and the chain simply exits and ignores the button. But if L3800 is false, HOLD is tentatively operational. Therefore, at block 10 the logical variable L2987 representing the HOLD button is set true. Then a bid is placed for the GO HOLD logic control chain B00D which makes the final decision on the validity of the HOLD request. The GO HOLD logic performs the necessary bookkeeping to manipulate the GO and HOLD lamp and to handle the numerical keyboard valid or invalid state as a result of the new HOLD status.

D047 — GT2 GO BUTTON

Functional Description

The GO button logic responds to the operator pushing the GO button on the gas turbine BTG board. This button is operational only during load control (the main generator breaker closed) with the gas turbine on automatic control in the MW control mode. The GO button starts the turbine MW reference moving toward MW demand, which has previously been entered by the operator from the keyboard. The rate in MW/MIN at which reference ramps to demand is set by the operator through use of the load rate button and the numerical keyboard. In conjunction with the GO button, the HOLD button allows the operator to hold (suspend temporarily) the MW reference during automatic operation in the MW control mode. Thus with this GO and HOLD ability, the operator may move the turbine generator output automatically in a jogging pattern, in a continuous raise or lower pattern, or in various combinations to suit existing circumstances. On automatic control the computer system always adjusts the fuel valve and the inlet guide vane to produce the MW required by the reference and to keep turbine temperatures within design limits.

The functional diagram indicates the interrelationship between the GO button, the HOLD button, and the GO HOLD logic systems. When the GO button is pushed the BTG board hardware circuitry generates an interrupt, which is received and decoded by the control computer. The software operating system identifies the interrupt and bids the GO button logic, so that this chain executes only on demand. The GO logic examines turbine operating conditions to determine if the GO button is operational. If so, appropriate additional control chains are activated to continue the processing of the GO button. If the turbine conditions imply that GO is not operational the chain simply exists.

Flow Chart Description

The flow chart for the GO button logic evaluates the logical OR of the following permissive conditions to determine the validity of GO, as follows:

L2976 — The gas turbine is on manual control
L2121 — The gas turbine is in coordinated control
L2994 — The main generator breaker is not closed
L2130 — The gas turbine is in the temperature control mode The OR of these conditions is stored in the temporary logical variable L3800, which is then interrogated. If L3800 is true, the GO button cannot be operational and the chain simply ignores the button and exits. But if L3800 is false, GO is tentatively operational. Therefore at block 10 the logical variable L2988, representing the GO button, is set true, and the logical variable L2987, representing the HOLD button, is reset to false. This latter step is necessary to enable the GO button to take precedence over HOLD if the HOLD button has previously been pushed. The control chain then bids the GO HOLD logic system chain B00D, which makes the final decision on the validity of the GO request. The GO HOLD logic performs the necessary bookkeeping to manipulate the GO and HOLD lamps, and to handle the numerical keyboard valid or invalid state as a result the new GO status.

TIMING AND SEQUENCE CHAINS

Functional Description

The timing and sequence chains form a part of the synchronizer sequencer and function at the coordinated plant control level since sequenced synchronizations are performed only in the coordinated control mode. Automatic synchronization can be performed for each turbine generator in the operator automatic mode, but the operator controls the initiation and termination of the synchronizations.

Certain events are timed as already indicated, and the synchronization process is forced forward with turbine generators accepted for or rejected from synchronization according to the timing results.

Flow Chart Description

Figure 8B:
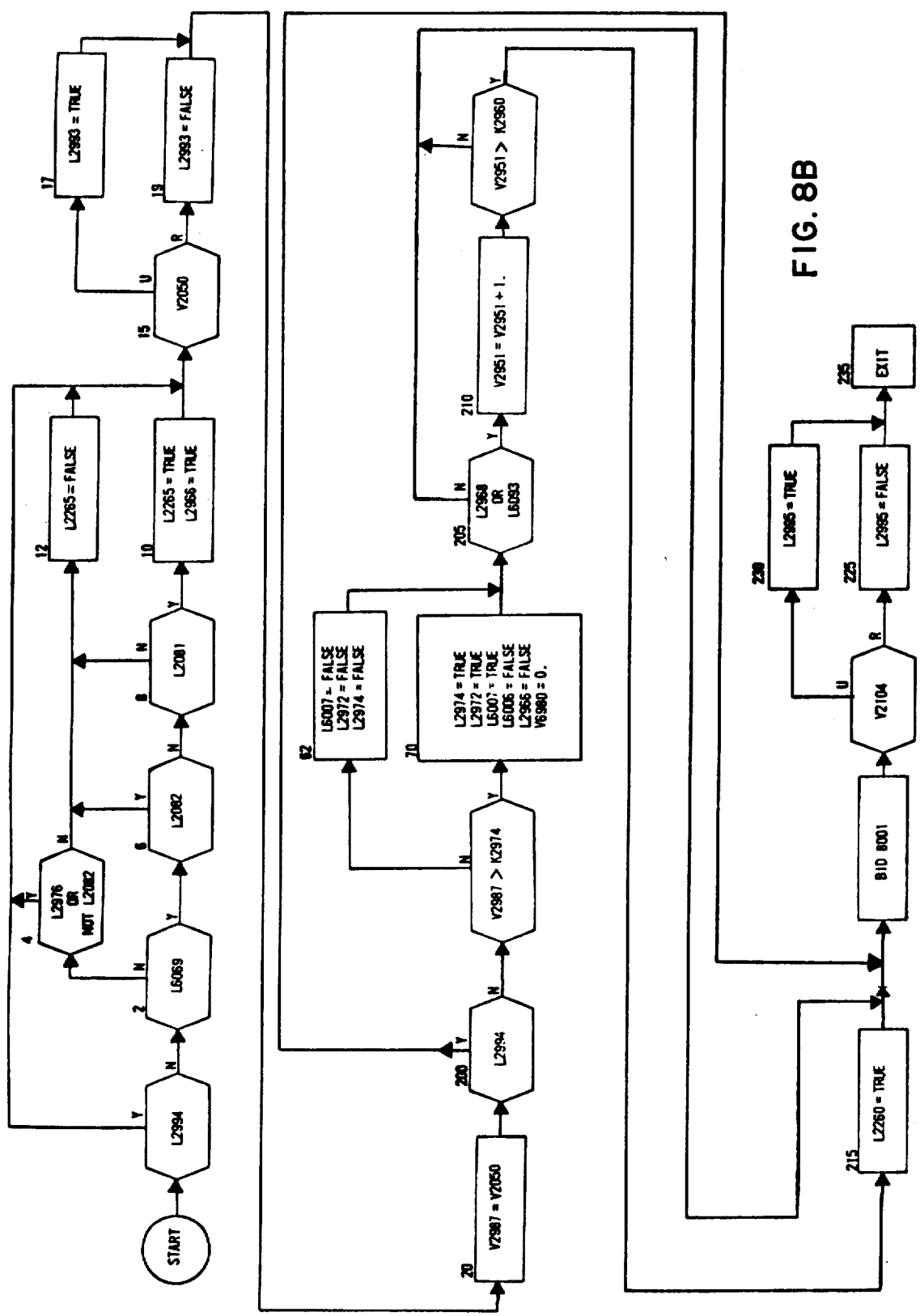
FIGS. 8A, D, G, J, and N-X1 and 2 and FIGS. 8B, C, E, F, H, I and K-M show flow charts for additional elements of the synchronizer sequencer.
Figure 8C:
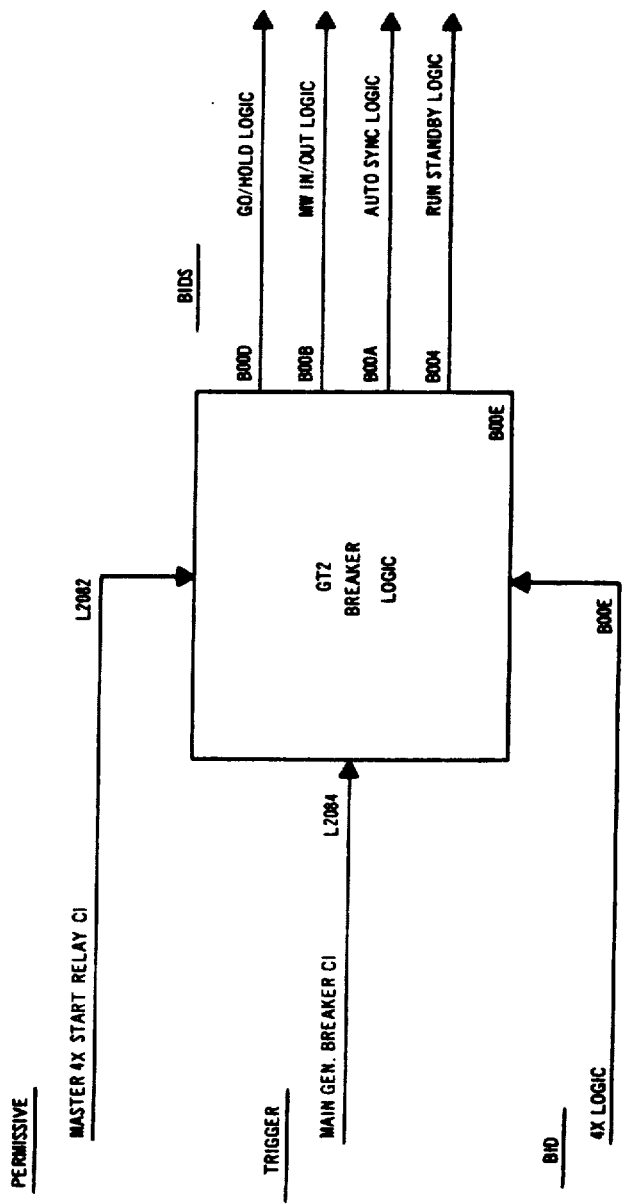
Figure 8F:
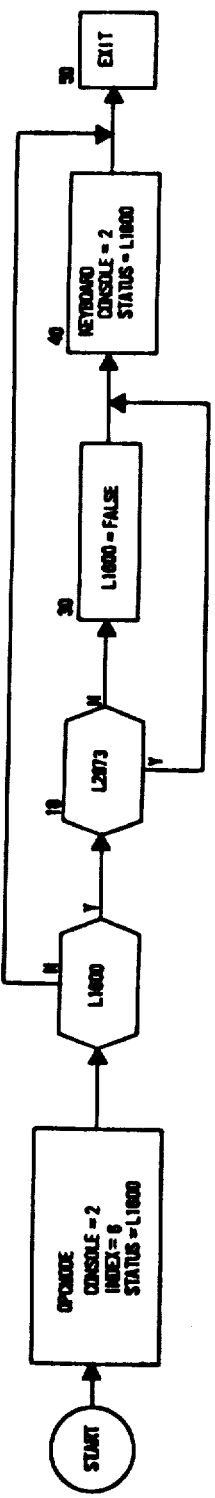
Figure 8I:
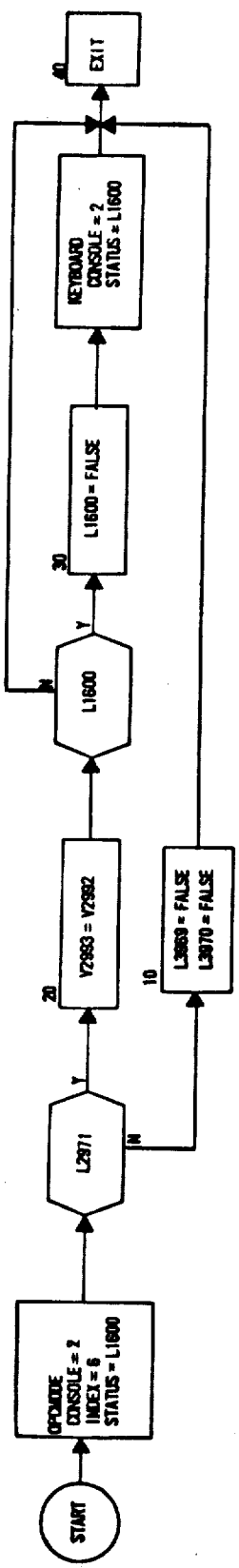
Figure 8L:
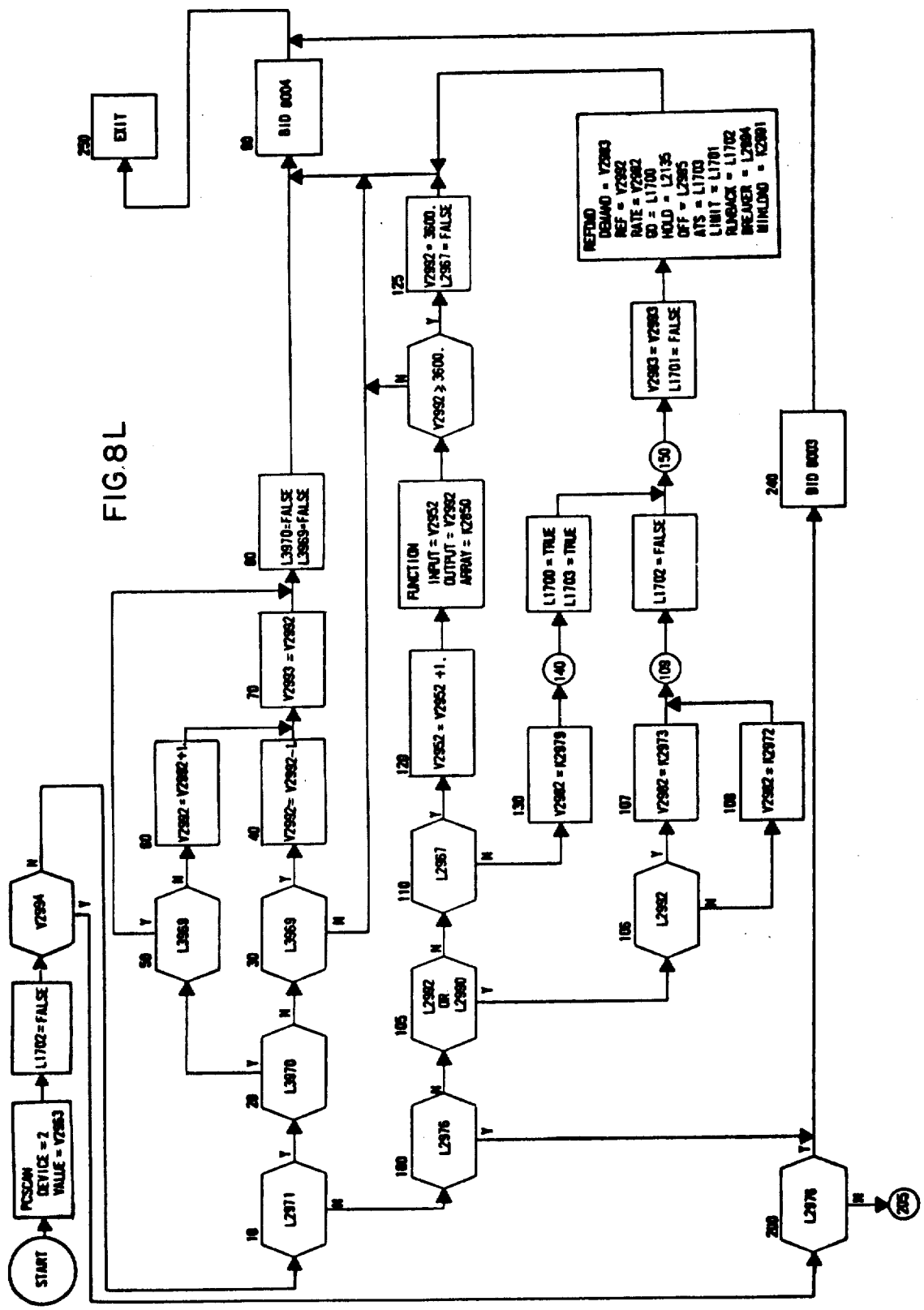
Figure 801:
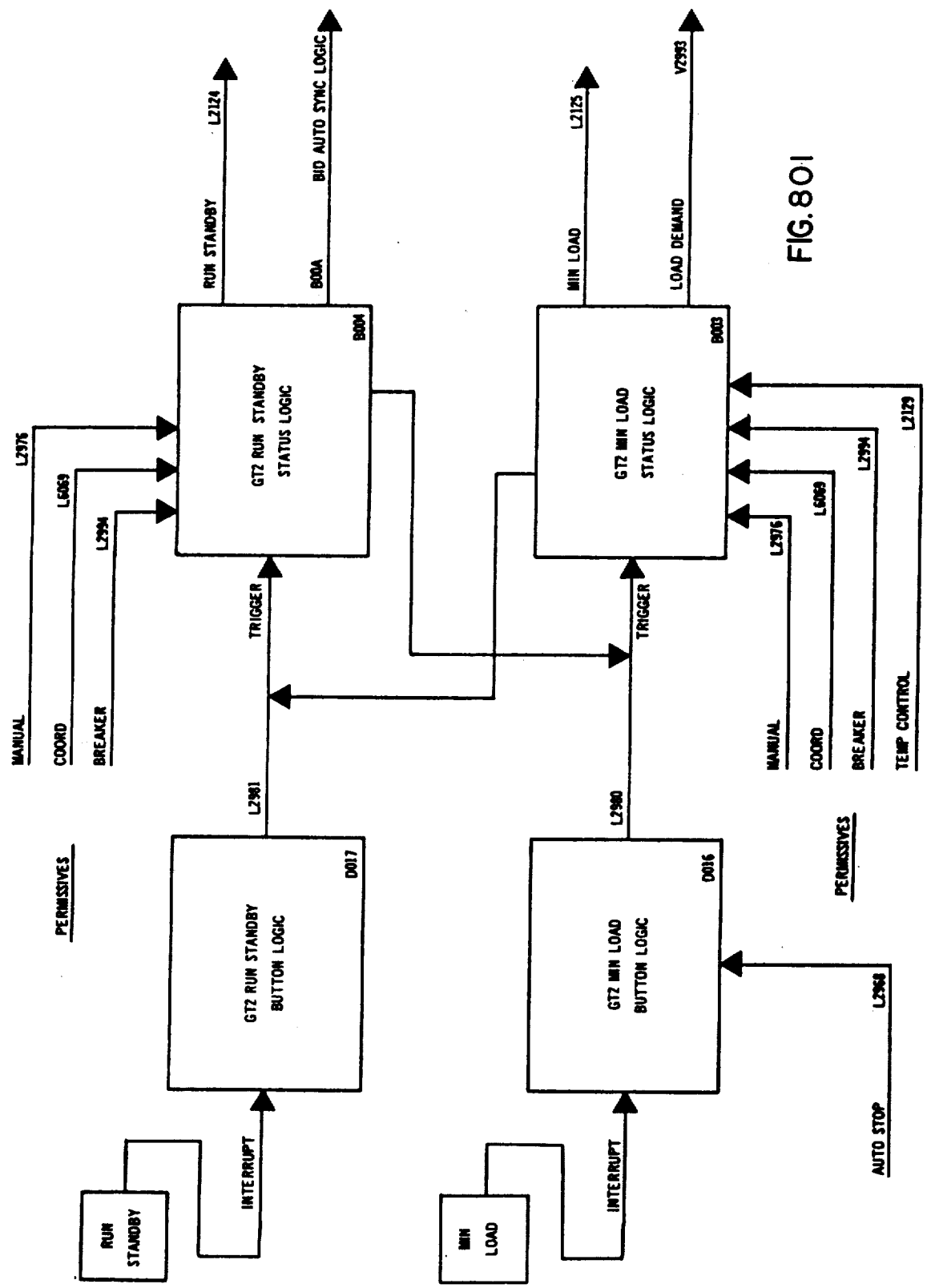
Figure 802:
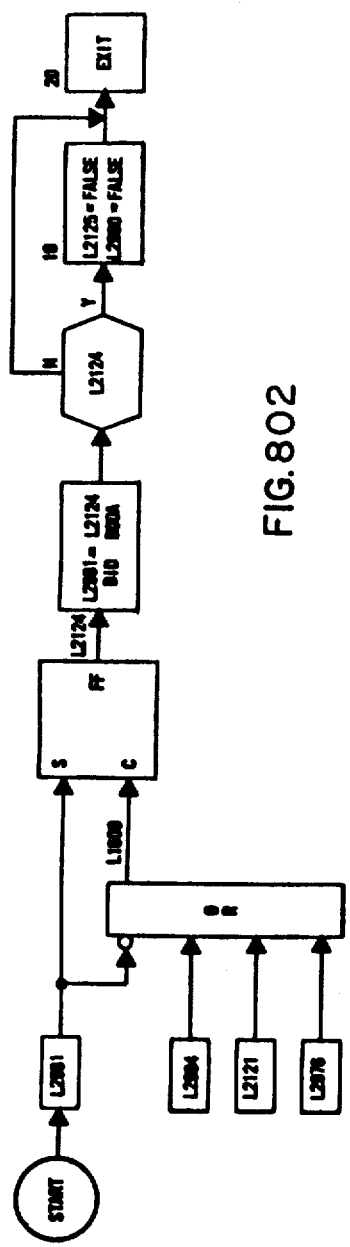
Figure 8U:
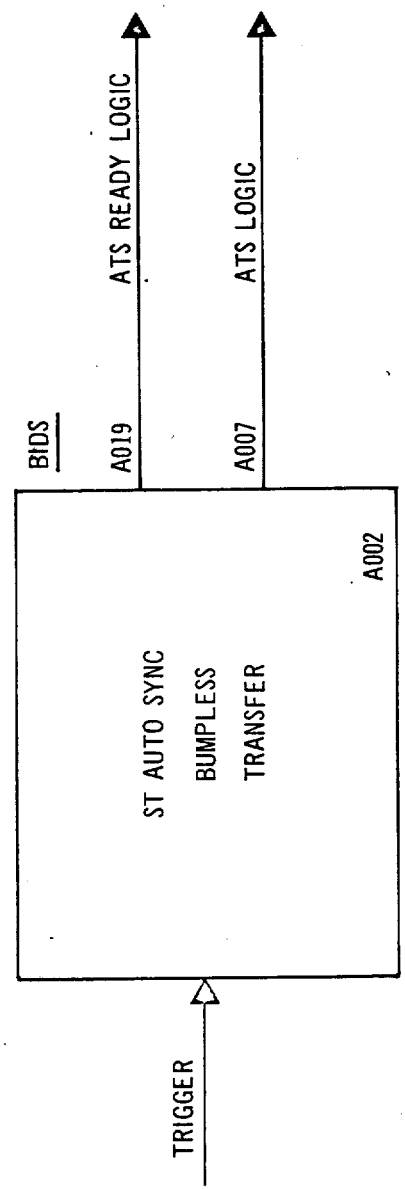
Figure 8X:
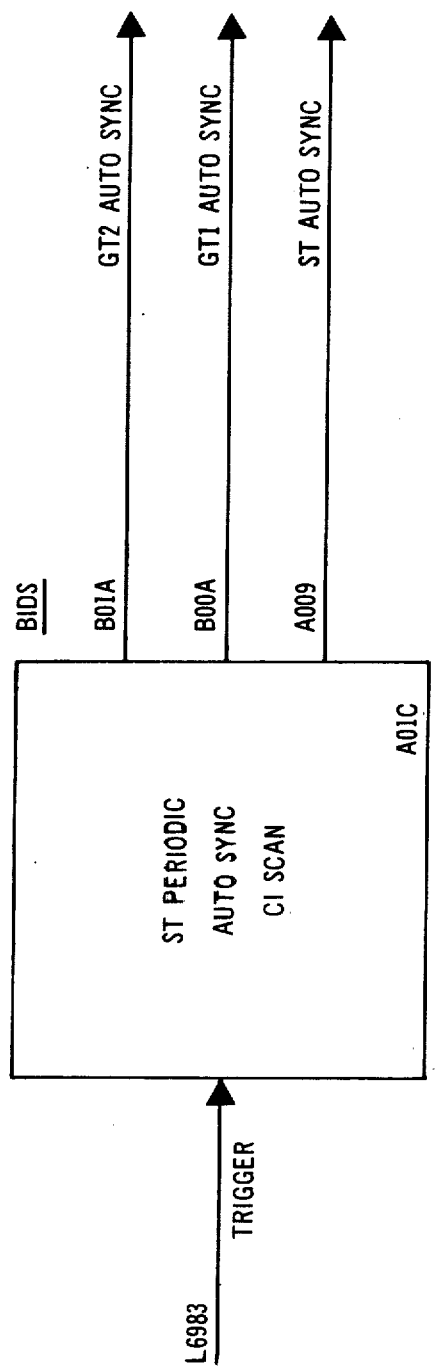
Figure 8:
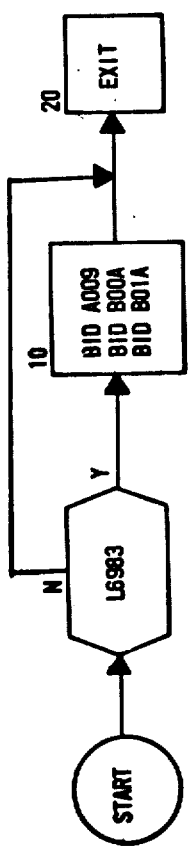

As shown in FIG. 8K, if the automatic sequencer permissives are generated, i.e. operator panel switch signals and voltage regulator breaker closed signals, the start and synchronization time of each turbine is recorded. The turbine-generator selection fo synchronization is based on the order in which the turbines reach synchronous speed and whether the sequence is ready to be advanced, i.e. the previous turbine had reached minimum load after its synchronization or the previous turbine has been rejected from coordinated control. If the first check is passed, i.e. startup time less than X min, a contact closure output is generated for the time relay associated with the selected turbine. In one embodiment, for example, X was set equal to 13 minutes for the gas turbines. If the first time check is not passed, the turbine-generator is rejected from coordinated control.

As the external synchronizer functions to match generator and line voltage and frequency after a call for synchronization of a timer records the time for synchro process time. At synchronization, the time for synchronization is checked against a limit of Y seconds and, if it is greater, the turbine-generator is rejected from the coordinated sequencing system. If if is less, a check is made to determine whether the breaker close time is greater than 20 seconds. A negative breaker close check also results in a rejection of the turbine from coordinated control.

If the breaker has been stably closed for more than 20 seconds, a check can be made to determine whether the last synchronized turbine-generator has reached minimum load operation which is demanded immediately on breaker closure. The minimum gas turbine load, as one example can be 4MW. Once the turbine-generator reaches minimum load, the sequence is advanced to the next turbine-generator. Any rejection from coordinated control similarly results in a sequence advance.

A002 — STEAM TURBINE AUTO SYNC BUMPLESS TRANSFER

Functional Description

The auto sync bumpless transfer system responds to conditions in the steam turbine which are related to synchronizing with the automatic synchronizer hardware. The function of the auto sync system is to place the turbine in the automatic synchronizer control mode if all conditions are properly set. Thus after the automatic acceleration to a synchronous speed of 3,600 rpm, the computer control system will normally switch direction of the turbine to a software program which responds to speed raise and lower pulses generated by electronic hardware. This equipment senses turbine speed and generator terminal voltage, and sends adjustments to appropriate equipment to align these quantities to their proper value for connection of the turbine-generator to the electric utility power system. The terminal voltage is adjusted by raise and lower pulses sent to the generator field voltage regulator circuitry, while the speed is adjusted by raise and lower pulses (contact inputs) which are sent to the control computer. The PACE digital control system then regulates the turbine speed reference, and ultimately the control valves which admit steam to the turbine. To yield the speed necessary to meet the synchronizing hardware requirements when these needs are satisfied the automatic synchronizer system will close the main generator breaker. Thus connecting the steam turbine-generator to the electric utility system grids.

The attached functional diagram indicates the various permissive conditions which must be satisfied to synchronize the steam turbine with the auto sync system, should the auto snnc logical variable L3971 change state meaning that it has just gone into service or just been rejected from service. Then the trigger action will result in execution of this auto sync bumpless transfer control chain. This software then performs the required actions to made the transition into or out of auto sync smoothly. This includes determining validity of the numerical keyboard on the steam turbine BTG board and bidding other control system chains to align themselves to the new state of auto sync. In addition, the steam turbine reference and demand are corrected for the change in state of the auto sync mode.

Flow Chart Description

The flow chart for the auto sync bumpless transfer first bids the automatic turbine startup (ATS) ready logic, so that it may align itself to the new state of auto sync. Then the OPCMODE algorithm is executed to determine if the demand button (Index = 10) on the steam turbine BTG board (Console = 3) has been pushed. This algorithm responds with the status of demand in the temporary logical variable L3600. Next the new state of the auto sync mode L3971 is interrogated; should it be false, meaning that auto sync has just been disabled, then at block 100 the internal auto sync raise state L3979 and the lower state L3969 are both reset to the false when the auto sync is rejected. Then the status of the demand button as stored in L3600 is checked; if it is false the chain exits, but if it is true this means demand is pushed and thus the keyboard validity has to be determined. This is done at block 110 by checking the state of the manual variable L3976. If it is true the keyboard validity will have been checked in the auto manual logic, so this chain simply exits. But if L3976 is false, the turbine is on automatic control and therefore at block 120 the variable L3290 is interrogated to test if the steam turbine is in coordinated control; if the value is true the chain exits again because keyboard will already have been satisfied. But if L3290 is false, then the state of the ATS mode L3231 is checked to see if the turbine is in the automatic turbine startup supervisory mode at block 130. If this is true the chain exits since keyboard once more will have been determined. But if L3231 is false then the turbine is in the local automatic control mode and the keyboard is valid. Therefore the chain transfers to block 200 with L3600 true for execution of the keyboard algorithm.

If the test at the beginning of this chain on the auto sync state L3971 had indicated that is was true, this means that the turbine has just transferred to the auto sync mode. Then at block 10 the steam demand V3993 is set equal to the steam turbine reference V3992. Normally these will have been equal, but it is possible under some conditions that the turbine was still accelerating just prior to going into the auto sync mode, and thus reference and demand could have differed by a small number of rpm. Next the chain executes a bid for the automatic turbine startup (ATS) ready logic so that the ATS mode will be turned off if it had been accelerating the turbine just prior to auto sync. Finally the status of the demand button as contained in L3699 is checked. If it is false the chain exits. But if L3600 is true this means that demand is pushed. Then at block L3600 is set false to make the keyboard invalid in the auto sync mode; then the keyboard algorithm is executed at block 200 for the steam turbine BTG board (Console = 3) with the status in L3600, which may be true or false depending on the circumstances as described in the paragraphs.

A008 — STEAM TURBINE AUTO SYNC RAISE LOWER LOGIC

Functional Description

The auto sync raise lower logic responds to changes in state of the raise and the lower contact inputs generated by the automatic synchronizer hardware. The general function of the automatic synchronizing system in the PACE power plant is to provide a mechanism for synching any of the three turbine generators to the utility system network, through use of set of synchronizer hardware and the control computer software.

Thus after automatic acceleration of a turbine from turning gear to synchronous speed, under supervision provided by the operator from a keyboard or by internal programs, the control computer will normally switch supervision of a turbine to a software system which responds to speed raise and lower pulses generated by electronic synchronizer hardware. This equipment senses turbine speed and generator terminal voltage, and sends adjustments to appropriate equipment to align these quantities to their proper value for connection of the turbine generator to the electric utility power system. The terminal voltage is adjusted by raise and lower pulses sent to the individual generator field regulator circuitry, while the speed is adjusted by raise and lower pulses (contact inputs) which are sent to the control computer. The PACE digital control system then adjusts the turbine speed reference, and ultimately the steam admitting control valves on the steam turbine or the gas admitting throttle valve on the gas turbines, to yield the speed necessary to meet the synchronizer hardware requirements, when these needs are satisfied the automatic synchronizer will close the main generator breaker, thus connecting the turbine generator to the electric utility grid.

The attached functional diagram indicates that this auto sync raise lower logic is triggered into execution by the auto sync raise and lower contact inputs L3096 and L3097, so that the chain runs only on demand. The diagram also shows that permissive conditions involving the auto sync mode for each of the three turbines must be satisfied before the raise lower logic will accept the raise lower contacts. The permissives simply require one of the turbines to be in the auto sync mode; whether it is gas turbine 1 (L1971), gas turbine 2 (L2971), or the steam turbine (L3971), is immaterial to this logic. The control computer system will guarantee that one and only one of the turbines will be attached to the synchronizer hardware at any time. When this is the case, the auto sync raise lower logic will generate internal computer auto sync raise and lower states L3970 and L3969, respectively. Other control computer chains will then react to these logical variables and adjust the appropriate turbine speed reference.

Flow Chart Description

The flow chart for the auto sync raise lower logic indicates that the logical OR the following variables is computed and stored in the temporary logical state L3601:

L1971 — Gas turbine 1 is in the auto sync mode
L2971 — Gas turbine 2 is in the auto sync mode
L3971 — Steam turbine is in the auto sync mode Then this state L3601 is used in a logical and operation with the auto sync raise contact input L3096, with the result stored in the temporary location L3600. A check is next made on L3600; should it be false this means either that there is no raise contact input or that no turbine is in the auto sync mode. In both cases the chain simply transfers to block 30. But if L3600 is true then a raise contact input exists while one of the turbines is to be automatically synchronized; therefore at block 10 the internal auto sync raise state L3970 is set true and the chain proceeds to block 30.

At block 30 a similar computation is made with respect to the auto sync lower contact input L3097, which is used in a logical and operation with L3601 and stored in the temporary location L3600. A check is next made on L3600; should it be false then either the lower contact input is false or no turbine is in the auto sync mode. In both cases the chain simply exits. But if L3600 is true then a lower contact input exists while one of the turbines is to be synchronized automatically; therefore at block 40 the internal auto sync lower state L3969 is set true and the chain exits.

A009 — STEAM TURBINE AUTO SYNC LOGIC

Functional Description

The auto sync logic responds to conditions in the steam turbine which are related to use of the automatic synchronizer hardware and the computer control system. The function of the auto sync logic is to place the turbine in the automatic synchronizer control mode if all conditions are properly set. Thus after the automatic acceleration to a synchronous speed of 3,600 rpm, the computer control system will normally switch direction of the turbine to a software system which responds to speed raise and lower pulses generated by electronic hardware. This equipment senses turbine speed and generator terminal voltage, and sends adjustments to appropriate equipment to align these quantities to their proper value for connection of the turbine-generator to the electric utility power system. The terminal voltage is adjusted by raise and lower pulses sent to the generator field voltage regulator circuitry, while the speed is adjusted by raise and lower pulses (contact inputs) which are sent to the control computer. The PACE digital control system then adjusts the turbine speed reference, and ultimately the control valves which admit steam to the turbine, to yield the speed necessary to meet the synchronizing hardware requirements. When these needs are satisfied the automatic synchronizer will close the main generator breaker, thus connecting the steam turbine-generator to the electric utility system grid.

The attached functional diagram indicates the various contact inputs which trigger execution of this software, so that the chain runs only on demand when these variables change state. The diagram also shows that this auto sync logic is bid by a number of other control computer chains, and that a set of permissive conditions must be satisfied before the automatic synchronizer system will be actuated. Finally, this auto sync logic may trigger execution of a bumpless transfer control system chain A002 which will carry out the necessary computations to align the control computer system for the new state of the auto sync mode.

A brief description of the logical variables whose change of state will trigger execution of this auto sync logic follows:

L3972 — An internally generated variable which requests the auto sync mode. This state is generated by the steam turbine speed monitor system which continually monitors turbine speed. When synchronous speed (actually about 3,590 rpm) is reached L3972 is set true. Otherwise it is reset to the false state.

L3087 — A contact input representing the state of the voltage regulator manual auto switch on the steam turbine BTG board.

L3088 — A contact input representing the state of the automatic synchronizer manual auto switch on the steam turbine BTG board.

L3952 — A request from the automatic turbine startup (ATS) software system for automatic synchronizing after the ATS has supervised rolling of the steam turbine.

L3965 — An internally generated variable which may reject the auto sync control mode. This logical state is developed by the coordination system. If the turbine is not synchronized in a predetermined time interval (usually 120 seconds) then L3965 is set true. Otherwise it is reset to the false state.

A brief description of the permissive conditions which must be satisfied for the auto sync mode follows:

L1971 — A computed logical state which indicates gas turbine 1 is in the auto sync control mode. Since only one set of automatic synchronizing hardware is available in the PACE power plant, then only one turbine may be synchronized at a time.

L2971 — A computed logical state which indicates that gas turbine 2 is in the auto sync mode, and therefore no other turbine can be synchronized until it is out of the auto sync mode.

L1999 — A computed logical state which indicates that gas turbine 1 has just synchronized. The control system then inhibits use of the automatic synchronizer for a specified lockout interval (usually 20 seconds) until gas turbine 1 is verified as staying on the line.

L2999 — A computed logical state which indicates that gas turbine 2 has just synchronized, and therefore no other turbine can sync until this lockout interval times out.

L3960 — A computed logical state which indicates that the steam turbine has just synchronized, and therefore no other turbine, including the steam turbine can sync until this lockout interval times out.

A brief description of the control chains which may bid the steam turbine auto sync mode follows:

A00E — This breaker logic chain will bid the auto sync logic when the main generator breaker closes. When this occurs the auto sync logic must be disabled, whether or not it had been in service when the breaker opens. The auto sync logic may be enabled provided all other conditions are satisfied.

A001 — The control valve auto/manual logic will bid the auto sync chain when the control valves transfer from auto to manual or from manual to auto. On manual conrol the auto sync logic must be disabled, while on automatic control the auto sync logic may be enabled provided all other conditions are satisfied.

A018 — The throttle pressure runback logic will bid the auto sync logic when a throttle pressure runback exists; during a runback situation the auto sync logic must be disabled since the control valves are being runback to overcome a contingency.

900D — This plant normal stop logic will bid the auto sync logic when the normal stop button is pushed. This is to inhibit automatic synchronizing when the entire plant is in the process of stopping automatically.

A01C — The periodic contact input scan bids the auto sync mode when the contact input hardware containing the synchronizer raise and lower pulses has switched to a periodic scan. Normally these contacts are on a demand when they change state, and the auto sync logic system is designed on this basis. However, should this hardware be changing state at such a high rate that the control computer system cannot continually scan and carry out its normal functions, then the contact scan system switches to a periodic, once a second, scan rate. In this situation the auto sync mode must be disabled since it cannot properly function under periodic scan conditions.

Theoretical Derivation

Before the steam turbine can be synchronized some special considerations must be satisfied. These involve the status of the gas turbines and the two heat recovery steam generators (HRSG) which make up the total PACE power plant. Since the generation of steam depends predominantly on the gas turbine exhaust gas for heat input, then at least one of the gas turbine electrical generators must be on the line producing megawatts to guarantee sufficient steam before the steam turbine can be synchronized. In addition, should a gas turbine be in coordinated control then it must be on the line before the steam turbine can be synchronized. This requirement is to conform with the coordination system direction of the PACE power plant in totality.

Thus we have a situation in which the control computer must check the status of each gas turbine main generator breaker and its coordination state, to determine the combinations which allow steam turbine automatic synchronizing. This situation may be displayed conveniently with a logical table of combinations (a truth table). Since there are two gas turbine breakers and two coordination states, this means four logical variables must be checked. Thus the table will have 16 combinations. The rules for valid steam turbine automatic synchronization will be repeated, since the table of combinations must satisfy them.

1. At least one gas turbine must be on the line (breaker closed).
2. If a gas turbine is in coordinated control, then it must be on the line.

The identification of the four logical variables involved in this evaluation, and the temporary variable representing the decision whether or not to sync the steam turbine, follow:

L6077 — Gas turbine 1 coordination state
L6069 — Gas turbine 2 coordination state
L1994 — Gas turbine 1 main generator breaker state
L2994 — Gas turbine 2 main generator breaker state
L3601 — Steam turbine decision state for automatic synchronizing The table of combinations is given below, with a zero (0) entry indicating the state is false and a one (1) entry indicating the state is true.

TABLE 1

| A<br>L6077 | B<br>L6069 | C<br>L1994 | D<br>L2994 | L3601 |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 1 |
| 0 | 1 | 0 | 0 | 0 |
| 0 | 1 | 0 | 1 | 1 |
| 0 | 1 | 1 | 0 | 0 |
| 0 | 1 | 1 | 1 | 1 |
| 1 | 0 | 0 | 0 | 0 |
| 1 | 0 | 0 | 1 | 0 |
| 1 | 0 | 1 | 0 | 1 |
| 1 | 0 | 1 | 1 | 1 |
| 1 | 1 | 0 | 0 | 0 |
| 1 | 1 | 0 | 1 | 0 |
| 1 | 1 | 1 | 0 | 0 |
| 1 | 1 | 1 | 1 | 1 |

One may form a logical expression for this table of combinations by writing a Boolean algebra equation for each row containing a true (1) in the decision state column L3601. Then by use of Boolean theorems this expression may be reduced to a minimum form. In the interest of simplifying the equation formats, the letters A, B, C and D will be used to represent the logical variables L6077, L6069, L1994, and L2994 respectively. The last step in the expression will then be rewritten in terms of this original logical variables. Note also that a prime (') indicates logical inversion or negating, that a plus (+) indicates logical OR, and that consecutive variables indicates logical AND operations.

L3601
= A'B'C'D + A'B'CD' + A'BC'D + A'BC'D + A'BCD + AB'CD' + AB'CD + ABCD
= A'B'(C'D + CD' + CD) + A'BD(C' + C) + AB'C(D' + D) + ABCD
= A'B'(C'D + C(D' + D')) + A'BD + AB'C + ABCD
= A'B'(C'D + C) + A'BD + AB'C + ABCD
= A'B'(C + D) + A'BD + AB'C + ABCD
L3601 = L6077' L6069' (L1994 + L2994) + L6077' L6069 L2994 + L6077 L6069' L1994 L6077 L6069 L1994 L2994

Thus the decision state L3601 derived above serves as a permissive for automatic synchronizing of the steam turbine, along with the other variables discussed in the previous paragraphs.

Flow Chart Description

The auto sync control chain evaluates the logical AND of all the conditions needed to achieve the auto sync state L3971. A tabulation of each of these conditions which exists in the control computer as an L number follows:

L3601 — The special decision state involving the steam turbines and the gas turbines as derived and discussed previously L3965 — There must not be a coordinated control system reject from the auto sync mode for the steam turbine L3999 — There must not be a throttle pressure runback L1971 — Gas turbine 1 must not be in the auto sync mode L2971 — Gas turbine 2 must not be in the auto sync mode L3976 — The steam turbine must not be in manual control L3966 — The main generator breaker must not be closed L3952 — The automatic turbine startup (ATS) software has requested auto sync while the turbine is under the ATS supervision mode L3231

L3972 — A request for auto sync has been made by the speed monitor system while the turbine is not in the ATS supervision mode L3231 and both the voltage regulator switch L3087 and the synchronizer switch L3088 on the steam turbine BTG board are in the auto positions L6983 — The periodic contact input scan for the auto sync raise and lower pulses must not be enabled L3960 — The steam turbine must not be in the auto sync lockout state due to synchronization of the steam turbine in the last 20 seconds L1999 — Gas turbine 1 must not be in the auto sync lockout state due to synchronization of gas turbine 1 in the last 20 seconds L2999 — Gas turbine 2 must not be in the auto sync lockout state due to synchronization of gas turbine 2 in the last 29 seconds.

If all these conditions are satisfied the auto sync state L3971 will be activated; if not, then L3971 will be computed as false. The remainder of the auto sync flow chart then indicates that the request for auto sync L3972 is set equal to the auto sync mode L3971 just computed. This is a form of latching so that L3972 will not continually retrigger the auto sync logic once the auto sync state is enabled. In addition a status lamp L6036 on the vertical coordinated BTG board, a monitor lamp L3186 on the vertical steam turbine BTG board, and a contact output L6153 to attach the automatic synchronizer hardware to the steam turbine, are each set equal to the auto sync state L3971 just computed. Thus each of these variables will align themselves to the same state as the auto sync logic system for the steam turbine. The chain then exits.

A01C — STEAM TURBINE AUTO SYNC SCAN REJECT LOGIC

Functional Description

The auto sync scan reject logic is triggered into execution by changes in state of a unique logical variable, which indicates that the auto sync raise/lower contact input channel is being scanned on a periodic basis rather than the normal demand basis. In order to carry out its functions properly the PACE control computer system must be provided with status input signals representing the various states of the PACE power plant which is to be controlled. These status signals consist of contact which are normally open or closed (set or reset). Traditionally such contacts have been scanned periodically at some reasonable rate such as once a second. However this method of processing contact inputs has two drawbacks: first, periodic contact scanning imposes a regular duty cycle on the computer which, even though small, is unnecessary for the large percentage of time when status contacts are not changing; and second, when a contact does change state the periodic scanning method, in the worst case, will not make this information available to the computer control system until a full scan period (say one second) later. Clearly both drawbacks are undesirable for those computer control systems in which fast response is a necessity.

To eliminate these effects the PACE contact input scanning system is organized on a demand basis, in which a scan of a group of contacts occurs when any contact in that group changes state. The grouping is made according to hardware implementation, which consists of 14 contacts per hardware channel; thus each hardware channel has assigned to it an interrupt which is energized when any contact input on that channel changes state. The control computer operatng system responds to the interrupt and immediately scans the 14 contacts on that channel only. The scanning is done at the highest control computer priority (level F) so that computer response is maximized while computer duty cycle is minimized for contacts which are stationary for long intervals of time.

Such demand scanning of contact inputs must observe one precautionary item which occasionally occurs in process control environments. This is the case in which a contact input chatters or oscillates at a high frequency. Invariably such a situation is due to system or hardware malfunctions which, once detected, are usually repaired or design changes are made to eliminate the problem, however, during the time such contacts may rapidly change state a computer utilizing a demand scan system is faced with high duty cycle performing the near continuous scan of fast changing contacts. Consequently some provision must be made to inhibit this essential capture of the computer by an oscillating contact input. In the PACE control computer system such protection is provided in the contact input scanning system software; here as interrupts are received for each contact input channel, a count is kept of the frequency of occurrence of each interrupt over a fixed time period (usually a second). Should this count for any channel exceed a preset limit, then the channel is automatically and immediately switched to a periodic (once a second) scan. Simultaneously, the logical variable L6984 is set true, which results in triggered execution of control computer chain A013. There the situation is brought to the operator's attention through initiation of another control chain which will periodically (every half second) flash a unique lamp on the coordinated control BTG board.

This lamp is behind the return demand scan button on the coordination BTG board. The operator may then push the button and return the offending contact input channel to a demand scan basis, assuming the hardware malfunction causing the oscillating contact problem has been corrected. If not, the contact input channel will immediately be rejected to a periodic scan, and the control chain A013 will again be triggered to initiate the return demand scan lamp to the flashing condition.

The attached functional diagram indicates the various portions of the control computer system which participate in the contact input scanning system. There are 12 hardware channels of contact inputs, each of which generate a unique sequence interrupt when any contact on that channel changes state. The software operating system performs its bookkeeping function of counting, as well as scanning, and when a preset count is reached the logical variable L6984 is set true. This then triggers execution of the control chain A013, and it immediately links into the PROGEN system the flashing chain A01B; the result is then flashing, at a half second on and half second off interval, of the return demand scan lamp. When the operator pushes the return demand scan button the chattering channel is returned to a demand scan and the variable L6984 is rest to the false state. Again triggered execution of chain A013 results in the unlinking of the flashing software from the PROGEN system. The result is to turn off and cease flashing of the return demand scan lamp until a similar situation arises.

The functional diagram also shows a special triggering action by the logical variable L6983. This occurs when there is oscillation on the hardware channel containing auto sync raise and lower contact inputs, which are developed by special automatic synchronizing electronic circuitry. In such a case not only is the channel rejected to a periodic scan, but the automatic synchronizing of any of the three PACE turbines must be inhibited. This is due to the auto sync control system design which is based on demand scan of raise and lower pulses (contact inputs) and immediate controlled response by the computer. Thus L6983 triggers into execution this auto sync scan reject logic chain A01C, which in turn bids the various turbine auto sync control chains so that they may reject their auto sync modes if such had been active. These software programs are listed as follows:

A009 — Steam turbine auto sync logic
A00A — Gas turbine 2 auto sync logic
B01A — Gas turbine 1 auto sync logic
Flow Chart Description The flow chart for this auto sync scan reject logic first interrogates the state of the logical variable L6983. Should it be false the chain simply exits, since this means the auto sync contact input channel has been returned to its normal demand scan basis; in this case the operator will select the auto sync mode on the appropriate turbine through switches and buttons on the BTG boards.

But if L6983 is true then the auto sync contact input channel has been rejected to a periodic scan and therefore any turbine which may be in the process of synchronizing must be rejected out of the auto sync mode. Therefore at block 10 bids are placed for the steam turbine auto sync logic A00A, gas turbine 1 auto sync logic B01A, and gas turbine 2 auto sync logic B00A. These control chains will then take care of the actual rejection from auto sync had any been in progress.

In the computer, certain control chains are employed in providing fuel flow or steam flow adjustments needed for synchronization. Steam turbine control chains are described in Appendix F of W.E. 44,522. The following gas turbine control chains are employed:

8005 — SELECT OPERATING MODE

In the operating mode selection chain, the speed and load references are generated according to the mode of plant or turbine operation. If the gas turbine is on manual fuel valve operation as indicated by the logical variable L2976, the track manual chain 8003 is bid and the select mode chain 8005 is ended. If automatic digital fuel control is operative, the flow chart path depends on whether the turbine is in wide range speed control, the synchronization process, or load control.

If the breaker is open as indicated by the variable V2994, the turbine is in wide range speed control. In turn, the variable L2967 indicates whether the turbine is under automatic startup speed control and if it is, the time V2952, which starts at the time point of flame on, is advanced by one second and the speed reference V2992 is determined from the stored speed-time curve K2850. If synchronous speed has not yet been reached, the speed/load chain 8004 is then bid to put the new speed reference in the integrator speed control loop and lift the turbine fuel flow to produce an actual turbine speed equal to the speed reference. When the turbine reaches synchronous speed, i.e. when the speed curve time has expired at 720 seconds, auto start L2967 is set false and the reference V2992 is set equal to 3600 rpm for manual or automatic synchronization.

On automatic synchronization, the variable L2971 is true and reference V2992 is set equal to its last value plus or minus 1 rpm according to whether a raise pulse or a lower pulse has been received from the external automatic synchronizer. Further, the demand V2993 is set equal to the new reference and the speed/load chain 8004 is bid to boost or lower the turbine speed by 1 rpm.

If the turbine is on manual synchronization, the auto start variable L2967 is false and the reference change rate V2982 is set equal to a stored manual sync acceleration rate V2982 which can be 1 rpm per second. In manual synchronization, the operator cannot override the reference change rate. The GO and ATS variables L1700 and L1703 are set true, the algorithm REFDMD outputs a changing reference V2992 according to the manual sync rate on and the speed/load chain 8004 is bid. As turbine speed changes and a line match occurs, the operator closes the breaker. If the turbine speed crosses the line speed without breaker closure, the operator puts in a new speed reference which will cause a recrossing of the turbine and line speeds or frequencies.

If a blade path temperature, surge or speed runback exists as indicated by L2992 or L2990, the reference change rate V2982 is made equal to the surge/speed runback rate K2973 or the BPT runback rate K2972, automatic start is bypassed, and the REFDMD algorithm generates the speed reference in accordance with the runback rate. Next, the speed/load chain 8004 is bid to change the turbine speed in accordance with the speed reference runback.

In load control, a runback similarly causes the load reference change rate to be set equal to the surge/speed load runback rate K2995 or the BPT load runback rate K2975. The REFDMD algorithm then implements the load reference runback.

In normal load operation without plant coordination, the load change rate V2982 is set equal to the operator selected load rate V2994 and a check is made to make sure the operator load demand is at least equal to minimum load. If temperature control L2130 is not selected, the algorithm REFDMD generates a load reference V2992 in accordance with the operator load demand V2993 at the operator load rate V1974. The speed/load chain 8004 is bid to operate to change the turbine fuel flow in accordance with the new load demand.

In coordinated control, the load demand and rate are made equal to V2979 and V2978 which are generated at the coordinated control level. If the temp change rate L5056 is excessive, the rate V2982 is made zero. The rate is also made zero in noncoordinated control, i.e. operator automatic control, if the digital temp control becomes limiting in load control as indicated by the variable L2130. As in other cases, the algorithm REFDMD generates the reference in accordance with the coordinated load demand and the coordinated rate or the temperature limiting rate.

In cases where it is desired to provide fixed time startup even though a hold or runback occurs, the select operating mode flow chart is modified as preferably indicated in the flow chart for chain 8005-A. Generally, this flow chart only shows the additional functions needed to provide time makeup. Thus, on a hold or runback, the acceleration timer continues to count, and on release of the hold or runback, a new rate schedule, ie. a higher speed curve slope is executed until the time is made up or until 3400 rpm at which time the normal speed curve slope applicable at that value is employed to enable stable transition through bleed valve closing and synchronization. In this embodiment, the hold or runback time is only partly made up if it is not made by the time the turbine reaches 3400 rpm.

8004 — SPEED/LOAD CONTROL

Chain 8004 contains controllers to adjust the gas turbine fuel to attain a desired speed or load setpoint. In order to determine whether speed or load control is selected, the chain first checks the breaker logical variable L2994. If the breaker is open, a speed control path is taken where a speed error is formed by subtracting the actual speed from the speed reference. This error is then fed into a proportional plus integral controller with limits, the output of which is ranged to the proper magnitude for output later to the throttle valve. When the breaker closes the last value of this throttle valve output, i.e. the idle fuel reference, is stored for later addition to the load fuel reference value.

If the breaker is found to be closed it means that the gas turbine is on line generating power and therefore in a loading mode. A check is then made to see if megawatt control has been selected and, if not, the reference from the reference demand REFDMD block is fed forward for summation with the last speed controller output after proper ranging for the throttle valve. This reference is under the control of other chains such as the blade path exhaust temperature control chain 8001 when megawatt control is not active.

If megawatt control is active, a path is taken through the feedforward plus trim megawatt control calculations. In this path the error between the megawatt reference and the actual generated megawatts is calculated and fed to a proportional plus integral control block with limits and its output is then summed with the original reference and ranged for the throttle valve. The resulting ranged signal is then summed with the idle fuel reference before being stored for later output.

At label 200 the speed and load control paths rejoin and the calculated throttle valve signal is checked against the external hardware surge and speed controller outputs providing that the readings of these signals have been found reliable. If the throttle valve signal as calculated by the speed or load controller exceeds either of the two limits, hold or runback logical flags are set provided the proper conditions exist.

Beginning at label 230 the chain checks actual generated megawatts against various load megawatt levels to determine if the gas turbine is at minimum, base or peak load. The appropriate logical variables are then set true for output as status lights on the operator control panel and for use by other chains. Chain 8004 exits after bidding for the Ready-Output chain 8002.

8006 — GT2 SPEED MONITOR

The first major section in chain 8006 is a check to see if the auto start or the start logical variables should be set true. These two logicals are set true provided that the following conditions are met: the breaker is open, the unit is in coordinated control, the start relay, 4X, represented as logical variable L2082 is not true and the unit has reached hot standby status. If all these conditions are met the variables L2265, auto start, L2966, L1966, start, are set true.

The chain then proceeds to a section where speed, V2050, is checked for reliability and logical variable L2993, speed unreliable, is set true or false accordingly. The selected speed V2987 is then set equal to speed V2050.

A check is now made on breaker status and if the breaker is found to be closed the chain proceeds to label 220, otherwise a further speed check is performed to determine whether the unit has reached synchronous speed. Logical variables for various panel indicators such as the sync speed lamp and for interface contacts with the synchronizer are set true or false as a result of this check. After the synchronous speed check comes a section of the chain which examines the auto stop, L2968 and normal stop, L6093, logical variables. If either has been set for some number of passes through the chain a stop logical variable L2260 is set true. The program now goes to label 220 where it bids for the temperature control chain 8001 and checks the megawatt reading for reliability before exiting.

INDEX OF VARIABLES FOR DRAWINGS

FIG. 8A1

V2992 REFERENCE
V2990 MW CONTROLLER TOTAL OUTPUT
V2974 SPEED FUEL REFERENCE
V2184 GENERATOR MW
V2973 LOAD FUEL REFERENCE
V2976 FUEL VALVE SET POINT
V2988 MW CONTROLLER LAST INPUT
V2909 MW CONTROLLER INTEGRAL OUTPUT
V2965 SPEED CONTROLLER OUTPUT
V2964 SURGE CONTROLLER OUTPUT
V2987 SELECTED SPEED
V2955 SPEED CONTROLLER TOTAL OUTPUT
V2954 SPEED CONTROLLER INTEGRAL OUTPUT
SPEED CONTROLLER LAST INPUT
L2994 BREAKER FLIPFLOP
L2996 MW FLIPFLOP
L2992 SURGE/SPEED RUNBACK
L2936 COMPUTED HOLD
L2135 HOLD LAMP
L6010 MIN LOAD LAMP
L6011 BASE LAMP
L6012 PEAK LAMP
L2977 ANALOG SURGE/SPEED UNRELIABLE
K2988 OUTPUT RANGING GAIN-SPEED
K2987 OUTPUT RANGING GAIN-LOAD
K2950 MW CONTROLLER ARRAY
K2990 SURGE/SPEED RUNBACK DEADBAND
K2991 MINIMUM LOAD
K2920 SPEED CONTROLLER ARRAY
K2964 BASE MW
K2997 INITIAL FUEL VALVE POSITION
8002 READY/OUTPUT

FIG. 8A2

V2992 REFERENCE
V2990 MW CONTROLLER TOTAL OUTPUT
V2974 SPEED FUEL REFERENCE
V2104 GENERATOR MW
V2973 LOAD FUEL REFERENCE
V2976 FUEL VALVE SET POINT
V2988 MW CONTROLLER LAST INPUT
V2989 MW CONTROLLER INTEGRAL OUTPUT
V2065 SPEED CONTROLLER OUTPUT
V2064 SURGE CONTROLLER OUTPUT
V2987 SELECTED SPEED
V2955 SPEED CONTROLLER TOTAL OUTPUT
V2954 SPEED CONTROLLER INTEGRAL OUTPUT
V2953 SPEED CONTROLLER LAST INPUT
L2994 BREAKER FLIPFLOP
L2996 MW FLIPFLOP
L2992 SURGE/SPEED RUNBACK
L2986 COMPUTED HOLD
L2135 HOLD LAMP
L6010 MIN LOAD LAMP
L6011 BASE LAMP
L6012 PEAK LAMP
L2977 ANALOG SURGE/SPEED UNRELIABLE

K2988 OUTPUT RANGING GAIN-SPEED
K2987 OUTPUT RANGING GAIN-LOAD
K2950 MW CONTROLLER ARRAY
K2990 SURGE/SPEED RUNBACK DEADBAND
K2991 MINIMUM LOAD
K2920 SPEED CONTROLLER ARRAY
K2964 BASE MW
K2997 INITIAL FUEL VALVE POSITION
8002 READY/OUTPUT
V2050 SPEED
V2987 SELECTED SPEED
V2951 STOP COUNTER
V6980 START TIMER
V2104 GENERATOR MW
L2994 BREAKER FLIPFLOP
L2972 REQUEST FOR AUTO SYNC
L6007 SYNC SPEED LAMP
L2974 REQUEST FOR MANUAL SYNC
L6006 START DEV OFF LAMP
L6069 COORD LAMP
L2082 MASTER 4X RELAY CI
L2081 HOT STANDBY CI
L2256 START CO
L2966 AUTO START
L2976 MANUAL FUEL VALVE
L2260 STOP CO
L2968 AUTO STOP
L6093 NORMAL STOP LAMP
L2993 SPEED UNRELIABLE
L2995 MW UNRELIABLE
K2974 SYNC SPEED
K2960 MAX. STOP COUNT
8001 (BP-EXHAUST) TEMPERATURE CONTROL

FIG. 8D1

V2993 OPERATOR LOAD DEMAND
V2992 REFERENCE
V8880 COORD GT2 START TIMER
V8883 COORD GT2 AUTO SYNC TIMER
V2989 MW CONTROLLER INTEGRAL OUTPUT
V9992 COORD REFERENCE
V2988 MW CONTROLLER LAST INPUT
L2994 BREAKER FLIPFLOP
L2084 MAIN GEN. BREAKER CI
L2032 MASTER 4X RELAY CI
L2124 RUN STANDBY LAMP
L2976 MANUAL FUEL VALVE
L2121 COORD LAMP
L6007 SYNC SPEED LAMP
L6009 BKR CLOSED LAMP
L6010 MIN LOAD LAMP
L6011 BASE LAMP
L6012 PEAK LAMP
L2125 MIN LOAD LAMP
L2014 BASE BUTTON CI
L2130 TEMP CONTROL BUTTON/LAMP
L2900 MIN LOAD BUTTON PUSHED
L2129 MW CONTROL BUTTON/LAMP
L6006 START DEV OFF LAMP
L2906 AUTO STARTUP
L6065 LOCAL PLANT COORD LAMP
L2067 AUTO START
L2261 OPEN MAIN GEN. BREAKER CO
K2991 MINIMUM LOAD
K4999 ZERO = 0.
K2964 BASE MW
K2965 PEAK MW
K5999 RATED SPEED = 3600.

B00D GO/HOLD LOGIC
B00B MW IN/OUT LOGIC
B00A AUTO SYNC LOGIC
B004 RUN STANDBY LOGIC
FP MW
SS SPEED

FIG. 8D2

V2993 OPERATOR LOAD DEMAND
V2982 REFERENCE
V8880 COORD GT1 START TIMER
V8883 COORD GT1 AUTO SYNC TIMER
V2980 MW CNTROLLER INTEGRAL OUTPUT
V8892 COORD REFERENCE
V2988 MW CONTROLLER LAST INPUT
L2994 BREAKER FLIPFLOP
L2084 MAIN GEN. BREAKER CI
L2082 MASTER 4X RELAY CI
L2124 RUN STANDBY LAMP
L2976 MANUAL FUEL VALVE
L2121 COORD LAMP
L6007 SYNC SPEED LAMP
L6009 BKR CLOSED LAMP
L6010 MIN LOAD LAMP
L6011 BASE LAMP
L6012 PEAK LAMP
L2125 MIN LOAD LAMP
L2014 BASE BUTTON CI
L2130 TEMP CONTROL BUTTON/LAMP
L2980 MIN LOAD BUTTON PUSHED
L2129 MW CONTROL BUTTON/LAMP
L6006 START DEV OFF LAMP
L2966 AUTO STARTUP
L6965 LOCAL PLANT COORD LAMP
L2867 AUTO START
L2281 OPEN MAIN GEN. BREAKER CO
K2991 MINIMUM LOAD
K4999 ZERO =0.
K2964 BASE MW
K2965 PEAK MW
K5999 RATED SPEED=3600.
B00D GO/HOLD LOGIC
B00B MW IN/OUT LOGIC
B00A AUTO SYNC LOGIC
B004 RUN STANDBY LOGIC
PP MW
SS SPEED

FIG. 8F

L2973 MANUAL SYNC MODE

FIG. 8G

L2974 REQUEST FOR MANUAL SYNC
L2976 MANUAL FUEL VALVE
L2994 BREAKER FLIPFLOP
L2080 AUTO SYNC SW. CI
L2992 SURGE/SPEED RUNBACK
L2990 BPT RUNBACK
L2971 AUTO SYNC MODE
L2973 MANUAL SYNC MODE
L2968 AUTO STOP
L6093 NORMAL STOP LAMP

FIG. 8I

V2992 REFERENCE
V2993 OPERATOR LOAD DEMAND
L2971 AUTO SYNC MODE
L3989 AUTO SYNC LOWER

L3970 AUTO SYNC RAISE

FIG. 8J

L2972 REQUEST FOR AUTO SYNC
L2976 MANUAL FUEL VALVE
L2994 BREAKER FLIPFLOP
L2088 AUTO SYNC SW. CI
L3971 ST AUTO SYNC MODE
L2971 GT2 AUTO SYNC MODE
L1971 GT1 AUTO SYNC MODE
L2992 SURGE/SPEED RUNBACK
L2124 RUN STANDBY LAMP
L2990 BPT RUNBACK
L6008 SYNC ON LAMP
L2087 VOLTAGE REG. SW. CI
L2965 REJECT FROM AUTO SYNC
GT2 AUTO SYNC CO
FIELD BREAKER CI
L2968 AUTO STOP
L6093 NORMAL STOP LAMP
L6983 SCAN REJECT AUTO SYNC
B008 MANUAL SYNC LOGIC

FIG. 8L

V2994 OPERATOR LOAD RATE
V2993 OPERATOR LOAD DEMAND
V2992 REFERENCE
V2983 DEMAND
V2982 RATE
V2979 COORDINATED DEMAND
V2978 COORDINATED RATE
V2963 FUEL VALVE NHC CARD POSITION
V2952 ACCELERATION TIME
L2994 BREAKER FLIPFLOP
L3970 AUTO SYNC RAISE
L3969 AUTO SYNC LOWER
L2976 MANUAL FUEL VALVE
L2971 AUTO SYNC MODE
L2121 COORD LAMP
L2136 GO LAMP
L2135 HOLD LAMP
L2985 COMPUTED GO/HOLD RESET
L2992 SURGE/SPEED RUNBACK
L2990 BPT RUNBACK
T2130 TEMP CONTROL BUTTON/LAMP
L5056 TEMP CHANGE ABOVE 7.5 CI
L2967 AUTO START
L2968 AUTO STOP
L2261 OPEN MAIN GEN. BREAKER CO
L6093 NORMAL STOP LAMP
K2994 MAXIMUM LOAD RATE
K2995 SURGE/SPEED LOAD RUNBACK RATE
K2975 BPT LOAD RUNBACK RATE
K2973 SURGE/SPEED SPEED RUNBACK RATE
K2972 BPT SPEED RUNBACK RATE
K2991 MINIMUM LOAD
K2979 MANUAL SYNC ACC RATE
K2850 ACCELERATION CURVE ARRAY
8003 TRACK MANUAL
8004 SPEED/LOAD CONTROL

FIG. 8M

V2994 OPERATOR LOAD RATE
V2993 OPERATOR LOAD DEMAND
V2992 REFERENCE
V2983 DEMAND
V2932 RATE
V2979 COORDINATED DEMAND
V2978 COORDINATED RATE
V2963 FUEL VALVE NGC CARD POSITION
V2952 ACCELERATION TIME
L2994 BREAKER FLIPFLOP
L3970 AUTO SYNC RAISE
L3979 AUTO SYNC LOWER
L2976 MANUAL FUEL VALVE
L2971 AUTO SYNC MODE
L2121 COORD LAMP
L2136 GO LAMP
L2135 HOLD LAMP
L2985 COMPOUTED GO/HOLD RESET
L2992 SURGE/SPEED RUNBACK
L2990 BPT RUNBACK
L2130 TEMP. CONTROL BUTTON/LAMP
L5056 TEMP. CHANGE ABOVE 7.5 CI
L2967 AUTO START
L2968 AUTO STOP
L2261 OPEN MAIN GEN. BREAKER CO
L6093 NORMAL STOP LAMP
K2994 MAXIMUM LOAD RATE
K2995 SURGE/SPEED LOAD RUNBACK RATE
K2975 BPT LOAD RUNBACK RATE
K2973 SURGE/SPEED SPEED RUNBACK RATE
K2972 BPT SPEED RUNBACK RATE
K2991 MINIMUM LOAD
K2979 MANUAL SYNC ACC RATE
K2850 ACCELERATION CURVE ARRAY
8003 TRACK MANUAL 8004 SPEED/LOAD CONTROL

What is claimed is:

1. A combined cycle electric power plant comprising at least one gas turbine, means for generating steam in response to heat energy from said gas turbine, a steam turbine driven by steam supplied to it from said steam generating means, an electric generator driven by each of said turbines, means for controlling the operation of said turbines and steam generating means, said controlling means including a speed control for said gas turbine and a speed control for said steam turbine, means for regulating the field voltage of each of said generators during its startup, circuit breaker means for connecting each of said generators to a power system line, means for generating signals representing each generator voltage and frequency and each line voltage and frequency, an operator station having an automatic/manual synchronization selector switch and means for generating speed change and voltage change demand signals for each turbine-generator when it is selected for manual synchronization, means responsive to said voltage and frequency signals for automatically generating voltage change and turbine speed change outputs for implementation by the associated ones of said turbine speed controls and said field voltage regulating means when an automatic synchronization signal is generated by said selector switch and the associated generator is being sychronized, means for automatically generating a breaker close signal for each breaker means during synchronization of the associated generator on voltage and speed matches in the automatic synchronization mode, means for uncoupling the automatic synchronizing control paths and for coupling the speed and voltage change demand signals from said operator station to the selected turbine-generator when a manual synchronization signal is generated by said selector swtich, and means for generating a closing signal from the operator station for the breaker means associated with the generator selected for manual synchronization.

2. A combined cycle electric power plant as set forth in claim 1 wherein means are provided for sequentially operating said automatic generating means to implement field voltage changes and turbine speed changes for sequential automatic synchronization of the turbine generators for which automatic synchronization has been specified.

3. A combined cycle electric power plant as set forth in claim 1 wherein a digital computer is included as a part of said controlling means, means are provided for controlling the fuel flow to said gas turbine and the inlet steam flow to said steam turbine, said computer includes said turbine speed controls to generate fuel and steam control signals for said fuel and inlet steam controlling means, and said computer includes means for applying synchronizing speed change signals to said turbine speed controlling means.

4. A combined cycle electric power plant as set forth in claim 3 wherein said operator station includes a keyboard for entering speed demand changes into said computer, and said computer includes means for disabling operator speed demand changes from application to said speed control during gas or steam turbine-generator synchronization for which automatic synchronization has been specified or selected.

5. A combined cycle electric power plant as set forth in claim 3 wherein said computer speed controls include means for generating a speed demand, means for generating a speed reference, means for generating a speed error from the speed reference and actual turbine speed, means for applying automatic synchronization speed changes as reference changes, and means for setting the speed demand equal to the speed reference when synchronization speed reference changes occur.

6. A combined cycle electric power plant as set forth in claim 4 wherein said computer speed control functions automatically during startup and said computer further includes means for disabling operator speed demand changes from application to said speed controls during automatic startup of said turbines to synchronous speed.

7. A combined cycle electric power plant as set forth in claim 1 wherein predetermined permissive conditions must be satisfied before automatic synchronization is enabled for each turbine-generator selected for automatic synchronization.

8. A control system for controlling the operation of gas and steam turbine generators in a combined cycle electric power plant comprising a speed control for said gas turbine and a speed control for said steam turbine, means for regulating the field voltage of each of said generators during its startup, circuit breaker means for connecting each of said generators to a power system line, means for generating signals representing each generator voltage and frequency and each line voltage and frequency, an operator station having an automatic/manual synchronization selector switch and means for generating speed change and voltage change demand signals for each turbine-generator when it is selected for manual synchronization, means responsive to said voltage and frequency signals for automatically generating voltage change and turbine speed change outputs for implementation by the associated ones of said turbine speed controls and said field voltage regulating means when an automatic synchronization signal is generated by said selector switch and the associated generator is being synchronized, means for automatically generating a breaker close signal for each breaker means during synchronization of the associated generator on voltage and speed matches in the automatic synchronization mode, means for uncoupling the automatic synchronizing control paths and for coupling the speed and voltage change demand signals from said operator station to the selected turbine-generator when a manual synchronization signal is generated by said selector switch, and means for generating a closing signal from the operator station for the breaker means associated with the generator selected for manual synchronization.

9. A control system as set forth in claim 8 wherein means are provided for sequentially operating said automatic generating means to implement field voltage changes and turbine speed changes for sequential automatic synchronization of the turbine generators for which automatic synchronization has been specified.

10. A control system as set forth in claim 8 wherein a digital computer is included as a part of said controlling means, means are provided for controlling the fuel flow to said gas turbine and the inlet steam flow to said steam turbine, said computer includes said turbine speed controls to generate fuel and steam control signals for said fuel and inlet steam controlling means, and said computer includes means for applying synchronizing speed change signals to said turbine speed controlling means.

11. A control system as set forth in claim 10 wherein said operator station includes a keyboard for entering speed demand changes into said computer, and said computer includes means for disabling operator speed demand changes from application to said speed control during gas or steam turbine-generator synchronization for which automatic synchronization has been specified or selected.

12. A control system as set forth in claim 10 wherein said computer speed controls include means for generating a speed demand, means for generating a speed reference, means for generating a speed error from the speed reference and actual turbine speed, means for applying automatic synchronization speed changes as reference changes, and means for setting the speed demand equal to the speed reference when synchronization speed reference changes occur.

13. A control system as set forth in claim 10 wherein said computer speed control functions automatically during startup and said computer further includes means for disabling operator speed demand changes from application to said speed controls during automatic startup of said turbines to synchronous speed.

14. A control system as set forth in claim 8 wherein predetermined permissive conditions must be satisfied before automatic synchronization is enabled for each turbine-generator selected for automatic synchronization.

* * * * *